(12) United States Patent
Grover et al.

(10) Patent No.: US 6,819,662 B1
(45) Date of Patent: Nov. 16, 2004

(54) METHOD FOR PROTECTING A TELECOMMUNICATIONS NETWORK

(75) Inventors: Wayne D. Grover, Edmonton (CA); G. Dave Morley, Edmonton (CA); James B. Slevinsky, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/561,355

(22) Filed: Apr. 28, 2000

Related U.S. Application Data

(60) Provisional application No. 60/131,520, filed on Apr. 29, 1999.

(51) Int. Cl.[7] .............................................. H04L 12/28
(52) U.S. Cl. ....................................... 370/351; 370/258
(58) Field of Search ................................ 370/252, 254, 370/255, 256, 257, 258, 404, 405, 452, 460; 359/341.1, 341.2; 398/58, 59, 66

(56) References Cited

U.S. PATENT DOCUMENTS

| 4,956,835 A | 9/1990 | Grover ........................ 370/16 |
| 5,850,505 A | 12/1998 | Grover et al. .......... 395/182.02 |
| 6,061,335 A | * 5/2000 | De Vito et al. .............. 370/258 |

FOREIGN PATENT DOCUMENTS

| GB | 2299729 A | 10/1996 | ............ H04Q/3/00 |
| GB | 2305811 A | 4/1997 | ............ H04M/3/36 |
| WO | 97/11543 | 3/1997 | ........... H04L/12/24 |

OTHER PUBLICATIONS

Optimized design of ring–based survivable networks, W.D. Grover, J.B. Slevinsky and M.H. MacGregor, Can. J. Elect. & Comp. Eng., vol. 20, No. 3, 1995, pp. 139–149.

Fiber Network Survivability, Tom Flanagan, IEEE Communications Magazine, Jun. 1990, pp. 46–53.

Survivable Sonet Networks—Design Methodology, Ondria J. Wasem, Tsong–Ho Wu, and Richard H. Cardwell, IEEE Journal on Selected Areas in Communications, vol. 12, No. 1, Jan. 1994, pp. 205–212.

Broadband Network Infrasturcture of the Future: Roles of Network Design Tools in Technology Deployment Strategies, Bharat Doshi and P. Harshavardhana, IEEE Communications Magazine, May 1998, 14 pages.

Net Solver: A Software Tool For the Design of Survivable Networks, Linda Morales Gardner, I. Hal Sudborough, and Ioannis G. Tollis, Globecom '95, pp. 926–930.

(List continued on next page.)

Primary Examiner—Douglas Olms
Assistant Examiner—Robert M. Wilson
(74) Attorney, Agent, or Firm—Christensen O'Connor Johnson Kindness PLLC

(57) ABSTRACT

A method of connecting a telecommunications network, in which the network is formed of plural nodes connected by plural spans. Each node has a nodal switching device for making connections between adjacent spans meeting at the node. Method steps A–F are followed. A) Select a set of candidate rings, each candidate ring being formed of nodes connected by spans, the candidate rings each being capable of serving a number of demands and having a ring construction cost C. B) Assess the total transport utility U of each candidate ring, wherein the total transport utility is a measure of at least the number of demands served by the respective candidate ring. C) Assess the construction cost of each candidate ring. D) Calculate a ratio formed of U/C for each candidate ring. E) Choose, from the set of candidate rings, a best set of candidate rings, wherein candidate rings in the best set of candidate rings have a higher ratio of U/C than candidate rings not in the best set. F) Forming rings in the network that are selected from the best set of candidate simple rings.

40 Claims, 69 Drawing Sheets

OTHER PUBLICATIONS

Techniques for Finding Ring Covers in Survivable Networks, L.M. Gardner, M. Heydari, J. Shah, I.H. Sudborough, I.G. Tollis, and C. Xia, IEEE 1994, pp. 1862–1866.

Current Approaches in the Design of Ring–based Optical Networks, G.D. Morley and W.D. Grover, Proceedings of the 1999 IEEE Canadian Conference on Electrical and Computer Engineering, May 9–12, 1999, pp. 220–225.

Potential for spare capacity preconnection to reduce cross-connection workloads in mesh–restorable networks, W.D. Grover and M.H. MacGregor, Electronics Letters, vol. 30, No. 3, Feb. 3, 1994, pp. 194–195.

Nortel Networks, "Introduction to SONET Networking," *SONET 101 Tutorial Handbook*, Oct. 30, 1996.

W.D. Grover, "Network Survivability: A Crucial Issue for the Information Society", *IEEE Canadian Review*, Summer 1997, No. 27, pp. 16–21.

G. Brown, W.D. Grover, J.B. Slevinsky, M.H. MacGregor, "Mesh/Arc Networking: An Architecture for Efficient Survivable Self–Healing Networks", in *Proceedings IEEE International Conference on Communications* (ICC '94), New Orleans, May 1994, pp. 471–477.

I. Saniee, "Optimum Routing Designs in Self–Healing Communications Networks," Belcore Paper, May, 1994.

Wayne D. Grover, Demetrios Stamatelakis, "Cycle–Oriented Distributed Preconfiguration: Ring–like Speed with Mesh–like Capacity for Self–planning Network Restoration," ICC '98, 7 pages.

W.D. Grover, D. Stamatelakis, "Self–Organizing Closed Path Configuration of Restoration Capacity in Broadband Mesh Transport Networks," CCBR '98, 12 pages.

\* cited by examiner- $$DesignProgress = \sum_m BW_m \times d_m$$

Ring Cost = [#ADMs]xADMcost + [#ADM Ports]xADMPortCost +
  [#Repeaters]xRepeaterCost + [#FIBREkm]xFIBREPairCost STS-1 Demands
Balance Biased Demand Loading
2BLSR: (OC-12, OC-48 Options)
No alternate routing
Equal-length spans

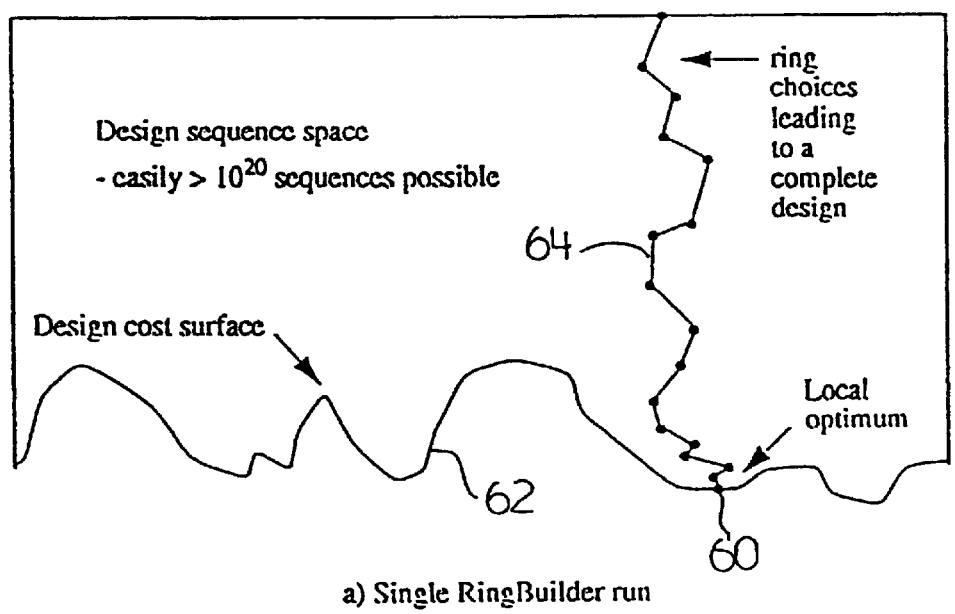
a) Single RingBuilder run
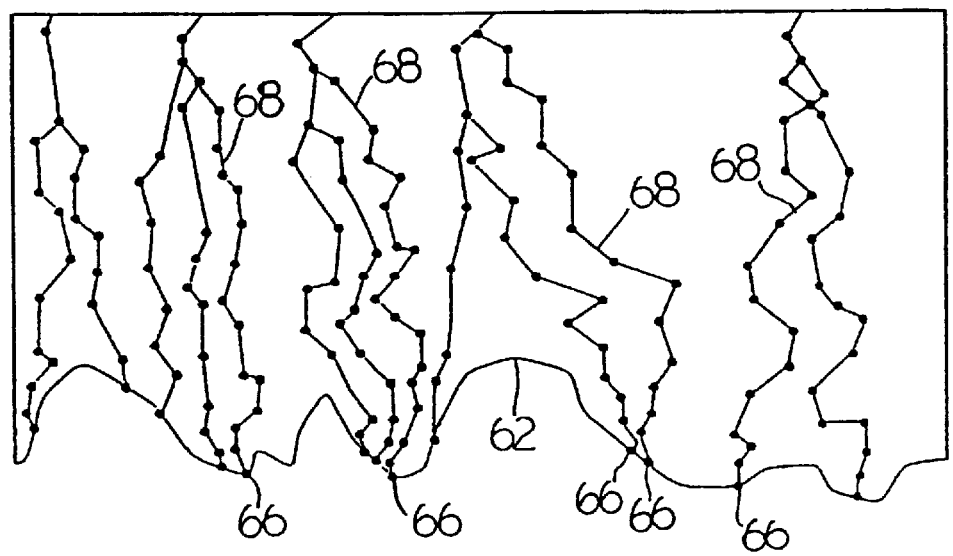
b) A small set of runs using dithered sequencing
FIGURE 12

| NETWORK | NO. OF NODES | NO. OF SPANS | AVERAGE NETWORK DEGREE | MAX CYCLE SIZE | DEMAND PAIRS | TOTAL DEMANDS |
|---|---|---|---|---|---|---|
| A | 11 | 23 | 4.18 | 16 | 38 | 80 |
| B | 30 | 59 | 3.93 | 7 | 263 | 1557 |
| C | 50 | 65 | 2.55 | 16 | 233 | 380 |
| D | 101 | 136 | 2.71 | 18 | 585 | 877 |

FIGURE 46

| MODULE SIZE | NET A # ELIM | NET A REL. COST | NET B # ELIM | NET B REL. COST | NET C # ELIM | NET C REL. COST | NET D # ELIM | NET D REL. COST |
|---|---|---|---|---|---|---|---|---|
| 3 | 4 | 69/69 | - | - | - | - | - | - |
| 12 | 6 | 27/27 | 0 | 250/251 | 2 | 217/200 | - | - |
| 24 | 9 | 15/23 (1) | 0 | 136/140 | 2 | 121/116 | 8 | 425/364 |
| 48 | - | - | 3 | 84/88 | 2 | 89/87 | 8 | 263/235 |
| 96 | - | - | 6 | 68/72 (1) | 4 | 73/77 (1,2) | 8 | 165/166 |
| 192 | - | - | - | - | - | - | 9 | 163/166 (1,2) |

FIGURE 47

```
struct route_struct {
    int debugRouteNumber; /* temporary ? debug aid */
    int *theRouteSpans;
    int *theRouteNodes;   /* node index n connects span index n-1 and n */
                          /* note the grief at end of routes, due to the */
                          /* fact that there is one more node than span */ int routeHops;     /* Length of the route in links */
    int routeDistance; /* Physical length of the route*/
    int routeBW;       /* the amount of bandwidth carried by the route */
    int *loadedOntoRing; /* a flag indicating the Rings into which the Route segments are
                            loaded (-1 = not) */
    int *routeNodeIndexOnRing; /* a vector indicating location of route node in ring
                                  (expressed in ring index offset) */
    int *routeSpanIndexOnRing; /* a vector indicating location of route span in ring
                                  (expressed as ring index offset) */
    int *transitions;  /* vector indicating the ring to ring transition points for a route*/
                       /* this vector is same length as *theRouteNodes (one longer than
                          *theRouteSpans) */
    int transitionCount; /* count of transitions for this route */
    int unRoutedLinks;   /* count of number of remaining unrouted links for this route */
};
```

FIGURE 48

```
typedef struct head_struct CHead;

struct head_struct {
    CHead *nextC;
    int cycleLength;
    int *theCycle;
    int *theCycleNodes; /* node index n connects span index n-1 and n */
};
```

FIGURE 49

```
struct loaded_route_struct {
    int debugRouteNumber; /* this is for temporary use only */
    Route *theRoute;
    int potentialHopCount;
    double potentialWorkingBWDistanceProduct;
    int transitionCount; /*apparently unused*/
    int addDropCount; /*apparently unused*/
    int linksOnCount; /*apparently unused*/
    int *routeNodeIndexOnCycle; /* a node index converter -> stores node index in cycle */
    int *routeSpanIndexOnCycle; /* a span index converter -> stores span index in cycle */
    int *loaded; /* a flag indicating that the route segment has been loaded into the
    current cycle (FALSE or TRUE) */
    int *incrementalTransitions; /* vector indicating the ring to ring transition points
    for the route */
    int incrementalTransitionCount; /* count of incremental transitions for this route on
    the current cycle */
    int incrementalRoutedLinkCount; /* count of number of route links routed on this cycle
    */
    int incrementalADMCount; /* incremental count of ADMs added due to this route being
    loaded onto the cycle */
    int *incrementalADMs; /* vector of incremental ADMs ordered by route hop */
    char routeStatus; /* v = valid; l = loaded; a = alt_routed; n = not_loaded */
    char hasSibling; /* indicates that an alternate route exists on this cycle */
};
```

FIGURE 50

```
typedef struct loadedCyclesStruct LoadedCycle;

struct loadedCyclesStruct {
    int transitions;
    int balanceTransitions;
    int addDrops;
    int linksOn;
    int admCount;
    CHead *theCycle;
    int *admPresent;           /* 0 = not present, 1= present */
    int *addDropCount;
    int *transitionCount;
    int *balanceTransitionCount;
    int *remainingBandwidth;
    int *linksOnCount;
    int *routeCount;
    SystemTechnologyParameters * systemType;
    LcrHead **routeLists;   /* need a vector of pointers to linked lists because the*/
                            /*number of routes per span grows as cycle is loaded */
};
```

FIGURE 51

METHOD FOR PROTECTING A TELECOMMUNICATIONS NETWORK

CROSS-REFERENCE TO RELATED APPLICATION

This application claims the benefit of U.S. Provisional Patent Application No. 60/131,520, filed Apr. 29, 1999.

FIELD OF THE INVENTION

This invention relates to the protection of communication networks against span failures.

BACKGROUND OF THE INVENTION

The inventor Wayne D. Grover has previously proposed a method for the automated synthesis of transport network designs based on multiple SONET self-healing rings. [Grover et al, Optimized Design of ring-based Survivable Networks, Can. J. Elect. & Comp. Eng., vol. 20, No. 3, 1995] A heuristic procedure was based on insights about the trade-off between capacity efficiency and traffic capture efficiency of ring sets to find a minimum-cost composite design. The method was called RingBuilder™ Version 1. In the method, demands are first mapped onto the spans of a network via shortest-path routing, with a load leveling criterion if multiple equal-length shortest routes are present. This produces a network graph. Next, all distinct simple cycles in the network graph are identified. Then, each cycle is evaluated according to a metric to find a cycle that maximizes the metric. The proposed metric evaluated capacity efficiency. After a maximizing cycle is found, all the working capacities on spans in the maximizing cycle are set to zero for subsequent iterations of the method steps. The remaining distinct simple cycles are then evaluated according to the metric, and maximizing cycles identified at each iteration, until all spans in the network are covered by a bi-directional line-switched ring.

Some limitations of RingBuilder Version 1 are as follows. Version 1 is only suitable for designing networks that are based entirely on a single size and type of ring technology. Version 1 does not directly optimize the cost of the rings it is choosing. It pursues a weighted trade-off between capture and balance efficiency over a range of compromise weightings. Total network design cost is reported at design termination. Separate cost evaluation is required to find the minimum cost design amongst the designs generated. The process of generating complete designs at each 'alpha' (weighting factor) value is very time consuming. Largely because of the computational complexity of sweeping the value of alpha, Version 1 cannot afford to apply any anti-greediness methods or other forms of search to explore the design space around each sweep-generated design. Version 1 is relatively susceptible to missing very good designs because only one synthesis sequence is invested at each alpha value. If used to generate pure balance-optimized designs, Version 1 often does not escape the use of small individually efficient rings. This has the undesirable side effect that more rings than really necessary are often used in the final design. Because of this Version 1 sometimes fails to discover good designs which humans can find by careful inspection and proposal of rings. These designs often involve manually selected span eliminations, which is the deliberate disuse of a topologically existing span, because it can be more cost effective not to use the span at all in the design.

Bi-directional line-switched rings (BLSR) and uni-directional path-switched rings (UPSR) are now in common use for survivable transport networking. (Nortel Networks, "Introduction to SONET Networking," *SONET 101 Tutorial Handbook*, Oct. 30, 1996) These protection structures offer fast restoration speeds (typically under 150 msec) and, though not as capacity efficient as mesh networks, each ring is individually simple to operate. Ring networks can also be more economical than mesh in metro applications due to their lower nodal equipment costs. (T. Flanagan, "Fiber Network Survivability," *IEEE Comm. Mag.*, pp. 46–53, June 1990)

However, the design of multi-ring networks is an exceptionally complex combinatorial optimization problem. In recent years, a number of approximate design methods have been proposed for the multiple-ring design problem which approach the design as a form of min-cost graph-covering problem. W. D. Grover, J. B. Slevinsky, M. H. MacGregor, "Optimized Design of Ring-Based Survivable Networks", *Can. J. Elect & Comp. Eng.*, Vol. 20, No.3, 1995. O. J. Wasem, T-H Wu and R. H. Cardwell, "Survivable SONET Networks-Design Methodology," *IEEE J. on Select Areas Comm.*, vol. 12, no. 1, pp. 205–212, January 1994. B. Doshi and P. Harshavardhana, "Broadband Network Infrastructure of the Future: Roles of Network Design Tools in Technology Deployment Strategies," *IEEE Comm. Mag.*, vol. 39, pp.60–71, May 1998. L. M. Gardner, I. H. Sudborough and I. G. Tollis, "Net Solver: A Software Tool for the Design of Survivable Networks," *IEEE GLOBECOM* 1995, vol. 1, pp. 39–44, November 1995).

Some schemes take a capacitated coverage view (the ring capacities placed must be adequate to carry all demand crossing the underlying span), or an uncapacitated, purely logical coverage viewpoint (at least one ring covers every span). (L. M. Gardner, M. Heydari, J. Shah, I. H. Sudborough, I. G. T*IEEE GLOBECOM* 1994, vol. 3, pp. 1862–1866, 1994.)

Generally, the capacity requirements of each span are determined by routing demands over the shortest path from end-to-end. Intuitively, this can lead to coverage solutions with one or more very low-utilization rings; rings that were placed, in essence, just due to the strict coverage requirement, but serve little demand. To illustrate, consider the simple graph and demand matrix in FIG. 1(a) where the capacity required on each span has been determined by shortest path routing over the native graph. If we assume OC-12 4-fibre BLSRs, a minimum of two rings is required in a 'coverage' design. Moreover both of these rings are forced to cover span B-D. And together they have only $2/24^{th}$ capacity utilization on that span.

In this case it is fairly apparent by inspection that "eliminating" span B-D would force the B-D demand flow to take another route or routes (with demand bundle splitting) and, as constructed in FIG. 11(b) result in a single perfectly filled OC-12 ring to cover the network graph. Note that the capacity utilization of the ring increases at the same time as fewer rings are used due to eliminating span B-D. The capacity and capture efficiency are both improved The example is a simple one. More generally the challenge is to identify those spans of a graph which, for a given demand pattern and ring modularities, will have desirable effects as above, if eliminated. If the wrong span is eliminated, it can backfire: total (inter-ring) routing costs increase due to excessive detouring from the shortest path and ring counts can increase due to exceeding a modularity threshold. It is known that experienced manual planners, with some trial and error, can fairly effectively visualize these opportunities in complex real-sized problems. To our knowledge, however, our work is the first attempt at a systematic algorithmic approach to span elimination.

SUMMARY OF THE INVENTION

The present invention provides an improvement over RingBuilder™ Version 1 for optimized design of multiple ring networks, such as SONET and WDM networks. For example, multi-technology designs are possible, unlike in RingBuilder™ Version 1. Other advantages of the present invention include: Ring choices in each iteration are based directly on cost assessment, and not on the intermediate measures of balance and capture efficiency. The total cost of the design is known immediately at the end of the run. A minimum cost final design can be determined without sweeping. Anti-greediness tactics are employed, exploring the design space in the region of the basic synthesis sequence to a significant and user-specifiable extent.

Aspects of the invention include:

iterative ring selection via transport utility (or "bang for the buck"), aggregating routing, statistically "dithered" ring choice selection, random or systematic cycle-set masking on a per iteration basis, progressive expansion of cycle set scope as the design evolves to completion, wide 'horizontal' searches of partial designs followed by progressive design depth search to completion, systematic use of aggregation pressure for discovery of cost-effective span additions or eliminations, 'bundled' demand processing has been implemented, which ensures that an entire demand is treated as a single unit for processing by RingBuilder, increasing performance and simplifying network implementation, 1:1 system substitution post-processor which searches a complete ADM-based ring design and searches for opportunities replace ADM-based systems with simpler diversely routed linear systems, and Ring loading methods: 1) balance-biased demand ordering, 2) capture-biased demand ordering, and 3) intra-ring demand alternate routing ring loader which allows limited re-routing of demands within a ring in order to enhance system utilization.

Therefore, according to an aspect of the invention, there is provided a method of constructing a telecommunications network, in which the network is formed of plural nodes connected by plural spans, each node having a nodal switching device for making connections between adjacent spans meeting at the node, the method comprising the steps of:

a) selecting a set of candidate rings, each candidate ring being formed of nodes connected by spans, the candidate rings each being capable of serving a number of demands and having a ring construction cost C;

b) assessing the total transport utility U of each candidate ring, wherein the total transport utility is a measure of at least the number of demands served by the respective candidate ring;

c) assessing the construction cost of each candidate ring;

d) calculating a ratio formed of U/C for each candidate ring;

e) choosing, from the set of candidate rings, a best set of candidate rings, wherein candidate rings in the best set of candidate rings have a higher ratio of U/C than candidate rings not in the best set; the best set of candidate rings being capable of covering the network; and f) forming rings in the network that are selected from the best set of candidate simple rings.

According to a further aspect of the invention, there is provided A method of connecting a telecommunications network, in which the network is formed of plural nodes connected by plural spans, each node having a nodal switching device for making connections between adjacent spans meeting at the node, the method comprising the steps of:

a) selecting a set of candidate rings, each candidate ring being formed of nodes connected by spans;

b) assigning an amount of demand to each candidate ring;

c) ordering the candidate rings according to a rule that considers the cost of implementing the candidate rings in the network in relation to the level of demand coverage provided by the candidate rings;

d) selecting a set of best rings from the candidate rings, wherein the best rings are ordered higher than rings not in the best set;

e) setting the demand in the best rings to zero;

f) re-ordering the remaining candidate rings not in the best set according to a rule that considers the cost of implementing the candidate rings in the network in relation to the level of demand coverage provided by the remaining candidate rings; and g) forming rings in the network that are selected from the best set of candidate rings and rings in the remaining candidate rings that are ordered higher than other rings in the remaining candidate rings.

According to a further aspect of the invention, there is provided A method for selecting a ring for implementation in a communications network, the communications network comprising plural spans connected by nodes for data transmission, the method comprising the steps of:

selecting a set of cycles, a cycle being a set of nodes and their interconnecting spans forming a closed path for travel once over each span and node in the cycle;

for each cycle in the set;

identifying the demands with demand route segments in the cycle, a demand being an amount of data required to be transmitted between a source node and a destination node, a demand route being a set of connected spans and nodes over which the demand is transmitted and a demand route segment being any number of spans and nodes in the demand route;

calculating the cost of carrying the demands on the cycle, and a cost and performance value for the cycle; and selecting one cycle as a ring based on the cost and performance value.

According to a further aspect of the invention, there is provided A method of selecting demand routes in a communications network, the communications network being plural spans connected by nodes for carrying data, a demand route being a set of connected spans and nodes over which data is transmitted between a source node and a destination node, the method comprising the steps of:

Identifying a set of spans such that each span in the set is essential for bi-connectivity and route maximum node number limitations; and for each demand:

calculating a cost value for carrying the demand for each span in a possible route; and selecting the demand route according to the cost values for spans calculated in i).

According to a further aspect of the invention, there is provided a method of sorting demands with demand route segments in a ring, before loading the demands onto the ring, the method comprising the steps of:

a. sorting demands in order of decreasing containment, containment being the ratio of bandwidth-span distance product for the demand route's spans in the ring to the bandwidth-span distance product for that part of the demand not yet loaded onto any ring;

b. sorting demands with equal containment in order of decreasing cycle involvement; and c. sorting demands with equal containment and cycle involvement in order of decreasing number of demand route nodes in the ring.

According to a further aspect of the invention, there is provided a method of sorting demands with demand route segments in a ring, before loading the demands onto the ring, the method comprising the steps of:

ranking highest demands with demand routes fully contained in the ring;

sorting remaining demands in order of decreasing ratio of the number of the demand route's spans in the ring to the total number of the demand route's spans for that part of the demand not yet loaded on any ring;

sorting demands with the same ratio in b) in order of decreasing cycle involvement; and sorting demands with the same ratio in b) and cycle involvement in order of decreasing number of demand route spans in the ring.

According to a further aspect of the invention, there is provided a method for selecting rings for implementation in a communications network, the communications network formed of plural spans connected by nodes for carrying data, the method comprising the steps of:

selecting a demand route for each demand, a demand being an amount of data required to be transmitted between a source node and a destination node and a demand route being a set of connected spans and nodes over which the demand is transmitted;

identifying a set of cycles, a cycle being a set of spans and their interconnecting nodes forming a closed path for travel once over each span and node in the cycle;

for each cycle in the set:

calculating the cost of carrying on the cycle the demands with demand route segments in the cycle, a demand route segment being any number of spans and nodes in a demand route; and calculating a cost and performance value for the cycle; and selecting cycles as rings to be implemented in the network based on the cost and performance values, and loading the demands onto the rings.

These and other aspects of the invention are described in the detailed description of the invention and claimed in the claims that follow.

There will now be described preferred embodiments of the invention, with reference to the drawings, by way of illustration only and not with the intention of limiting the scope of the invention, in which like numerals denote like elements and in which:

FIG. 12 is a schematic using dithered selection to explore the design space;

Figure 27A:
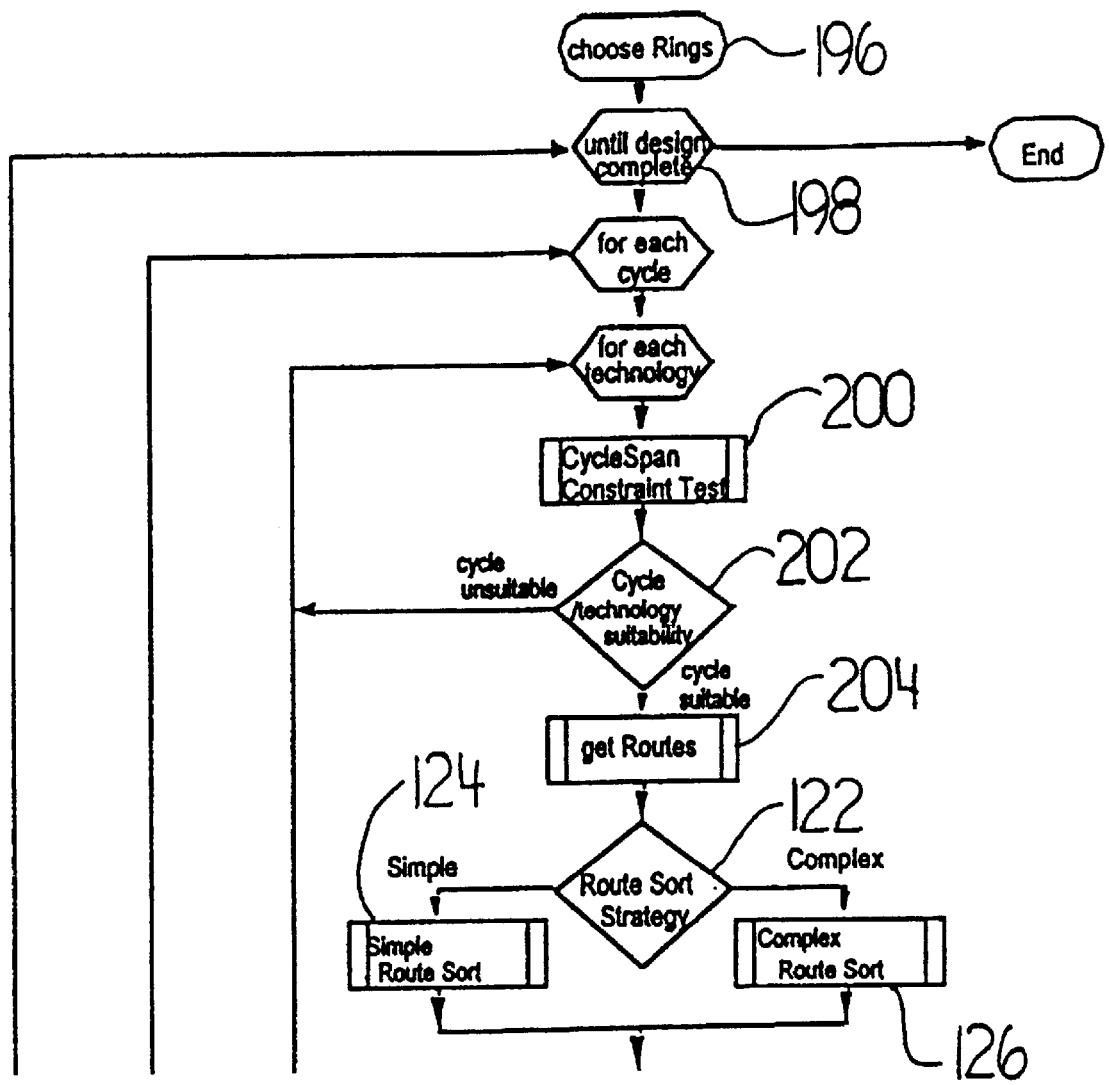
Figure 27B:
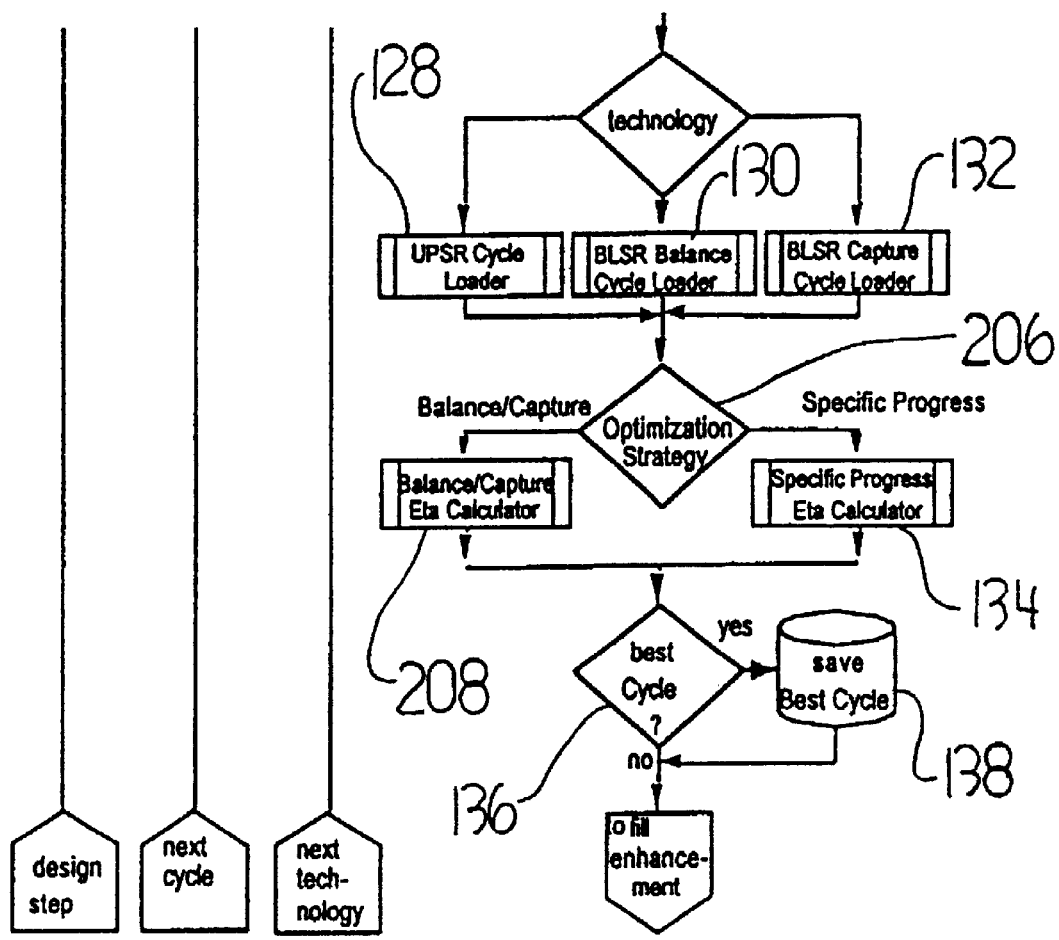
Figure 27C:
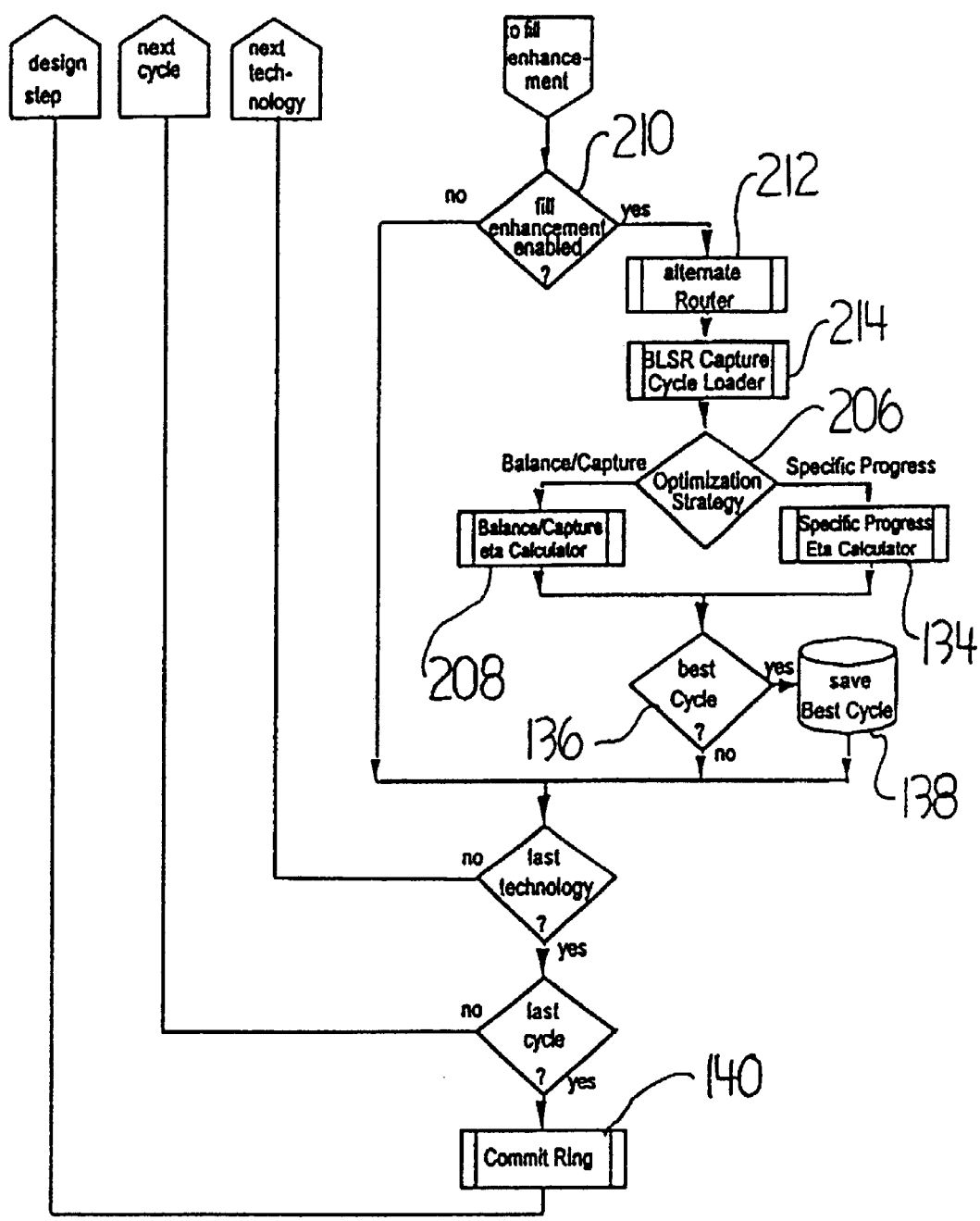
Figure 28:
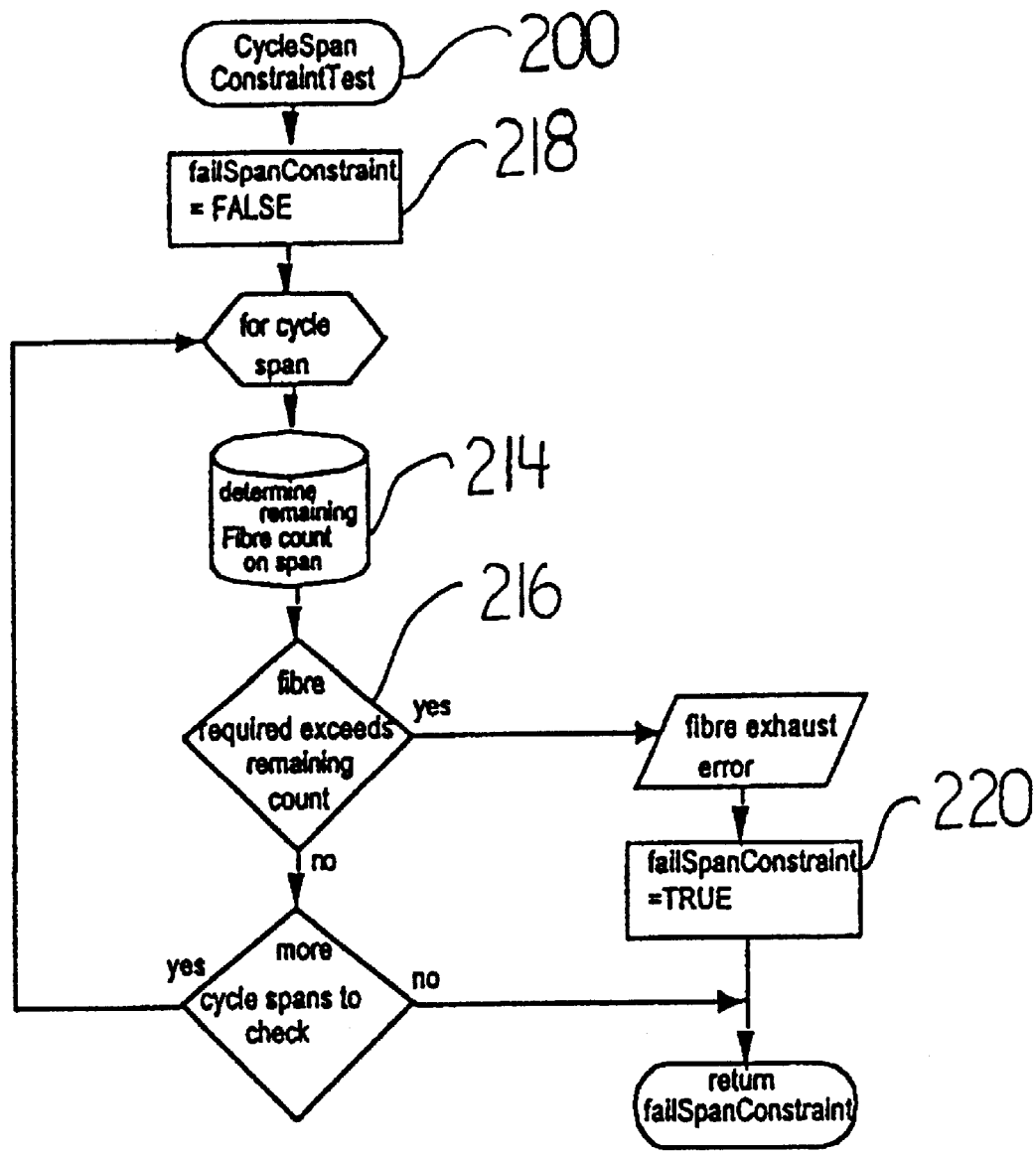
Figure 29:
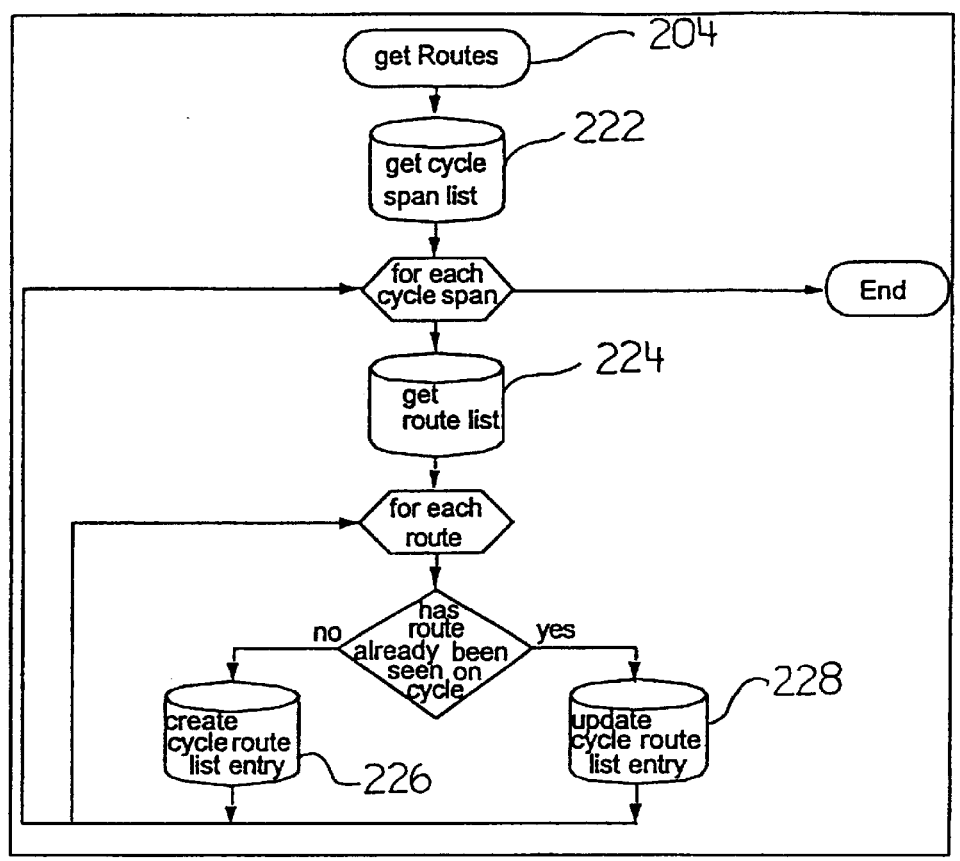
Figure 30:
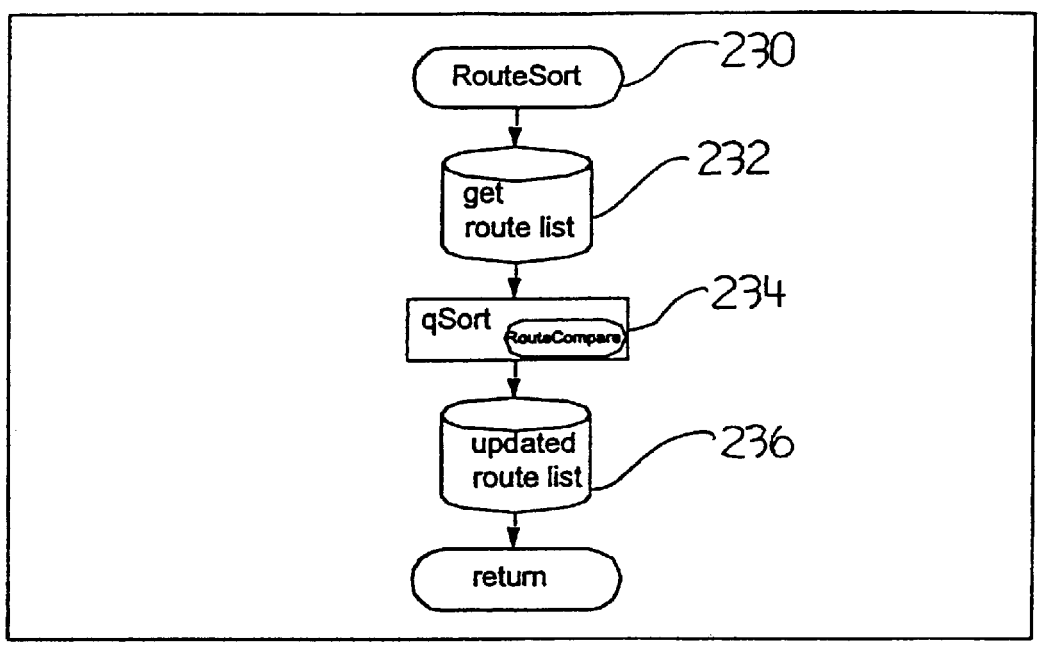
Figure 31:
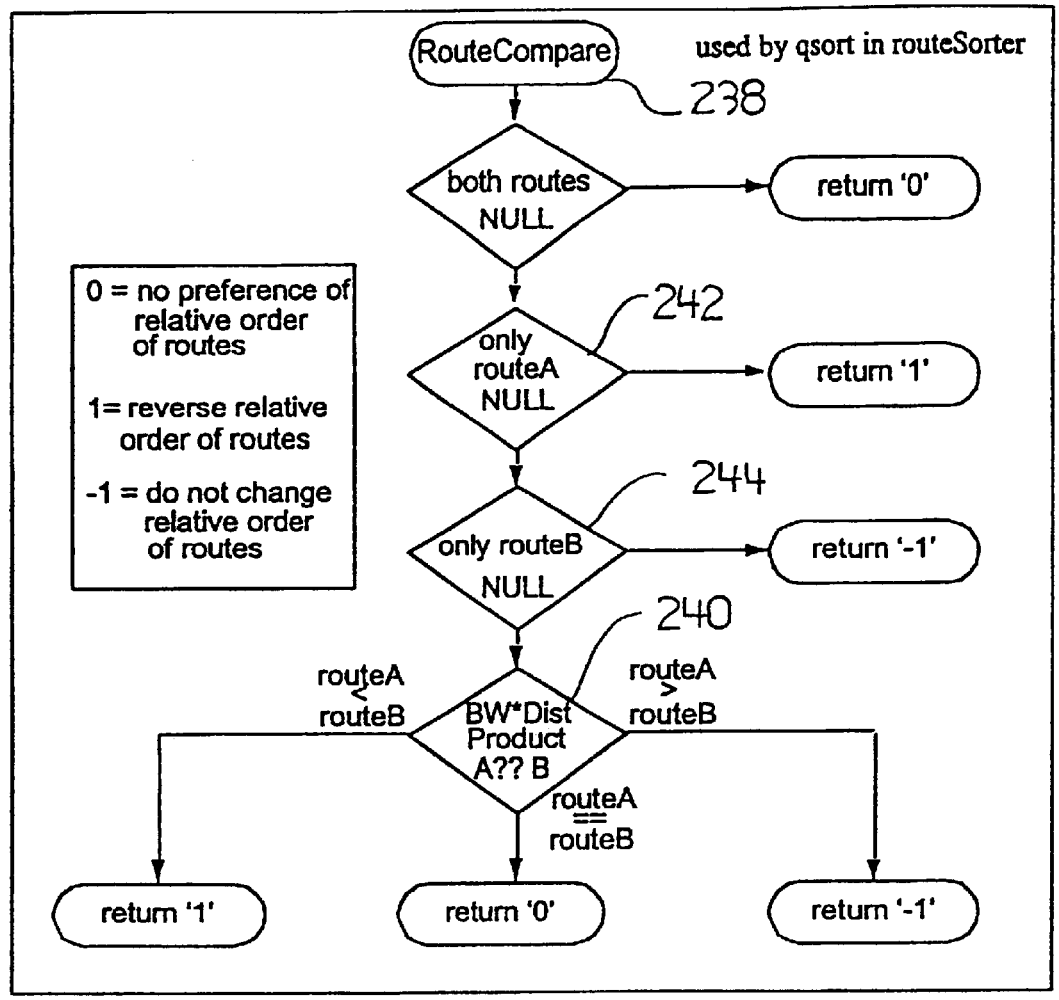
Figure 32:
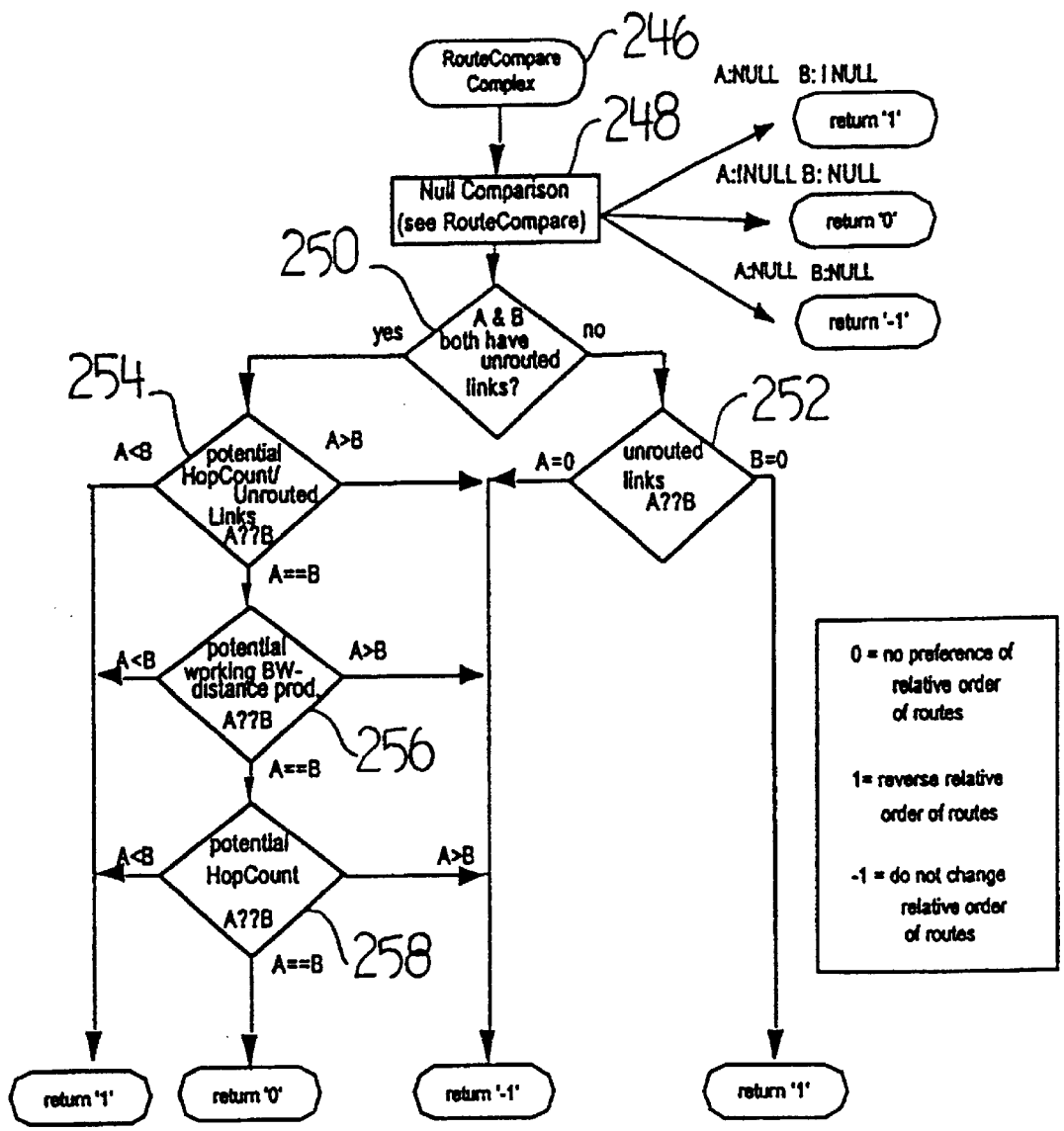
Figure 33A:
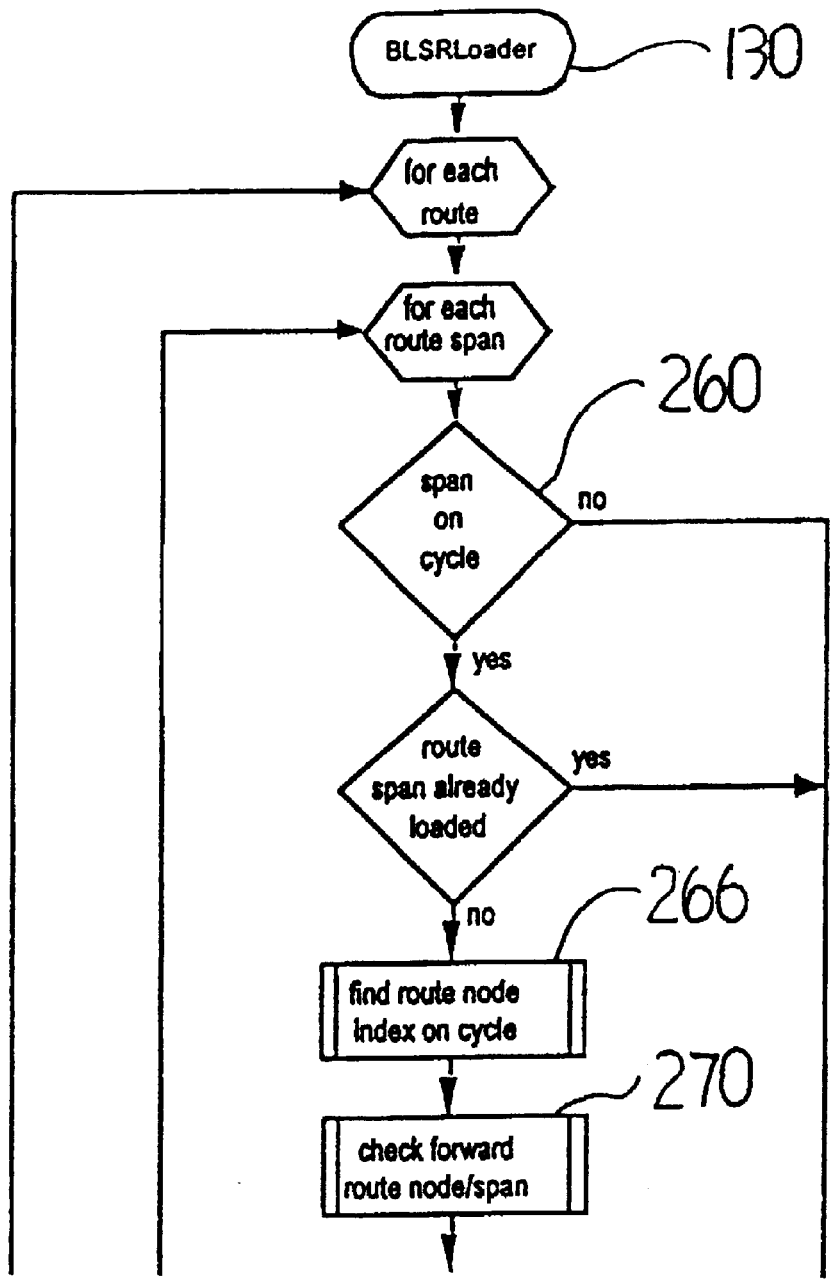
Figure 33B:
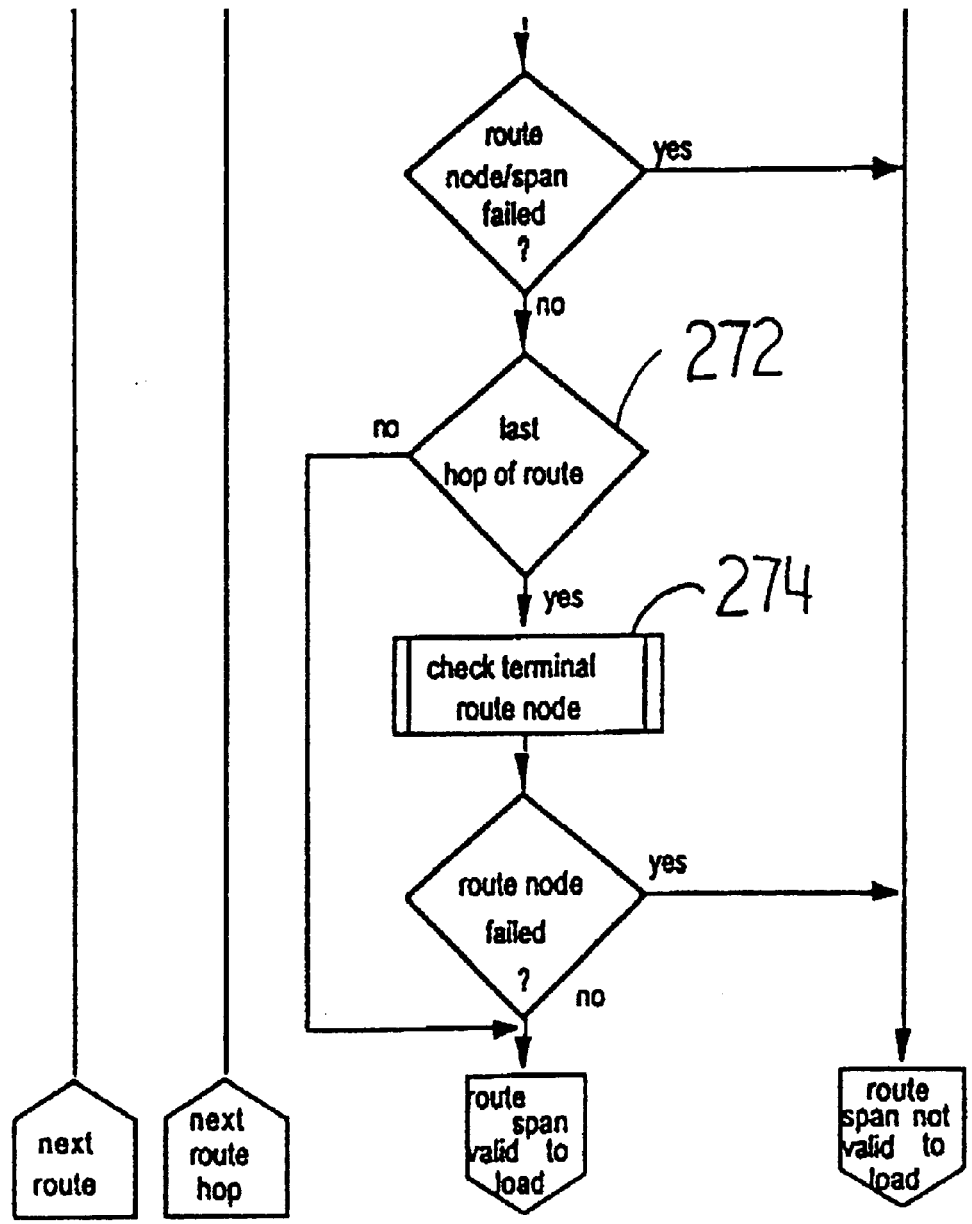
Figure 33C:
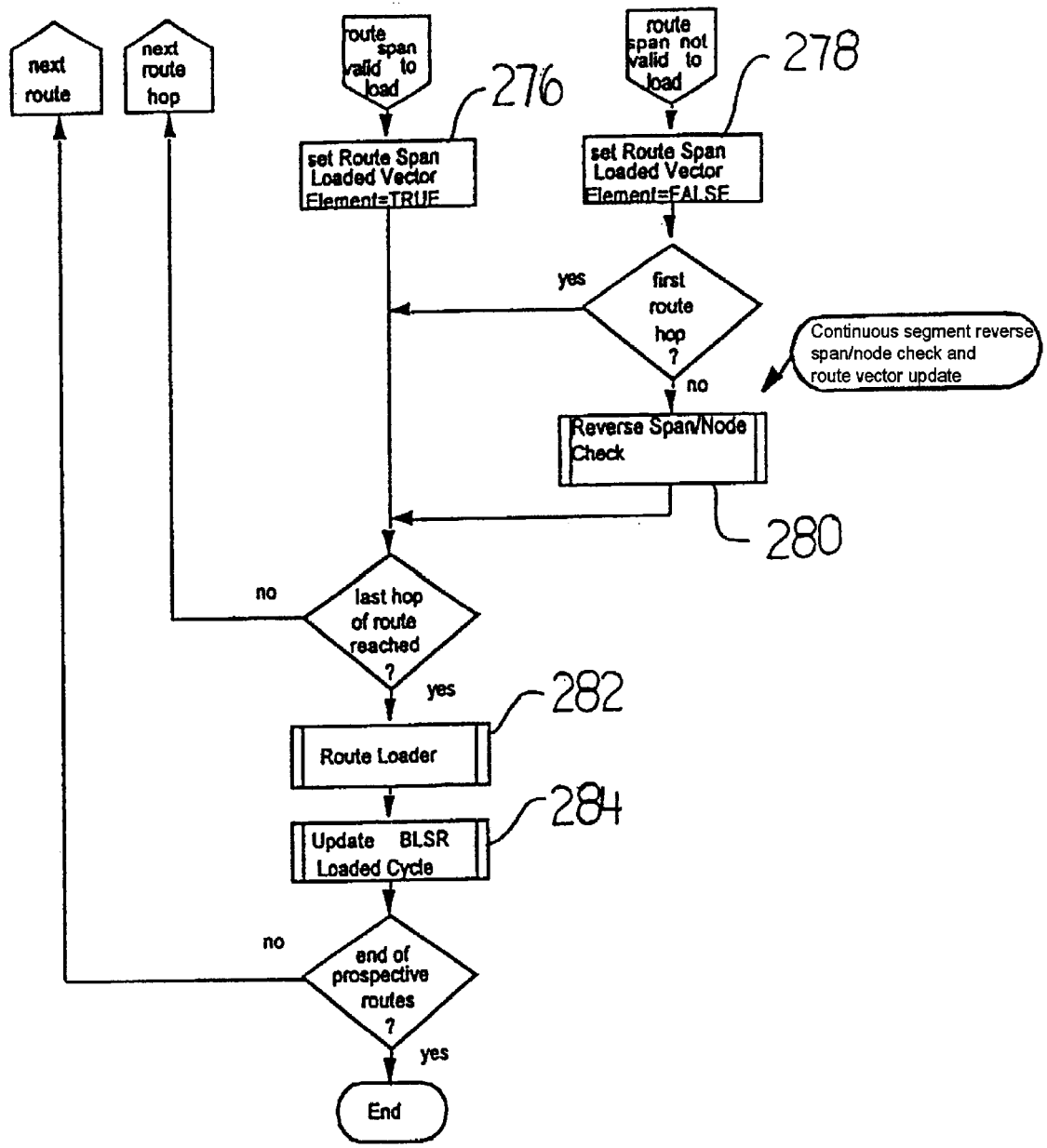
Figure 34A:
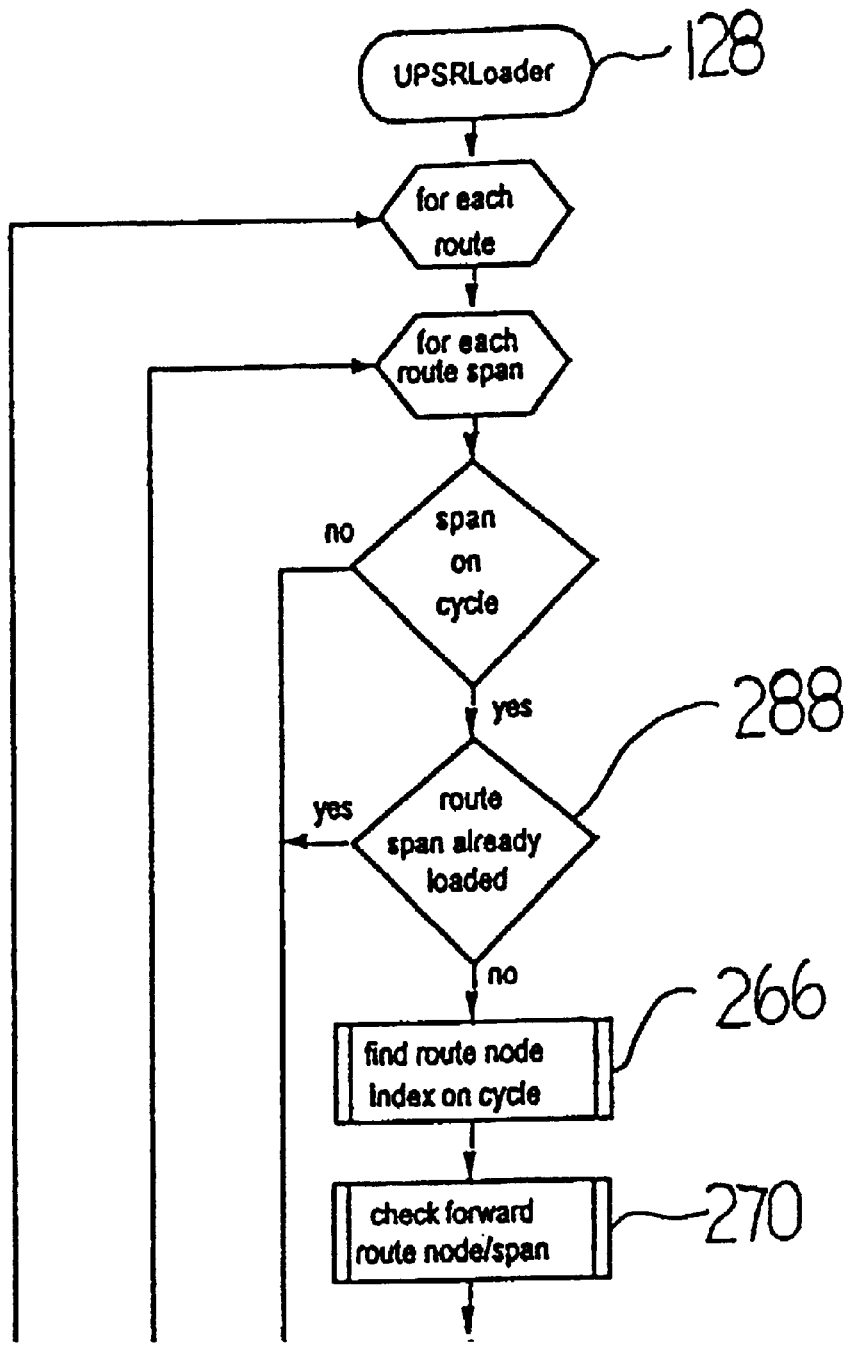
Figure 34B:
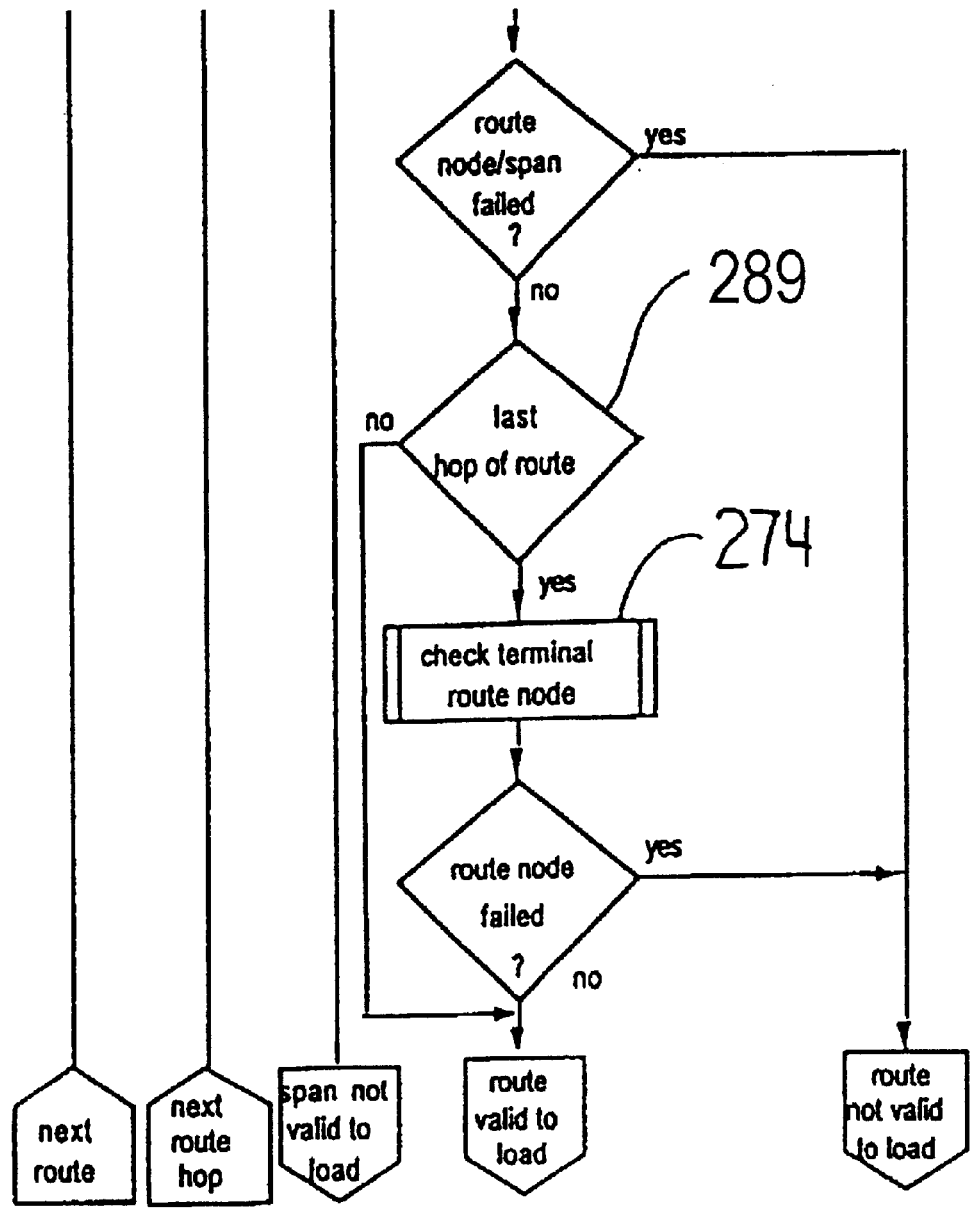
Figure 34C:
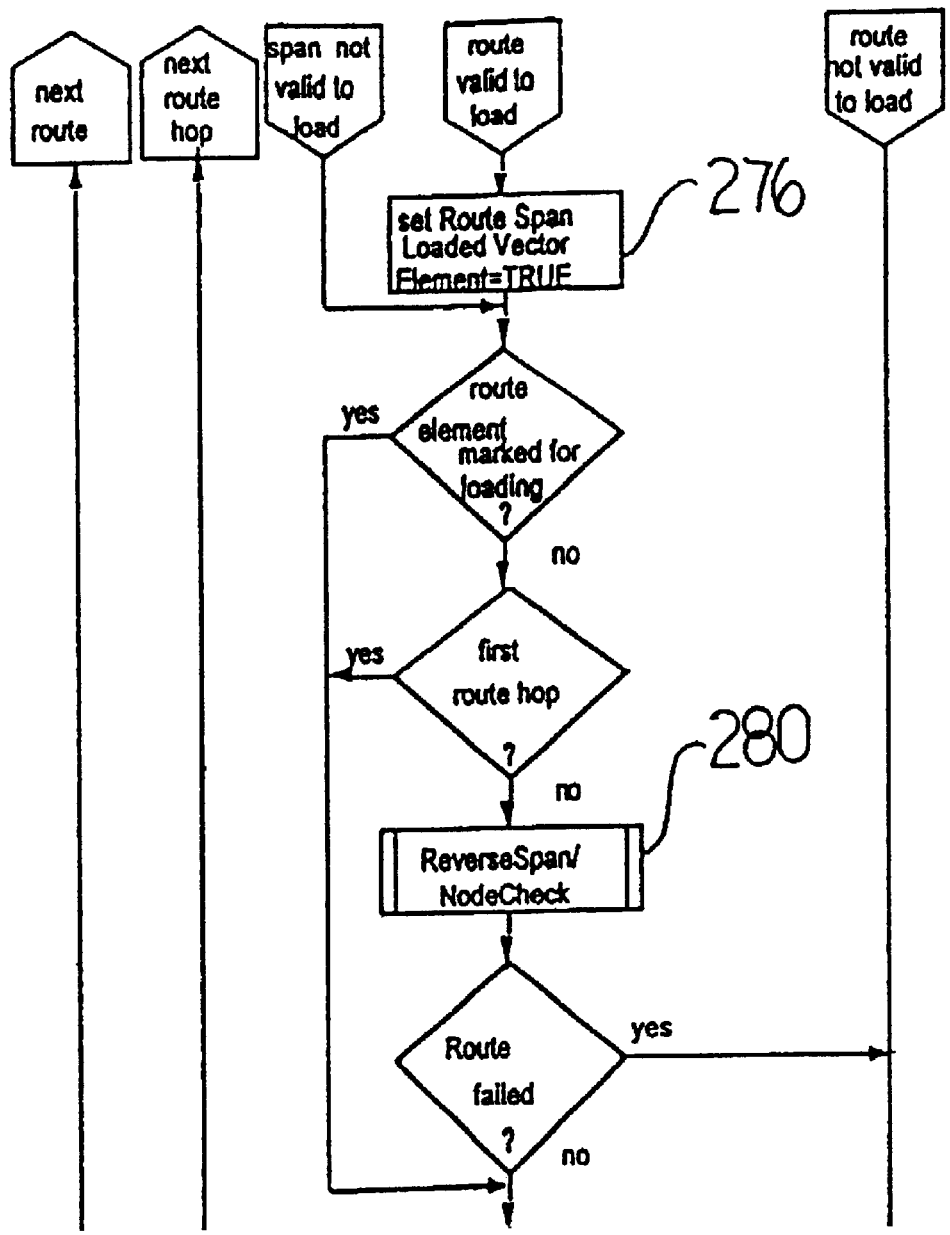
Figure 34D:
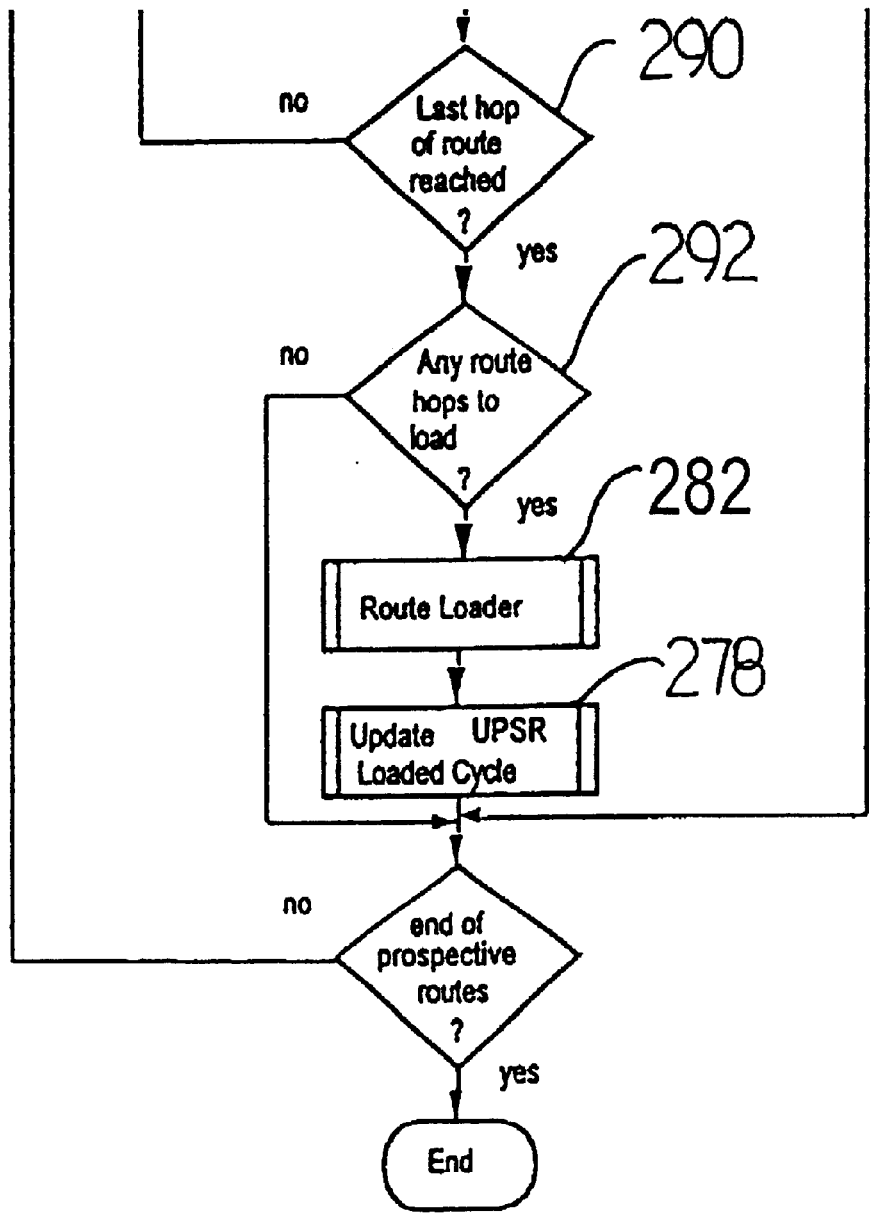
Figure 35A:
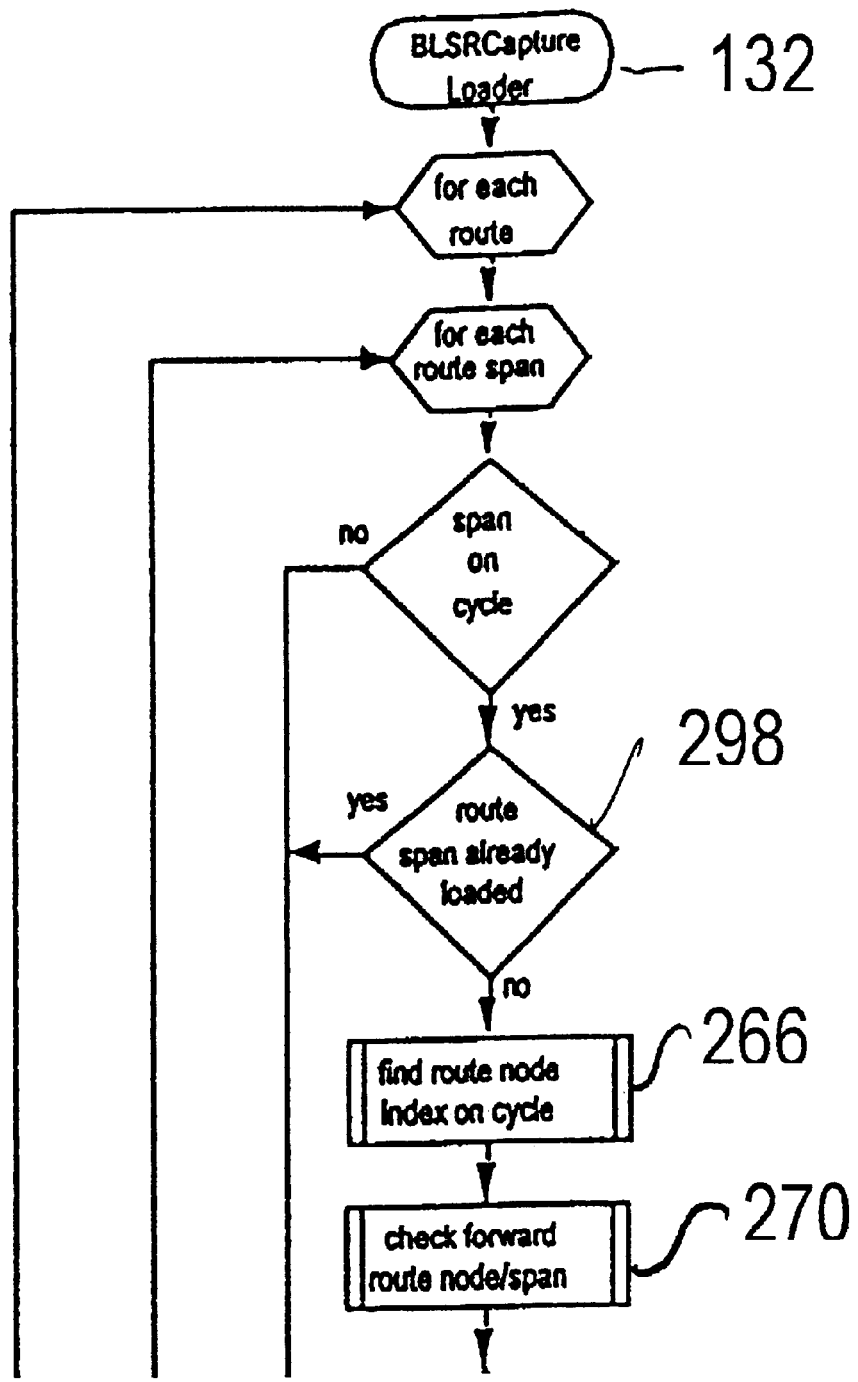
Figure 35B:
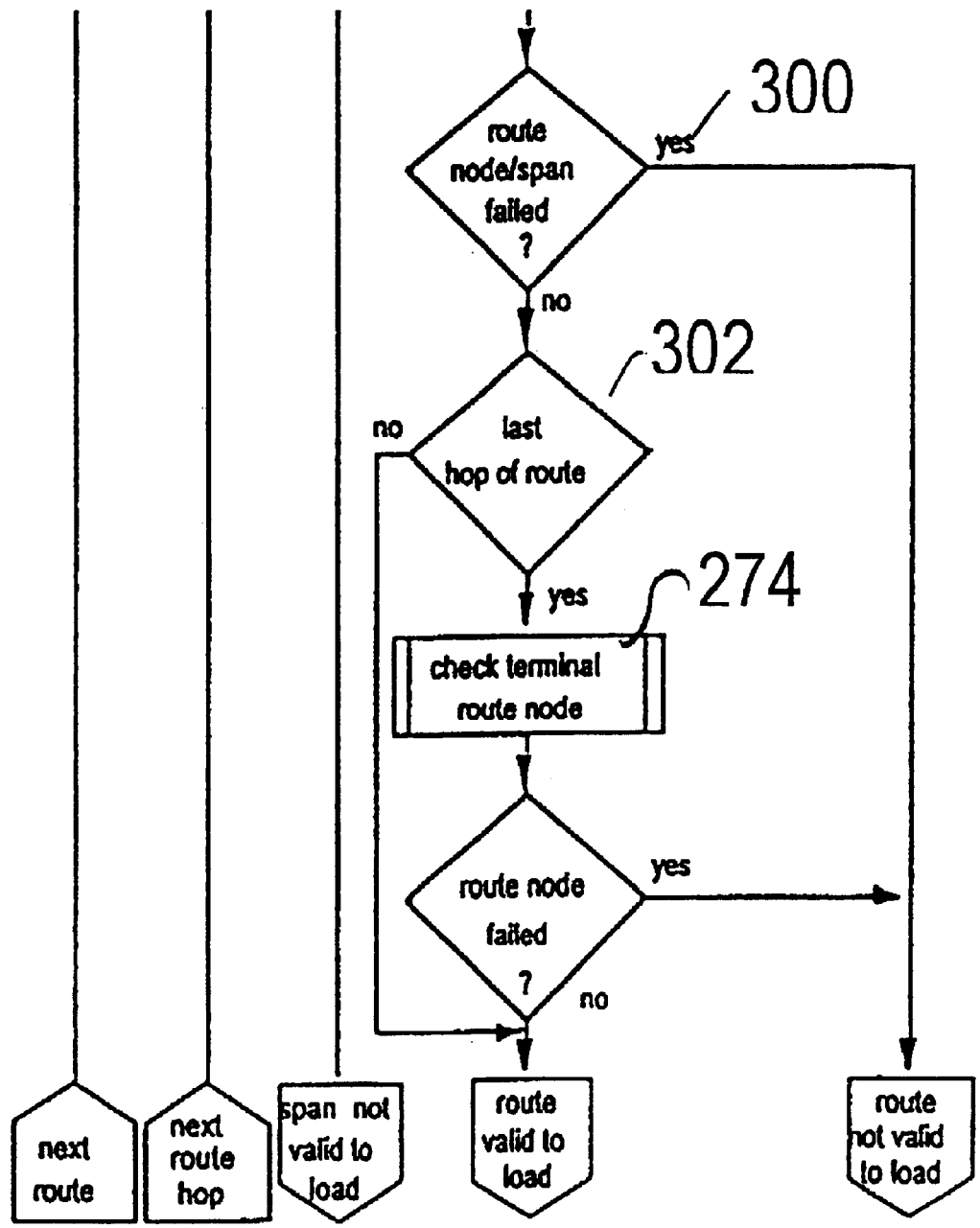
Figure 35C:
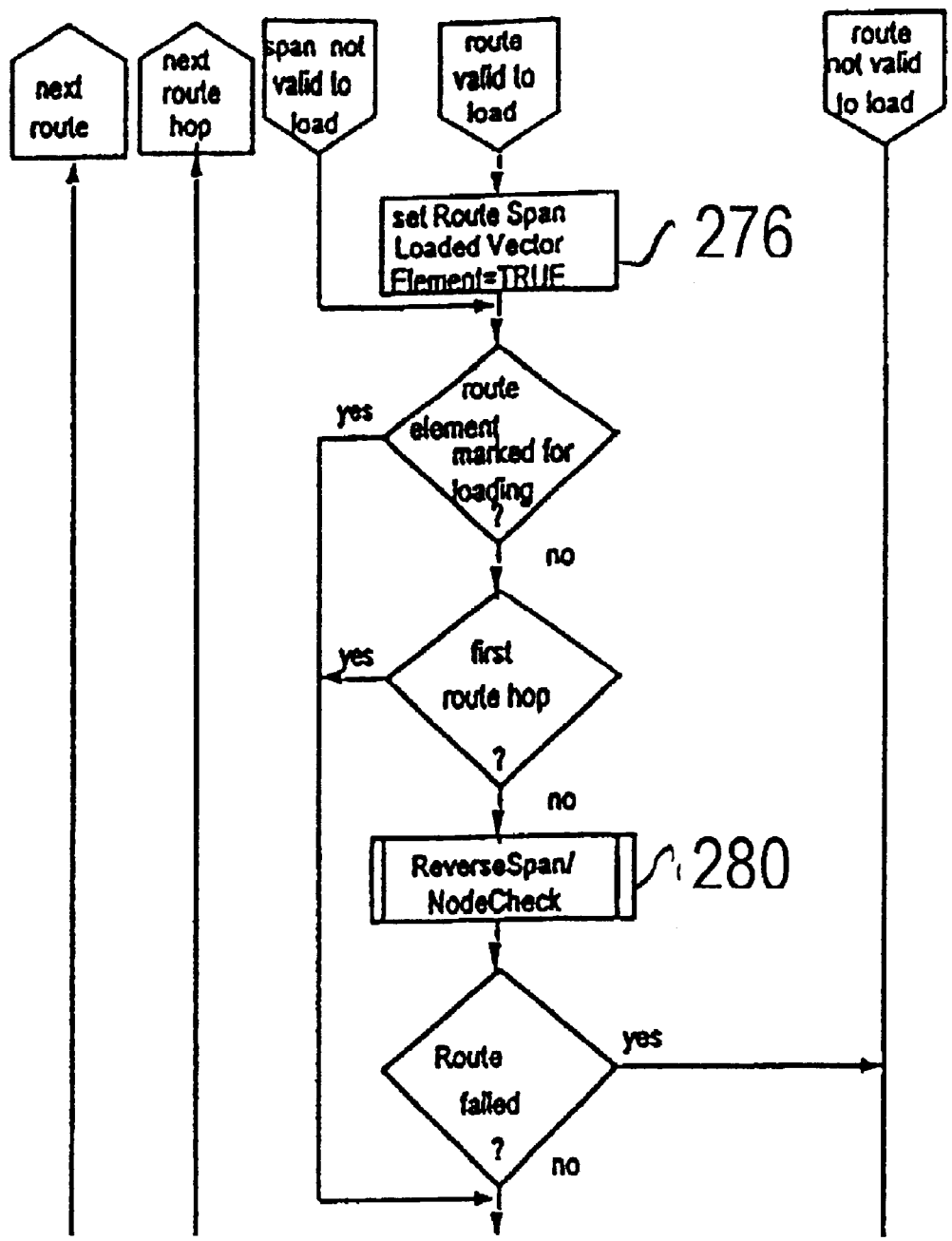
Figure 35D:
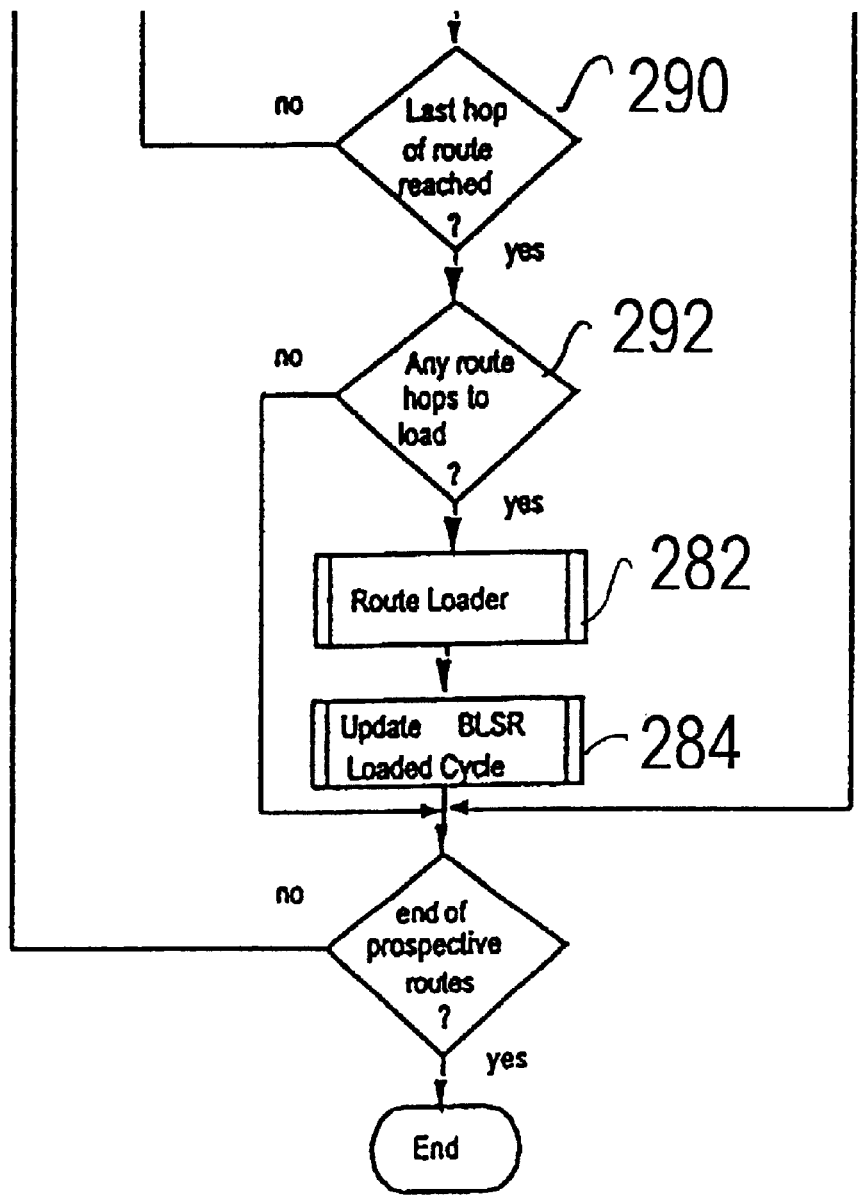
Figure 36:
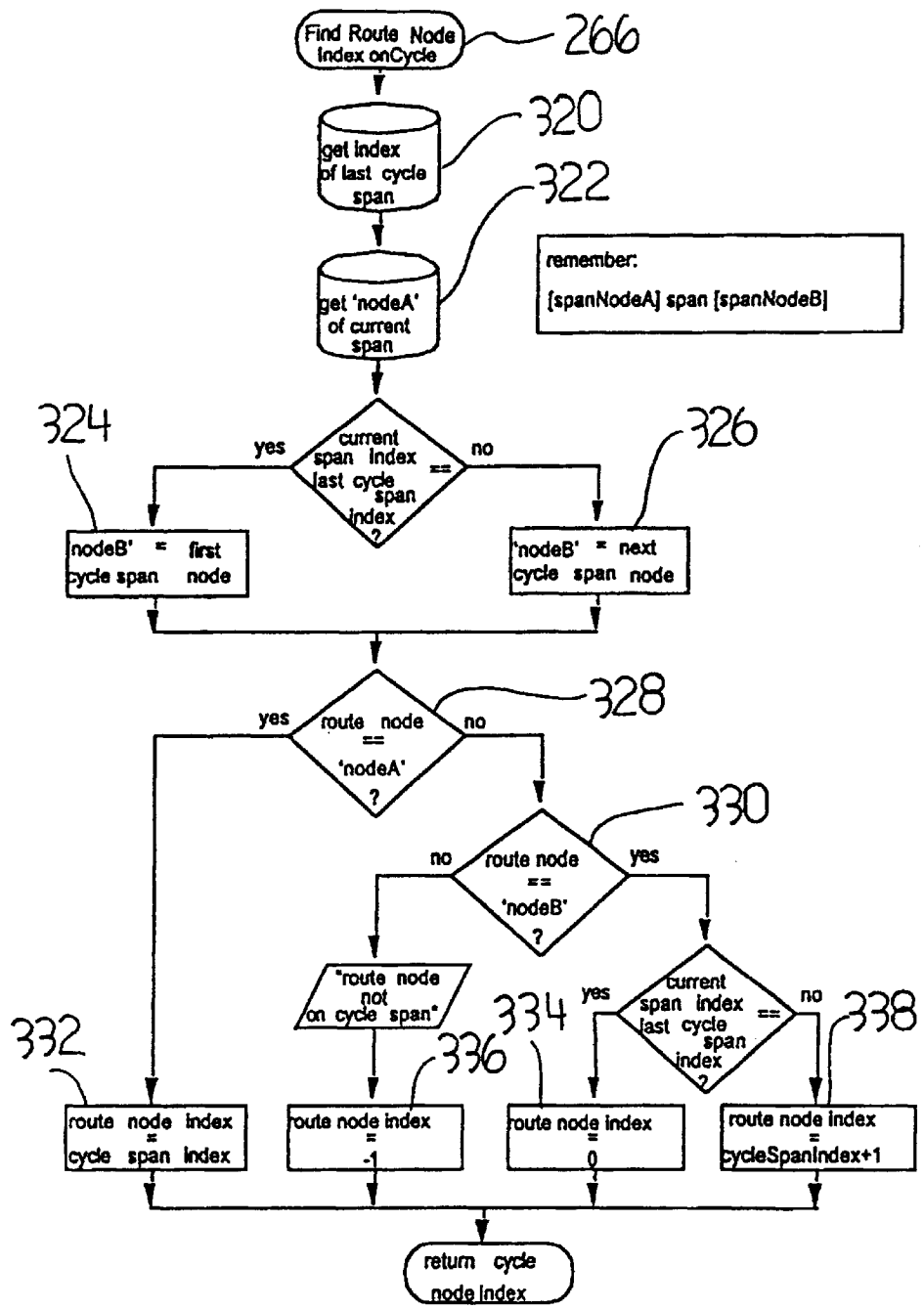
Figure 37A:
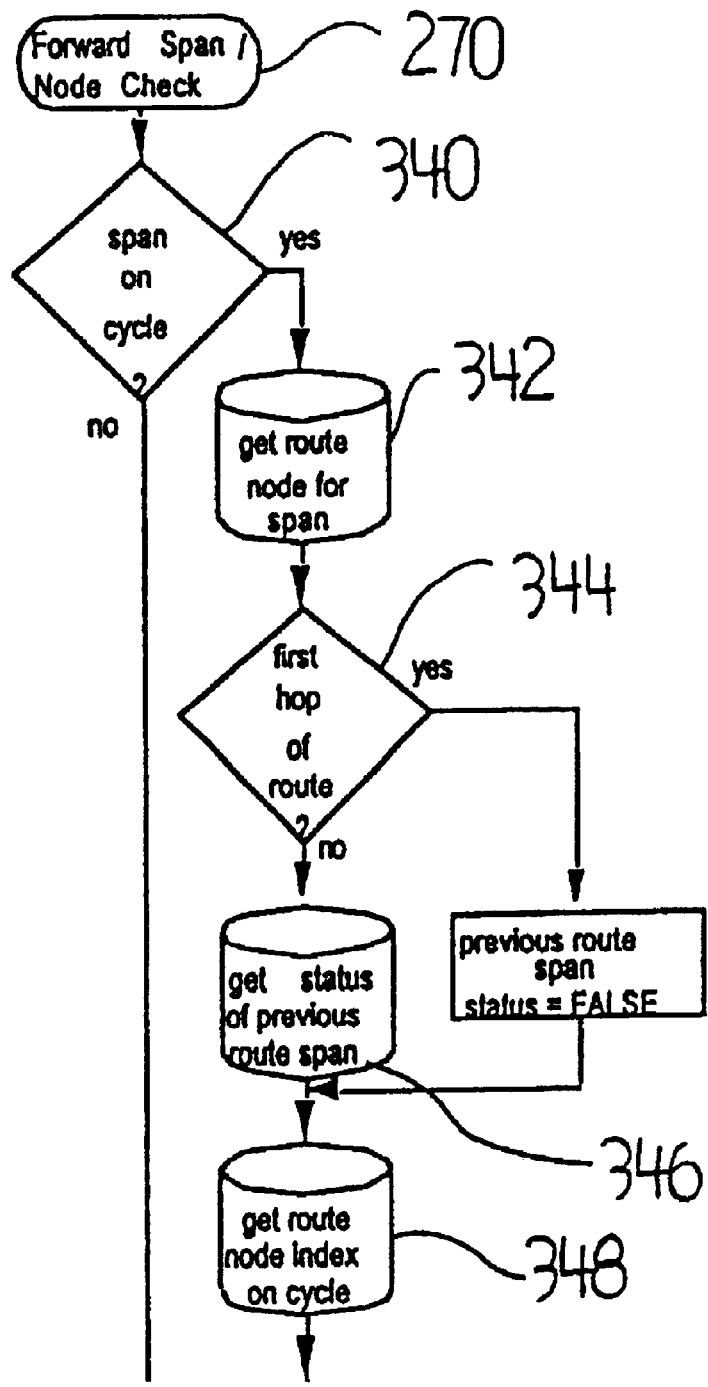
Figure 37B:
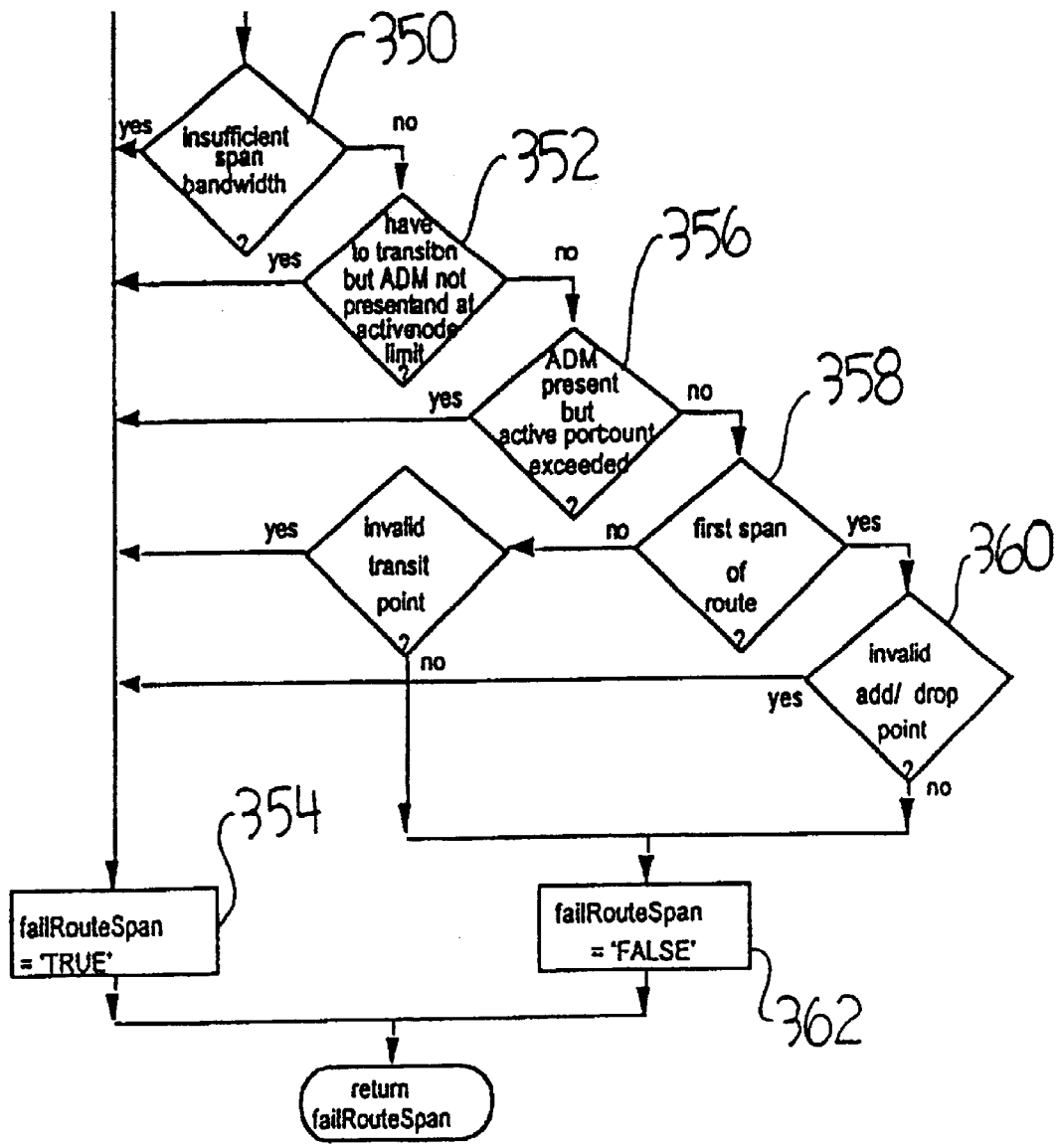
Figure 38A:
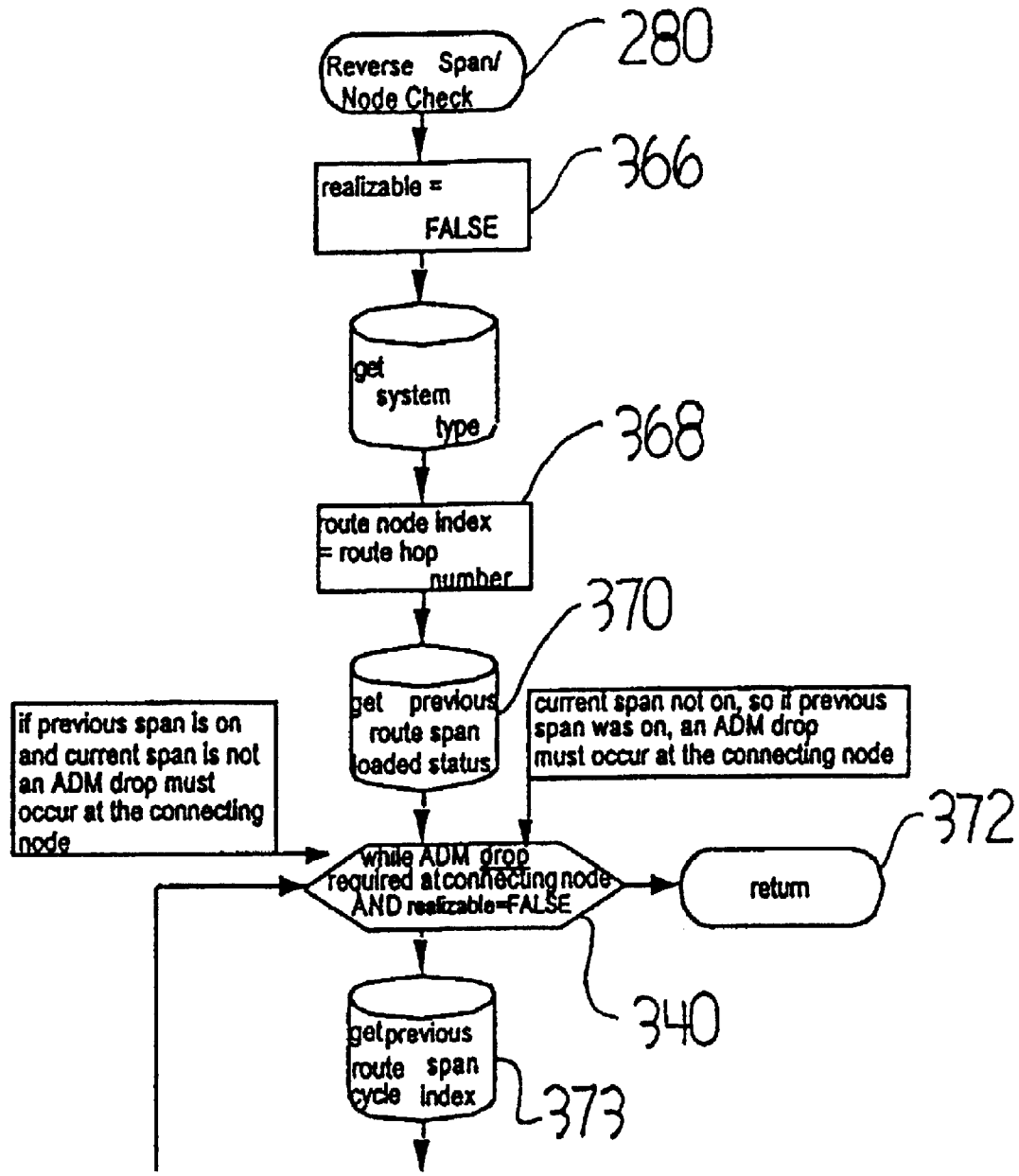
Figure 38B:
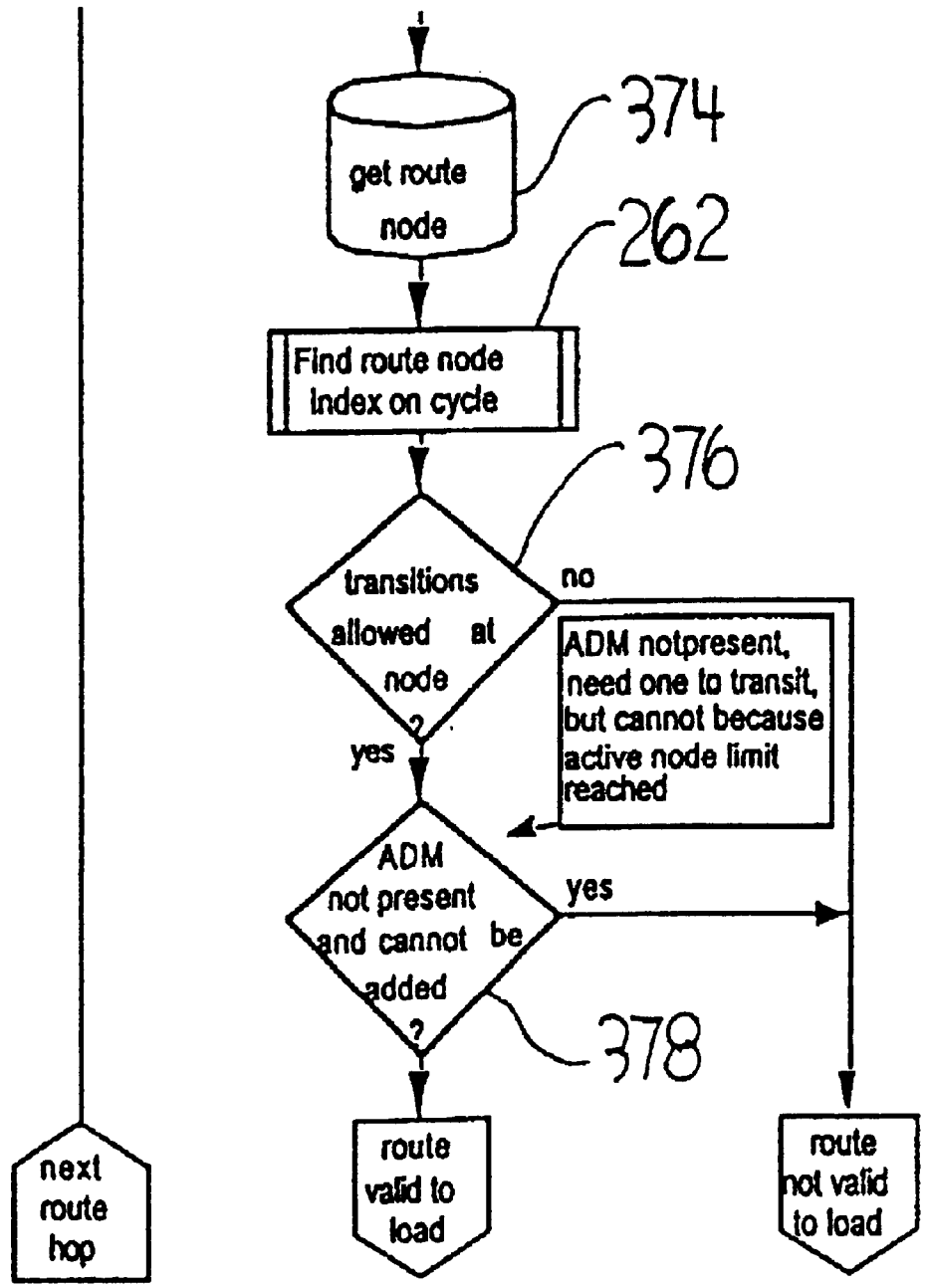
Figure 38C:
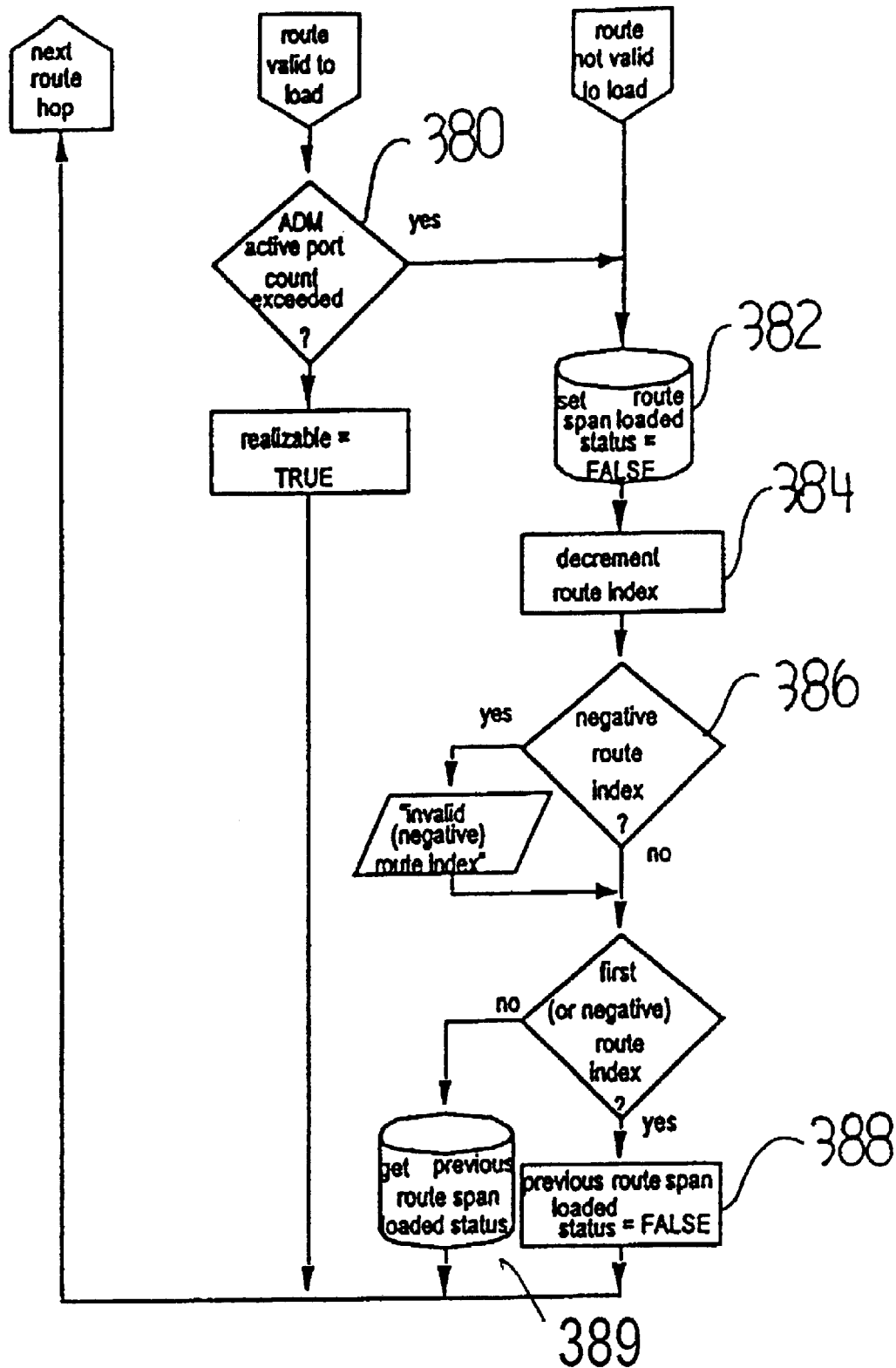
Figure 39A:
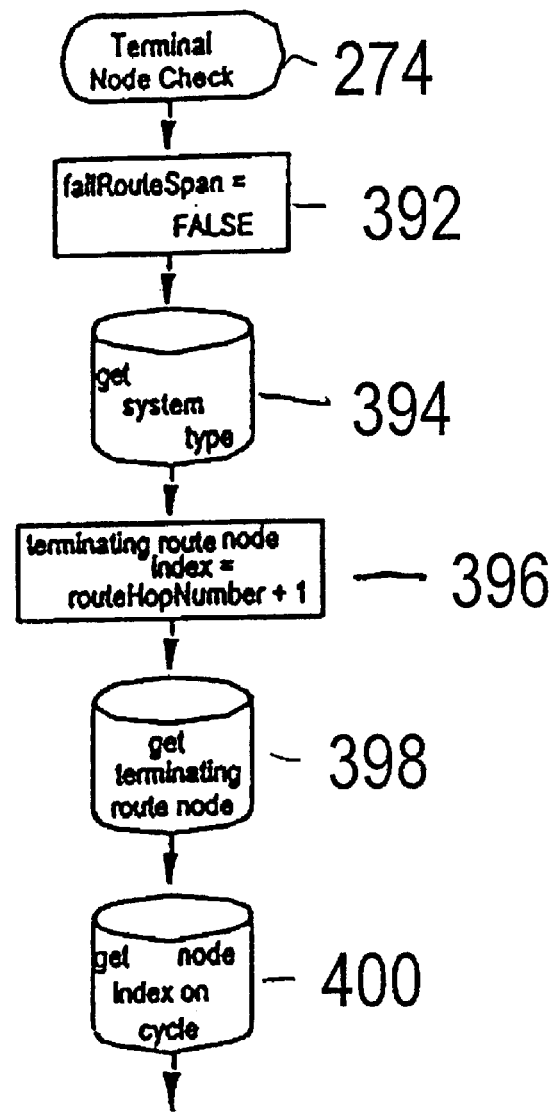
Figure 39B:
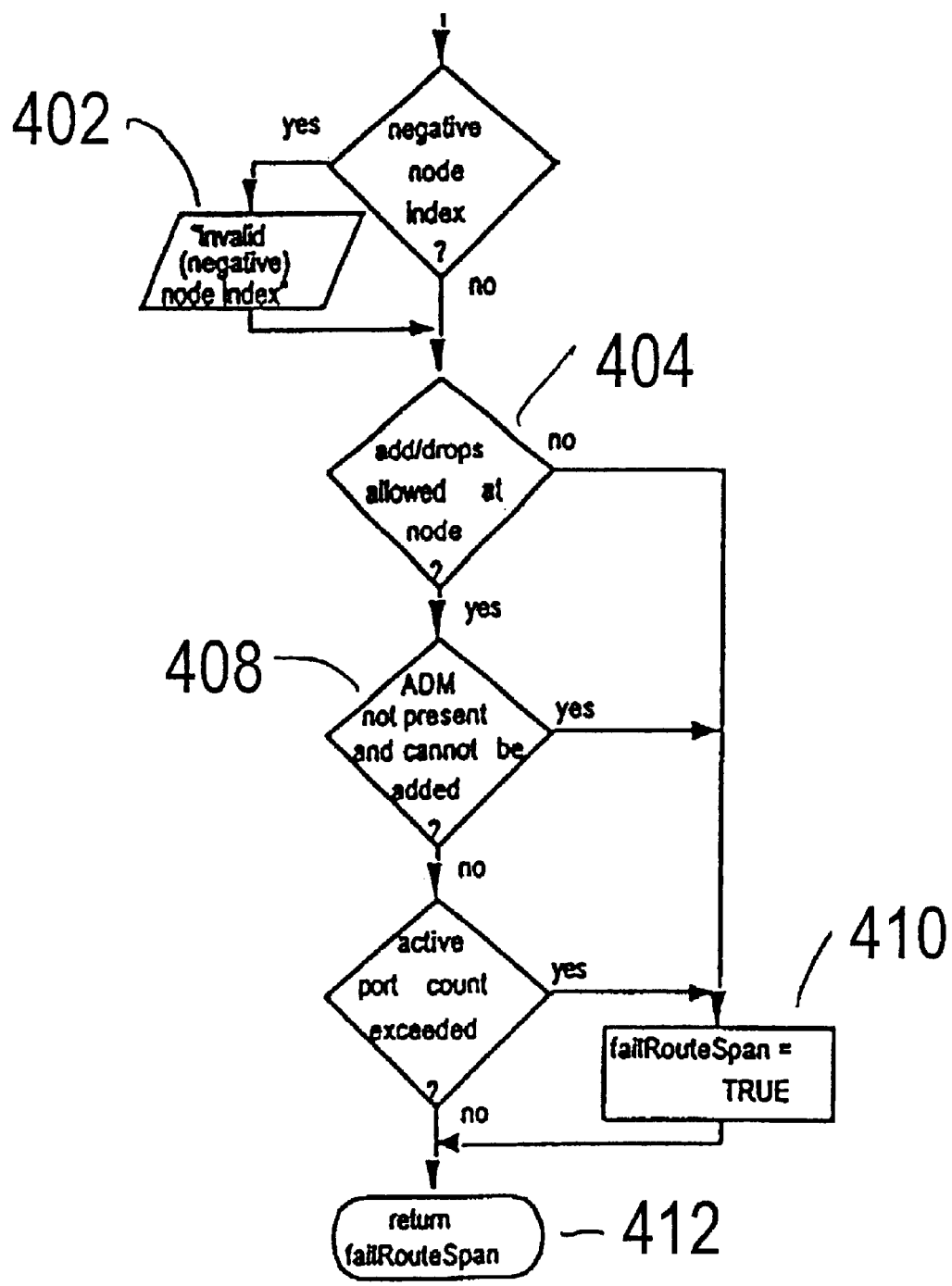
Figure 40A:
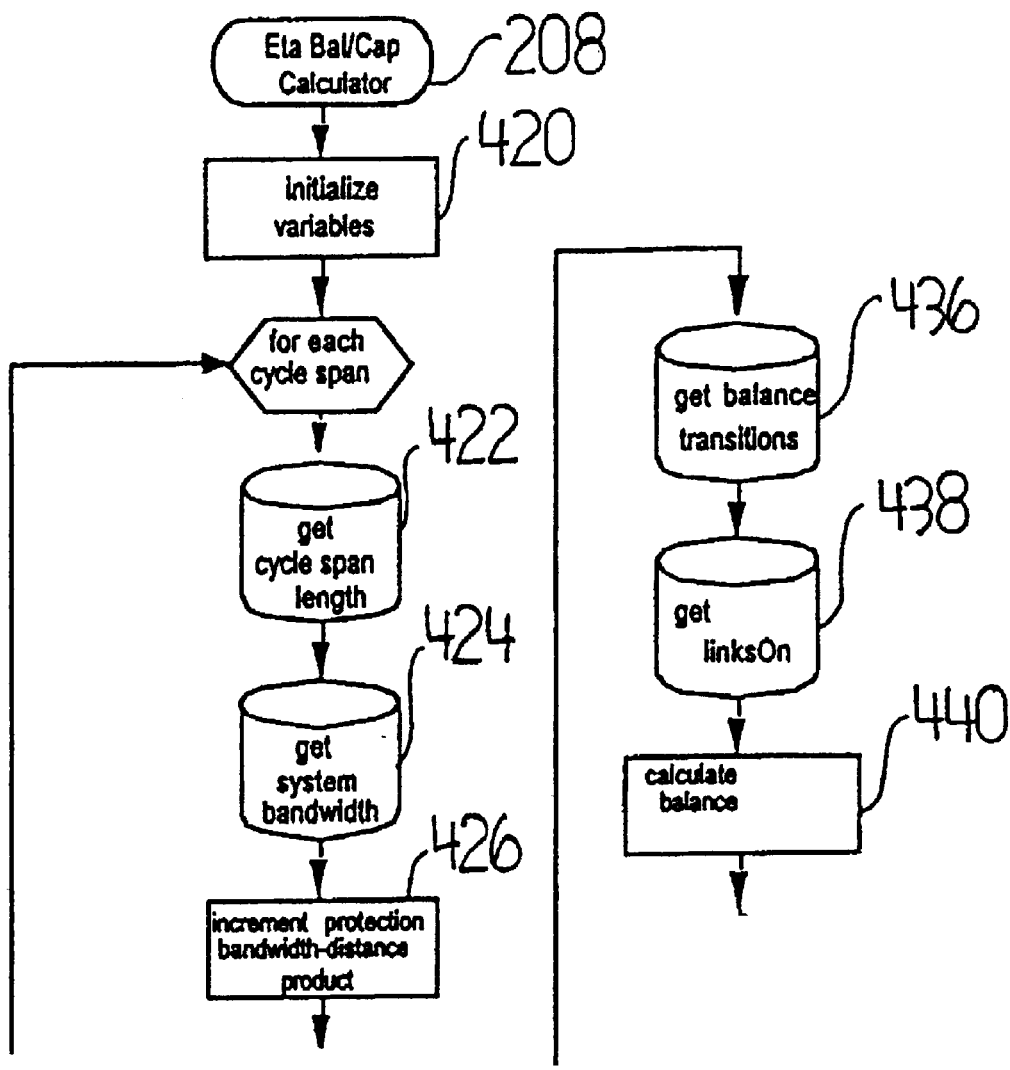
Figure 40B:
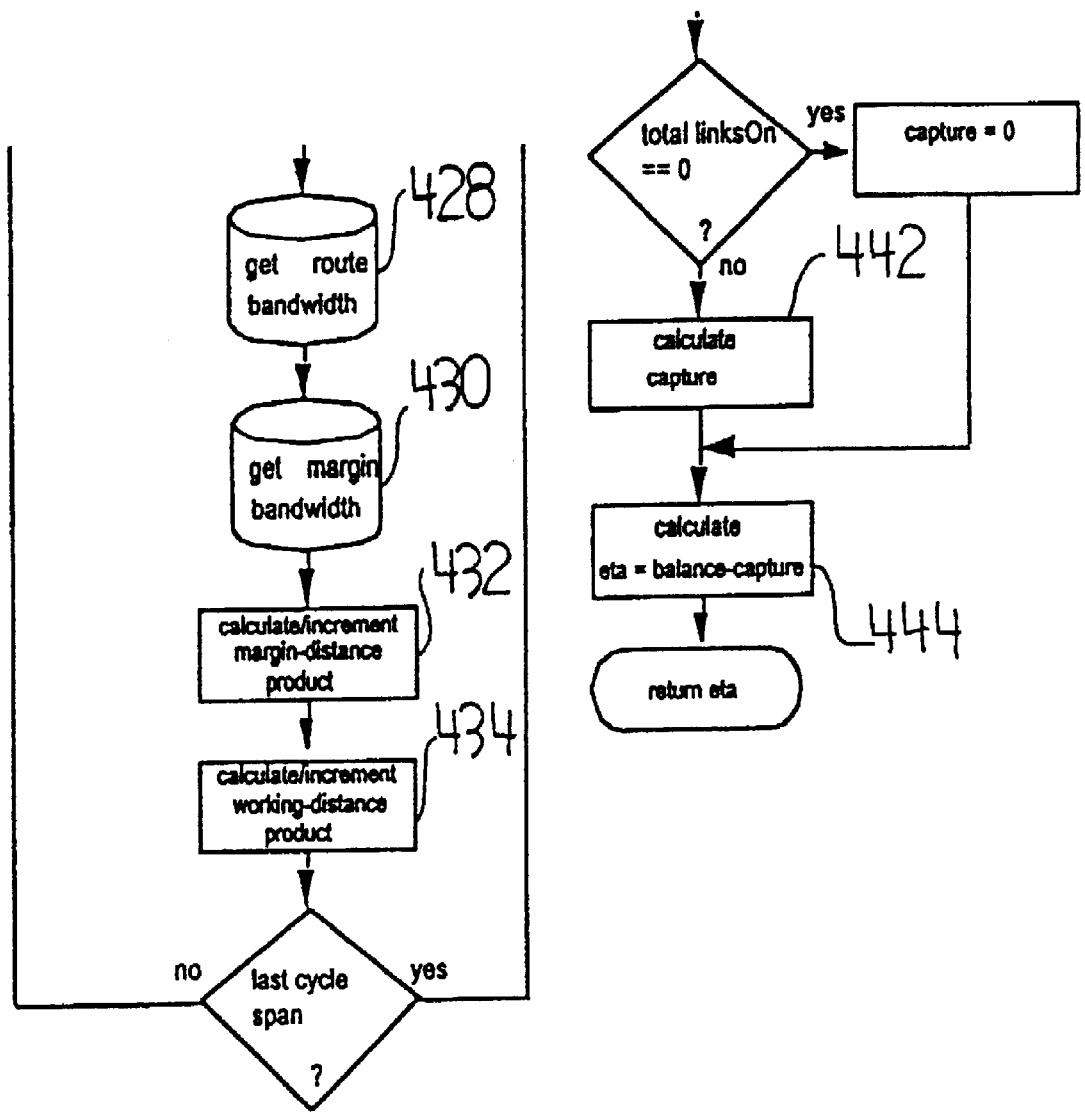
Figure 41A:
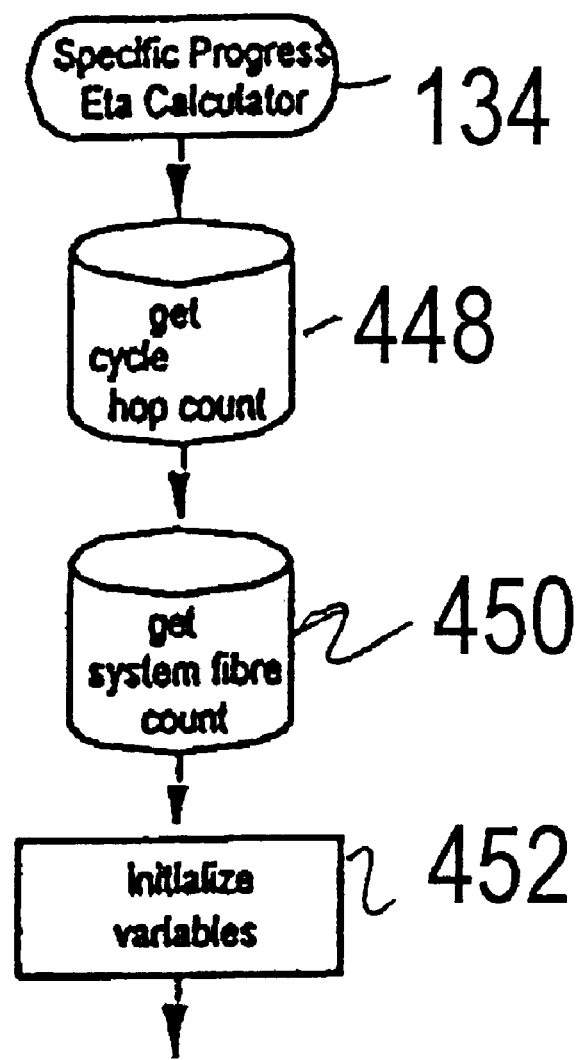
Figure 41B:
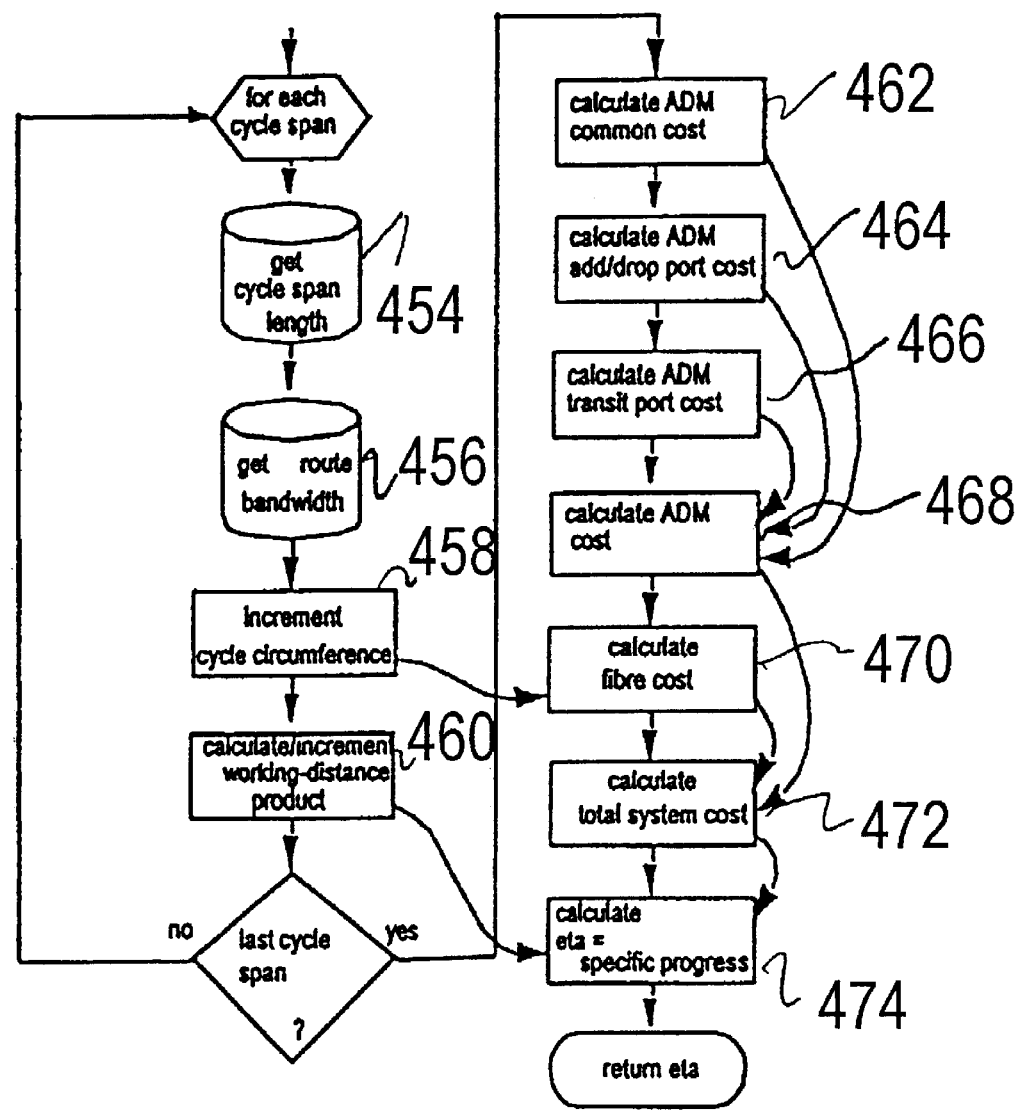
Figure 42A:
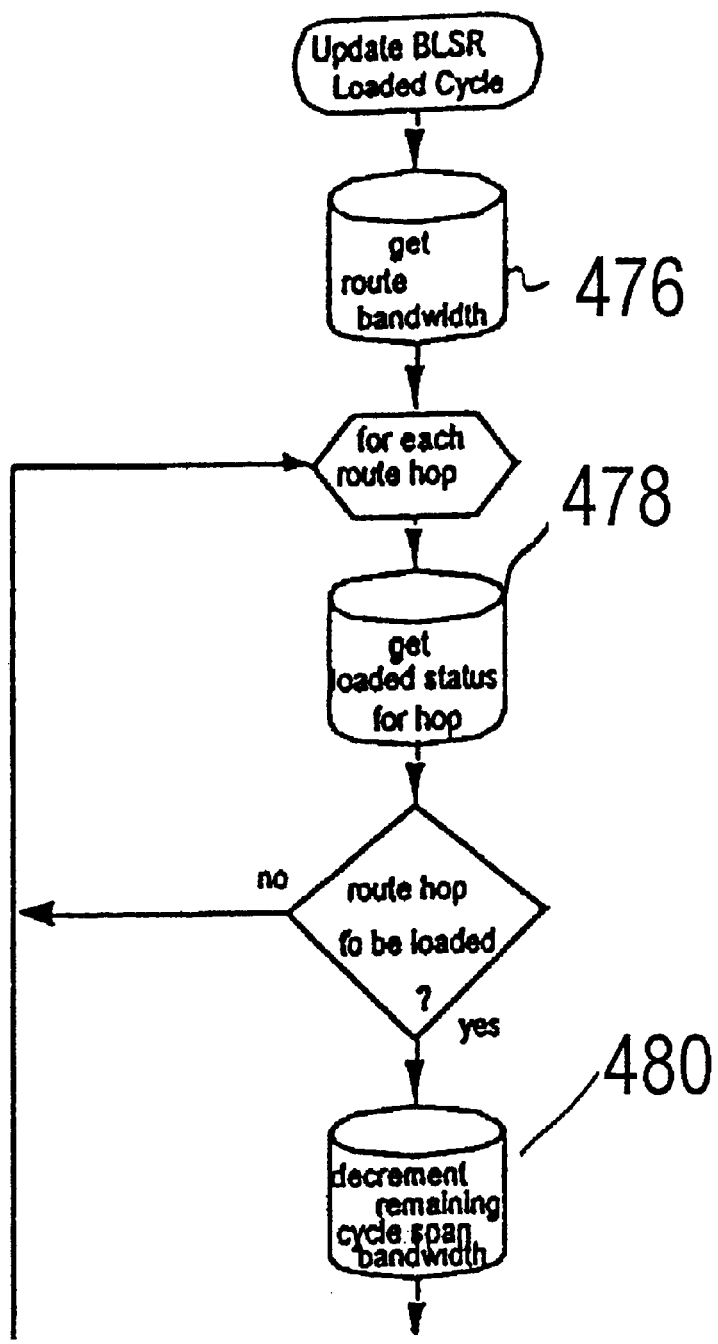
Figure 42B:
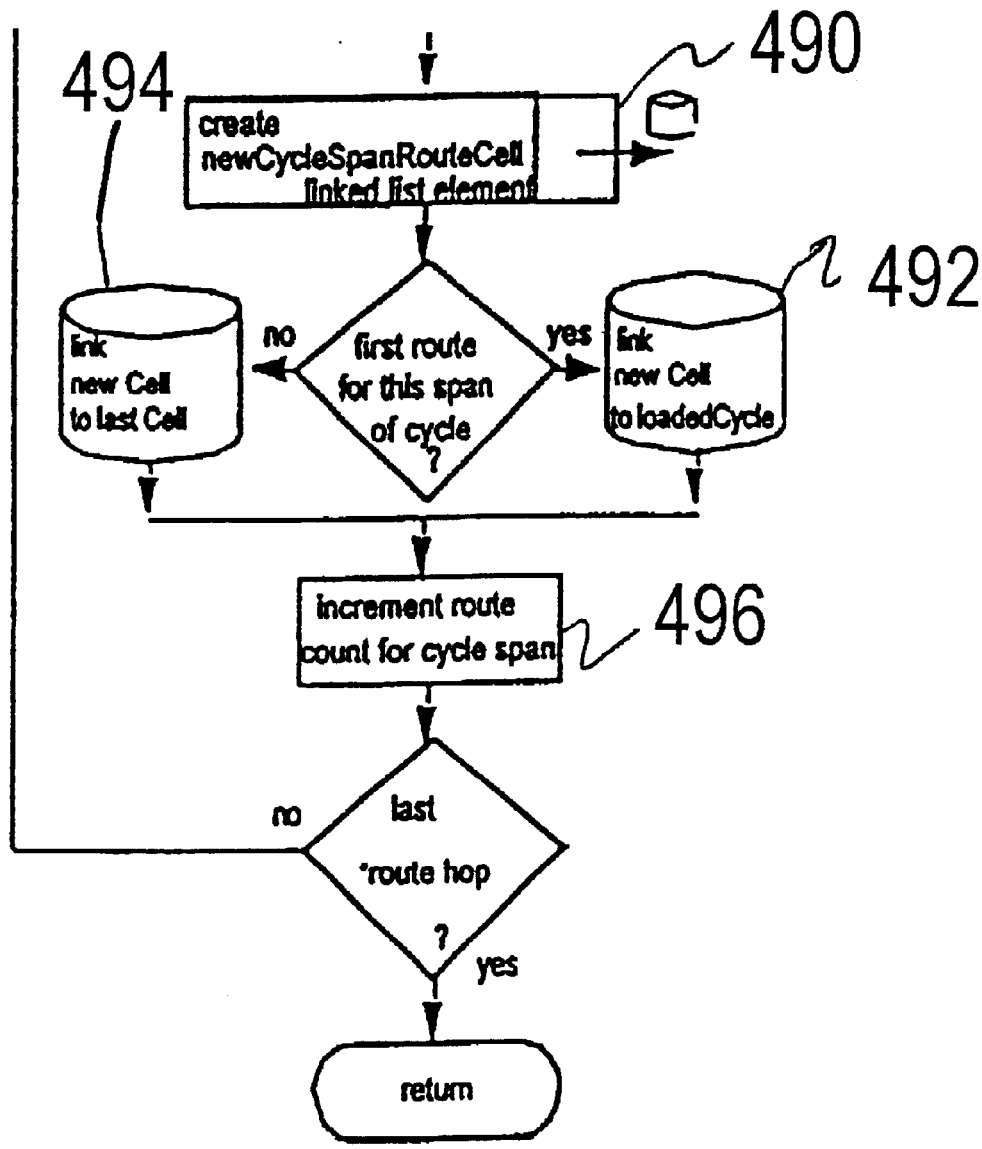
Figure 43:
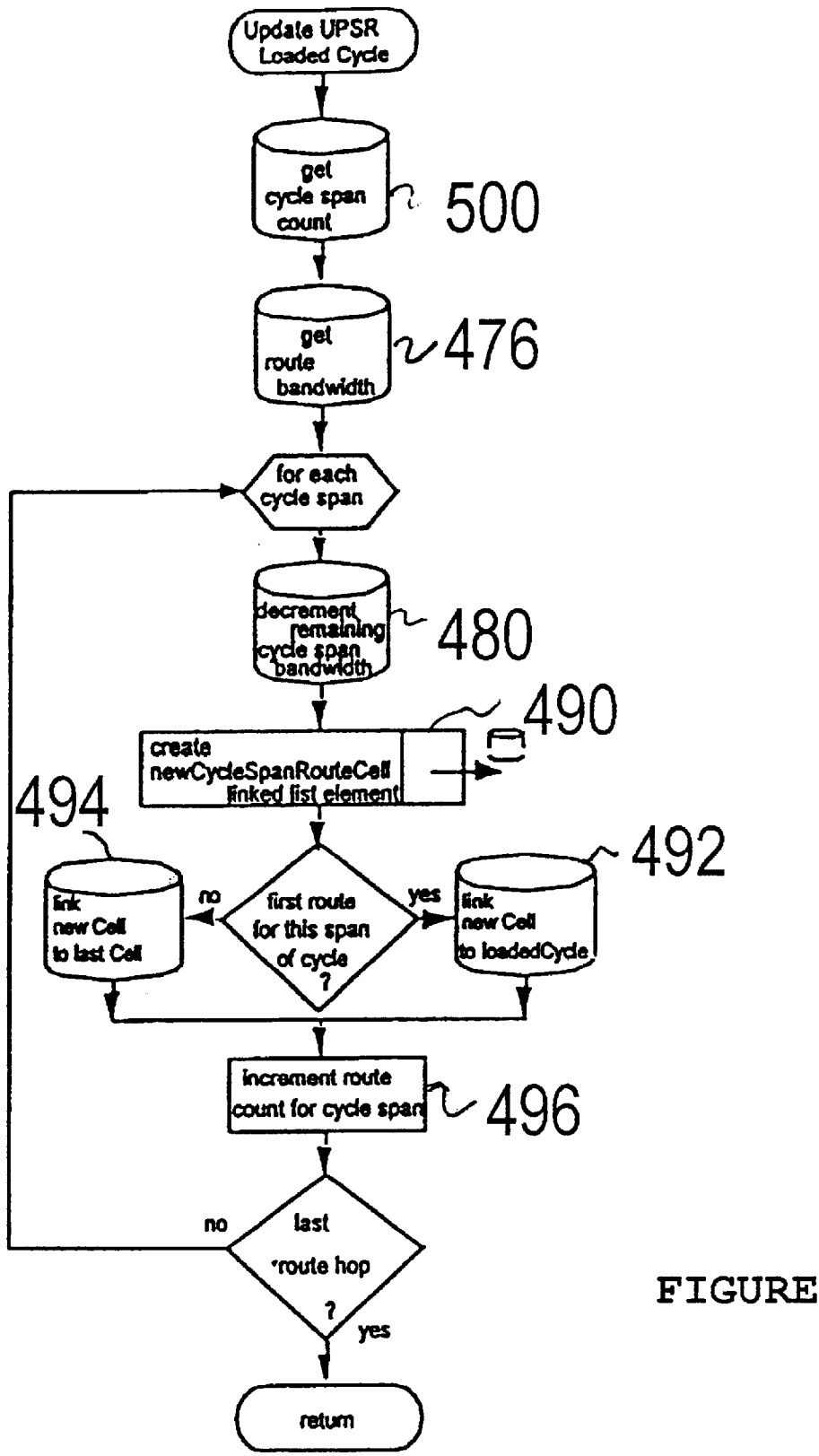
Figure 44A:
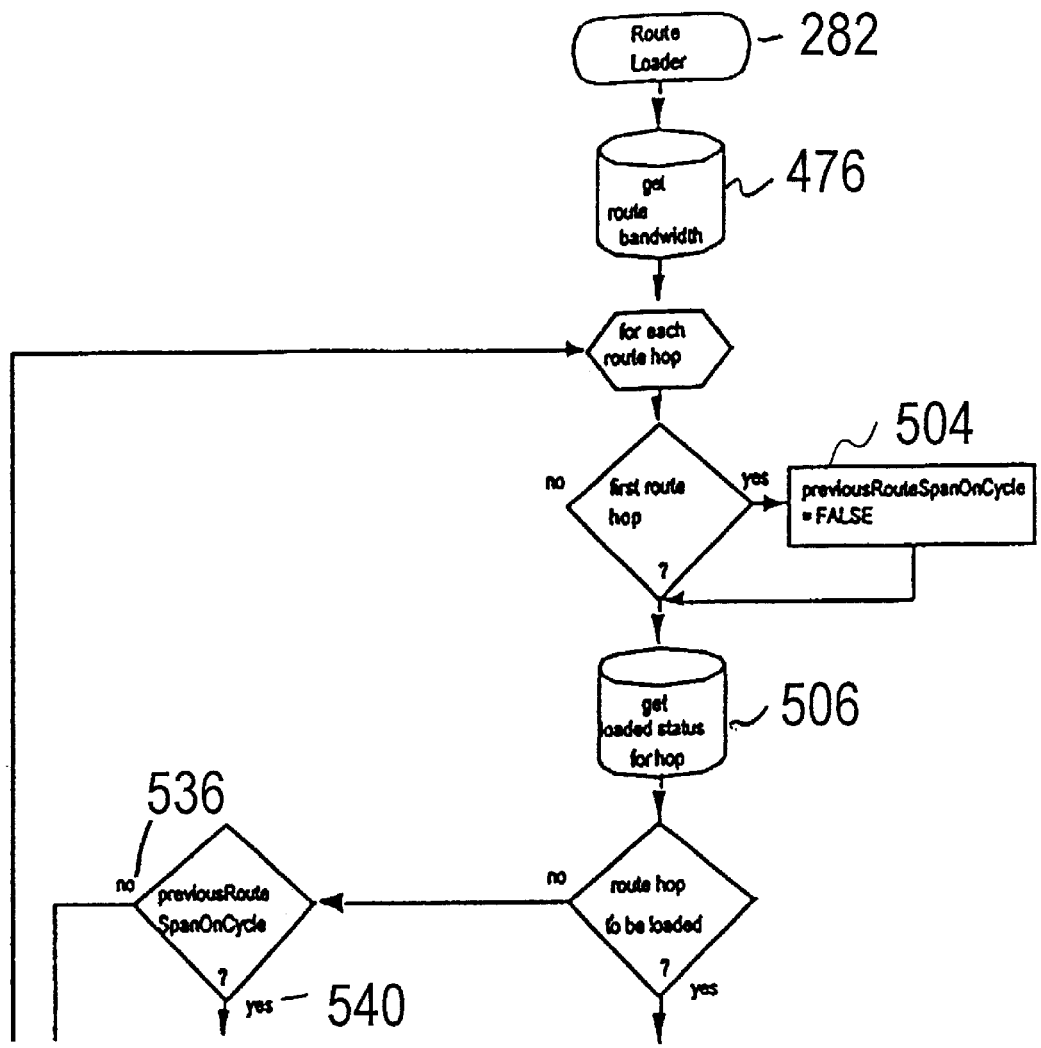
Figure 44B:
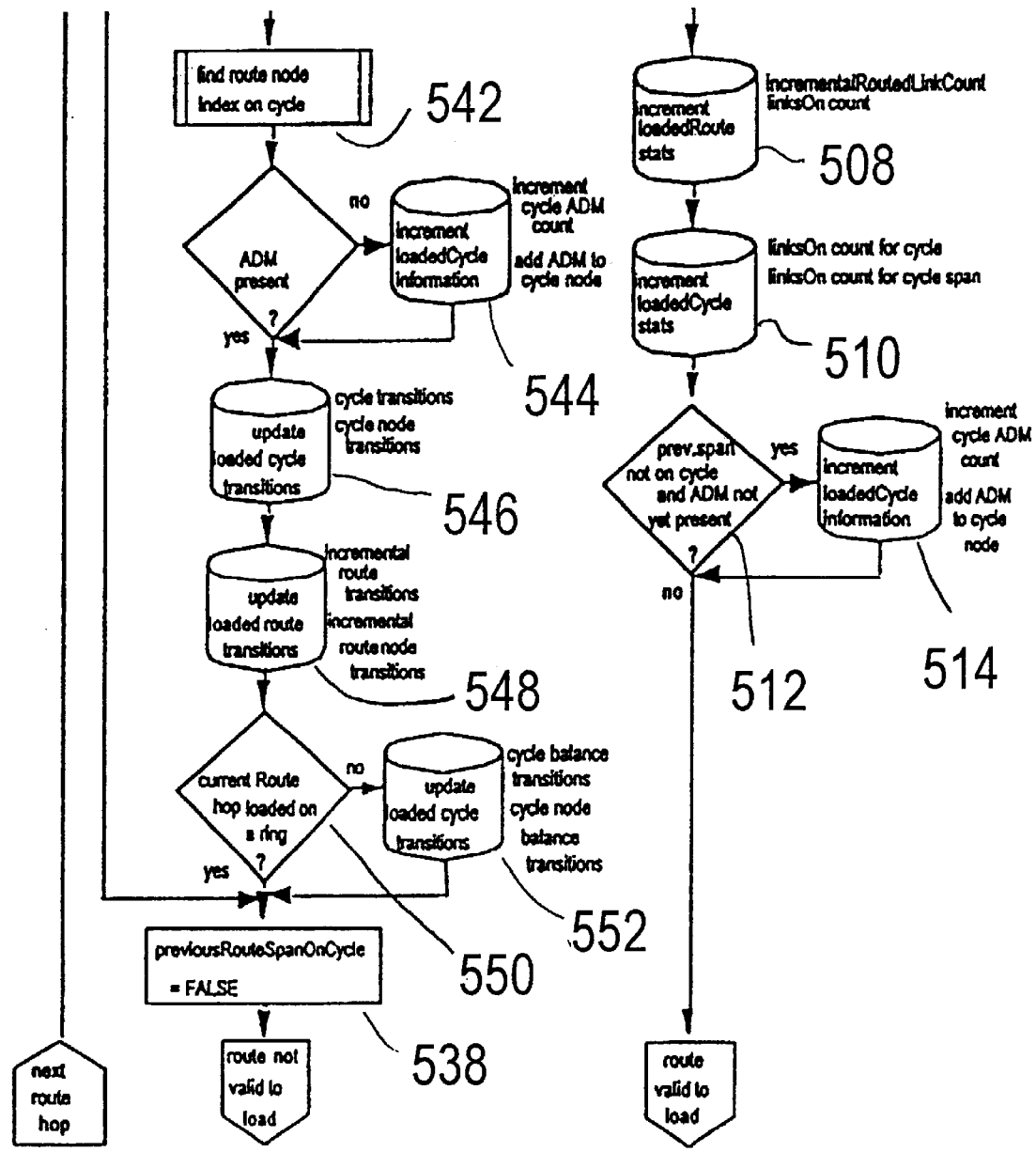
Figure 44C:
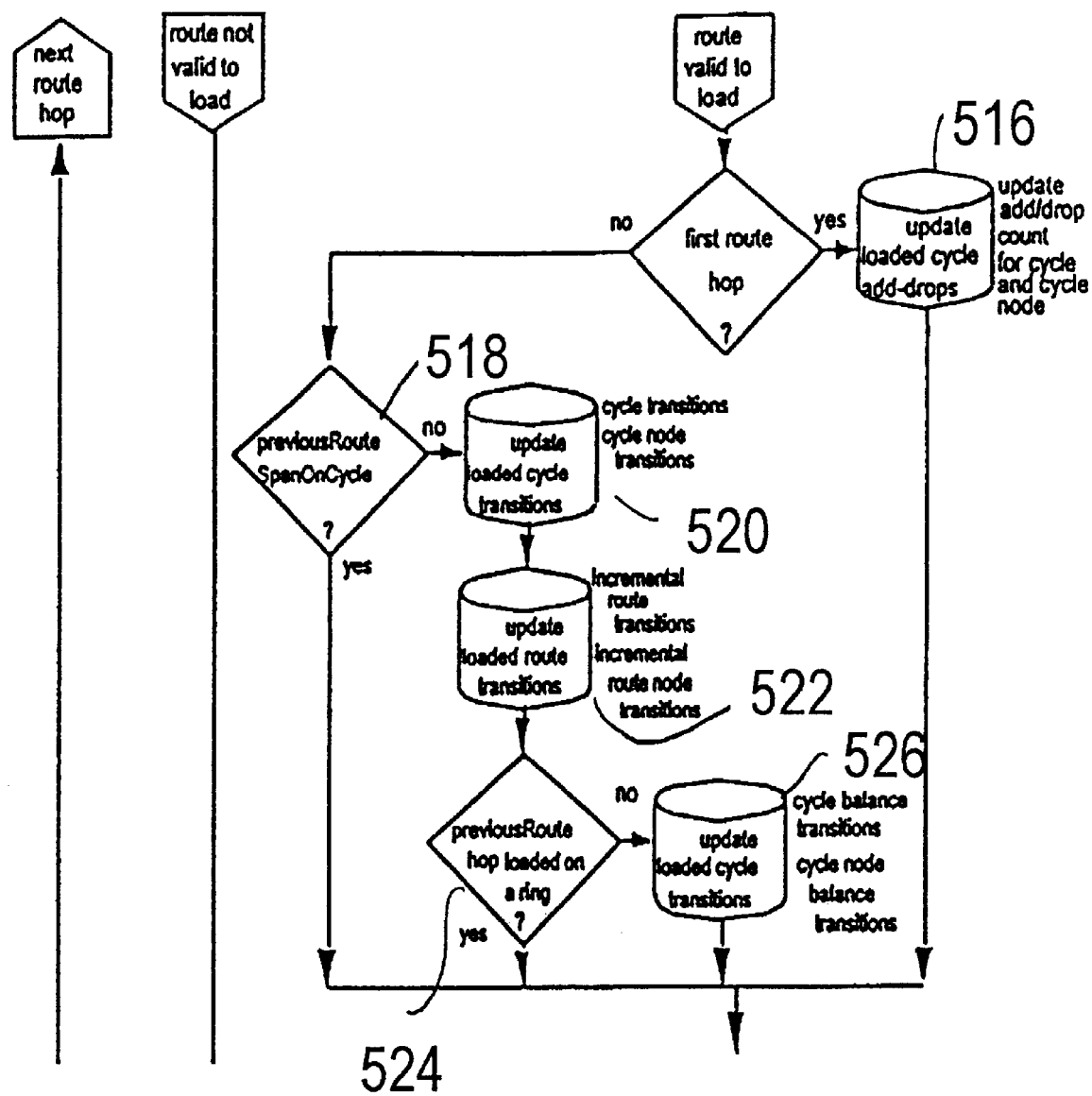
Figure 44D:
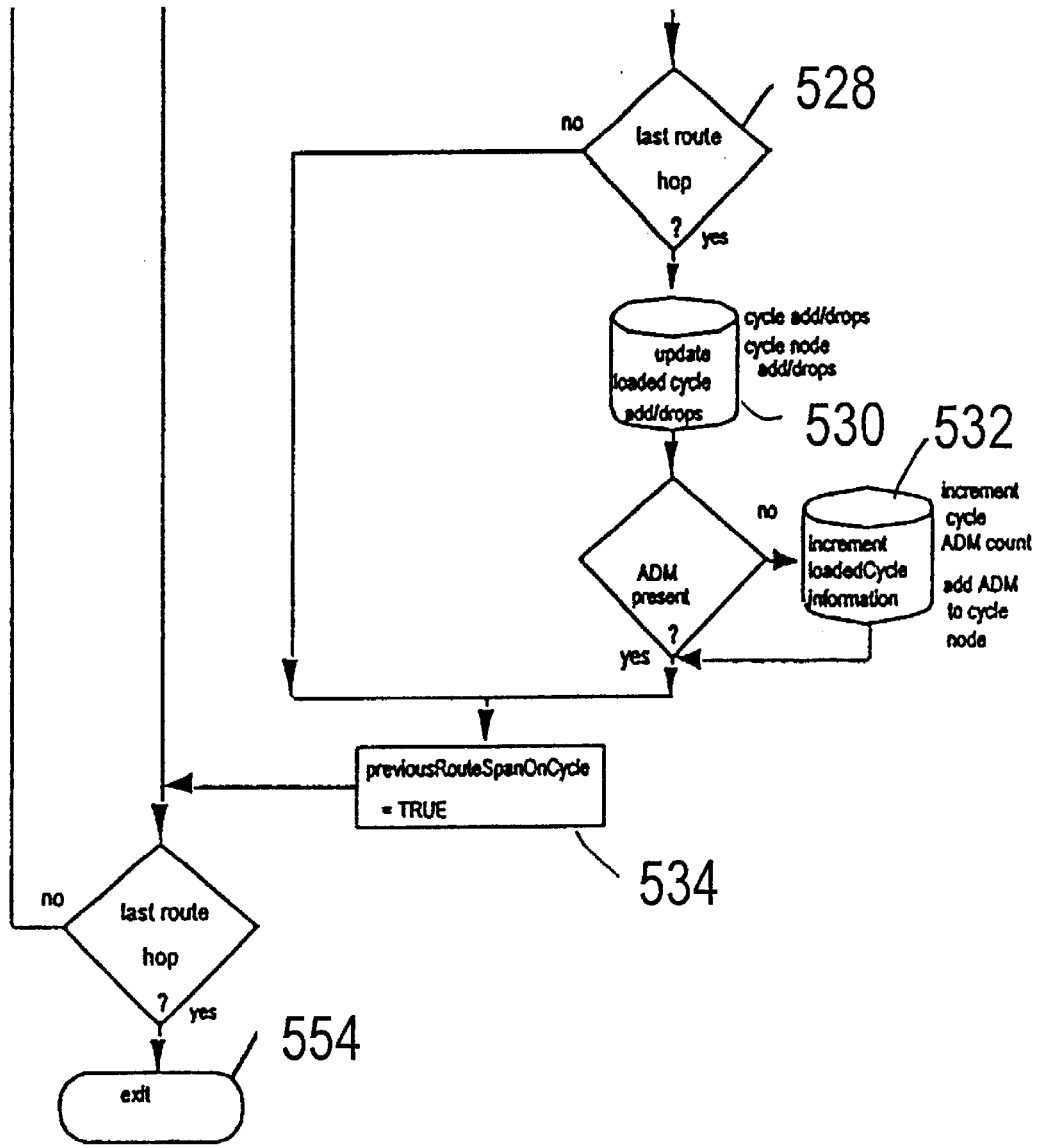
Figure 45A:
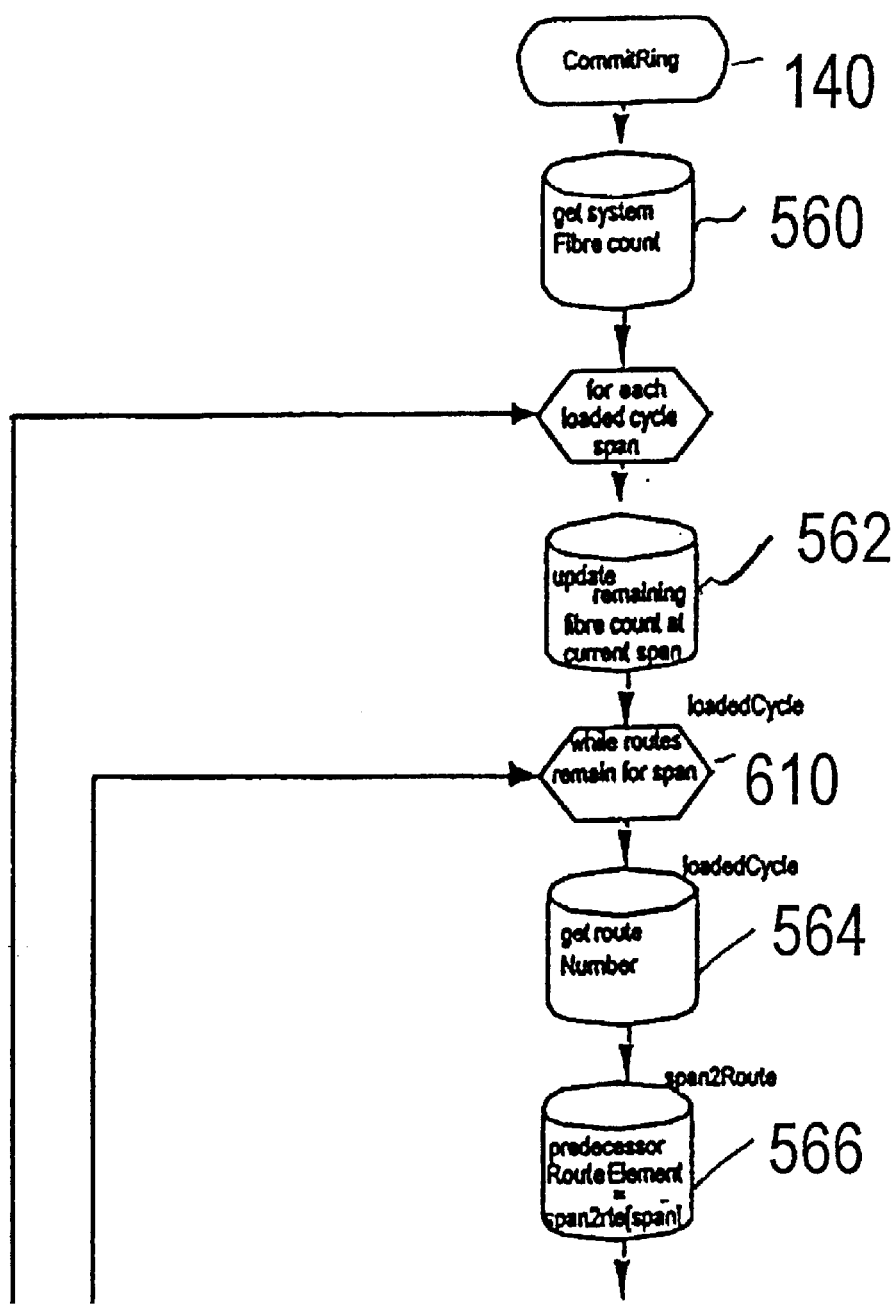
Figure 45B:
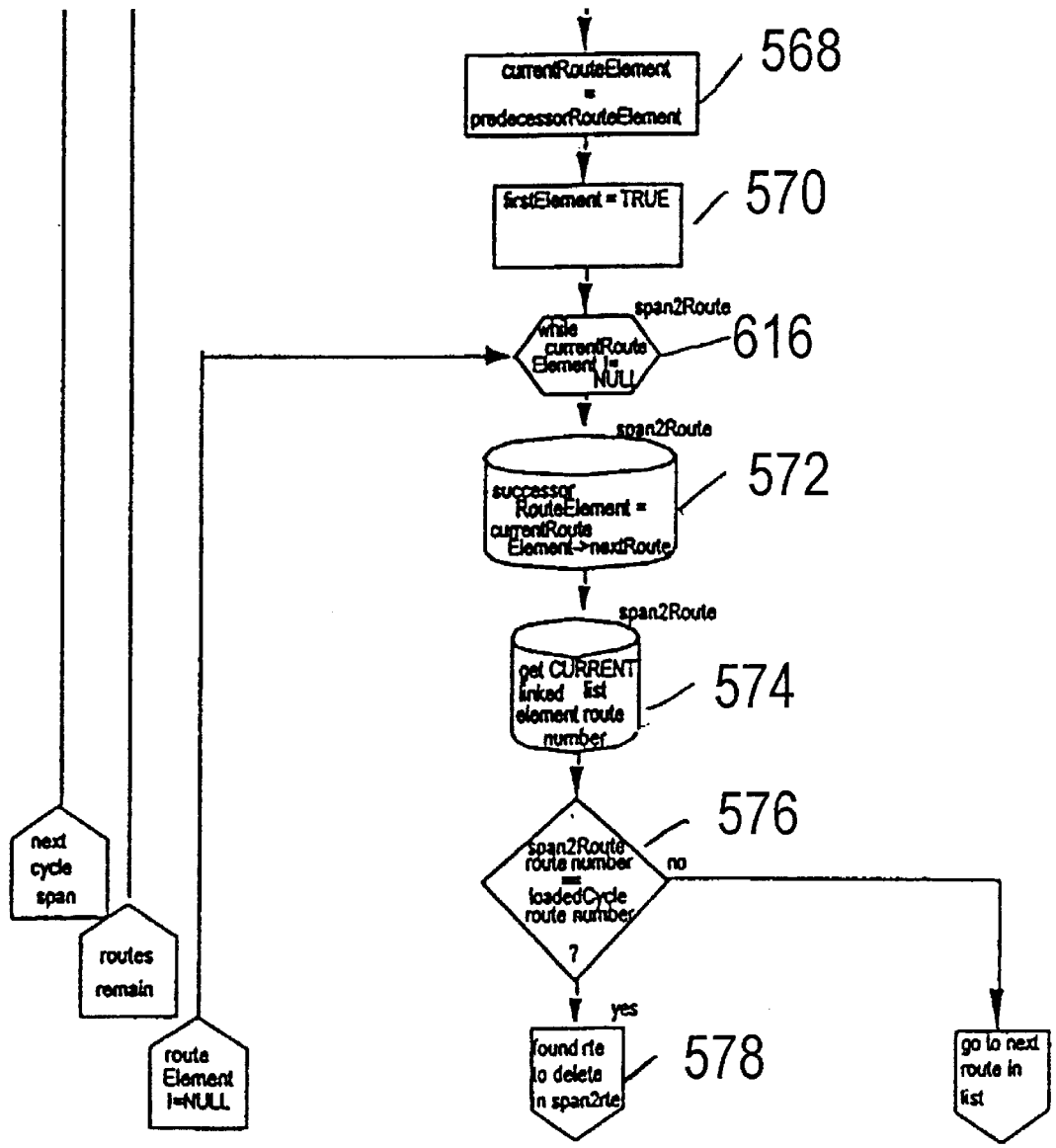
Figure 45C:
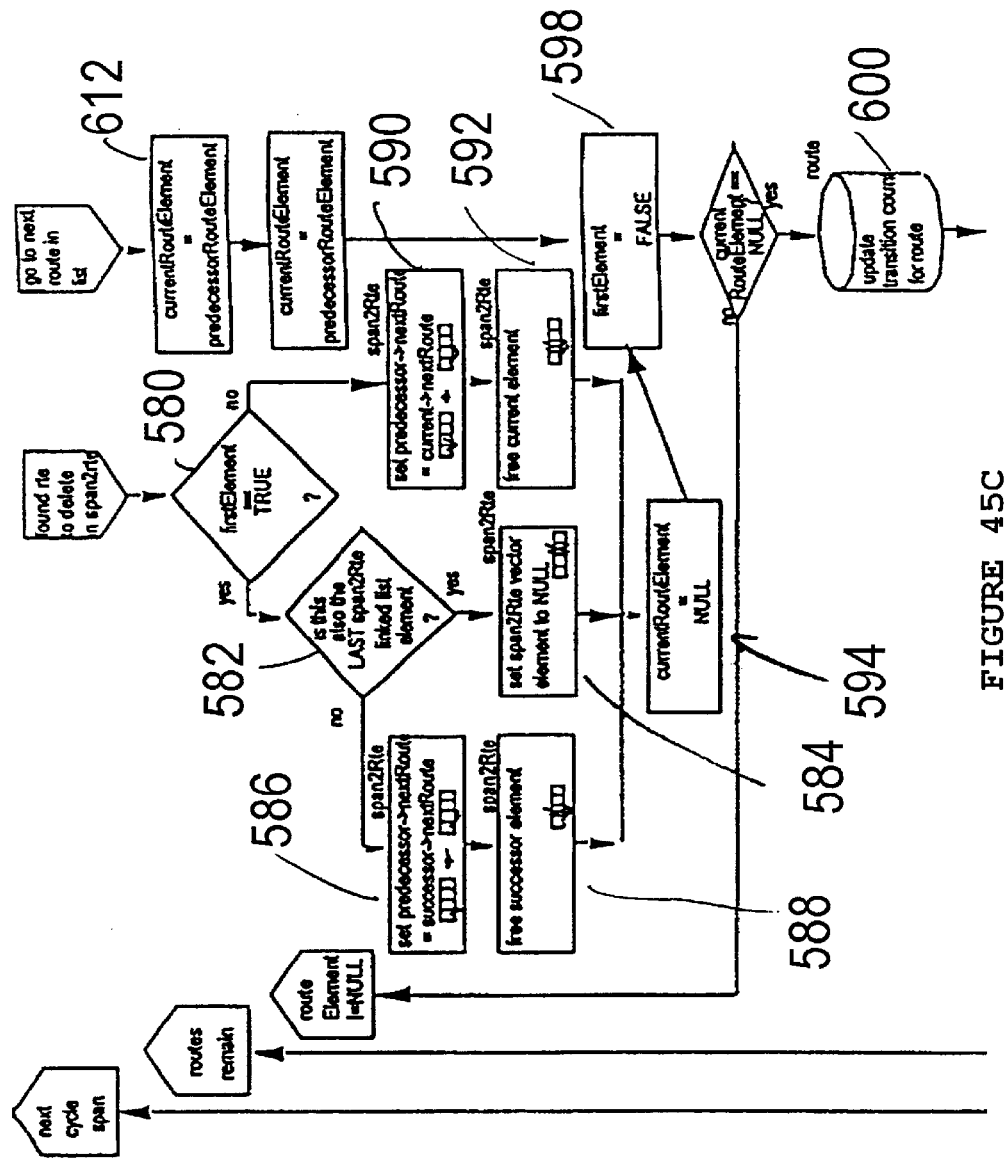
Figure 45D:
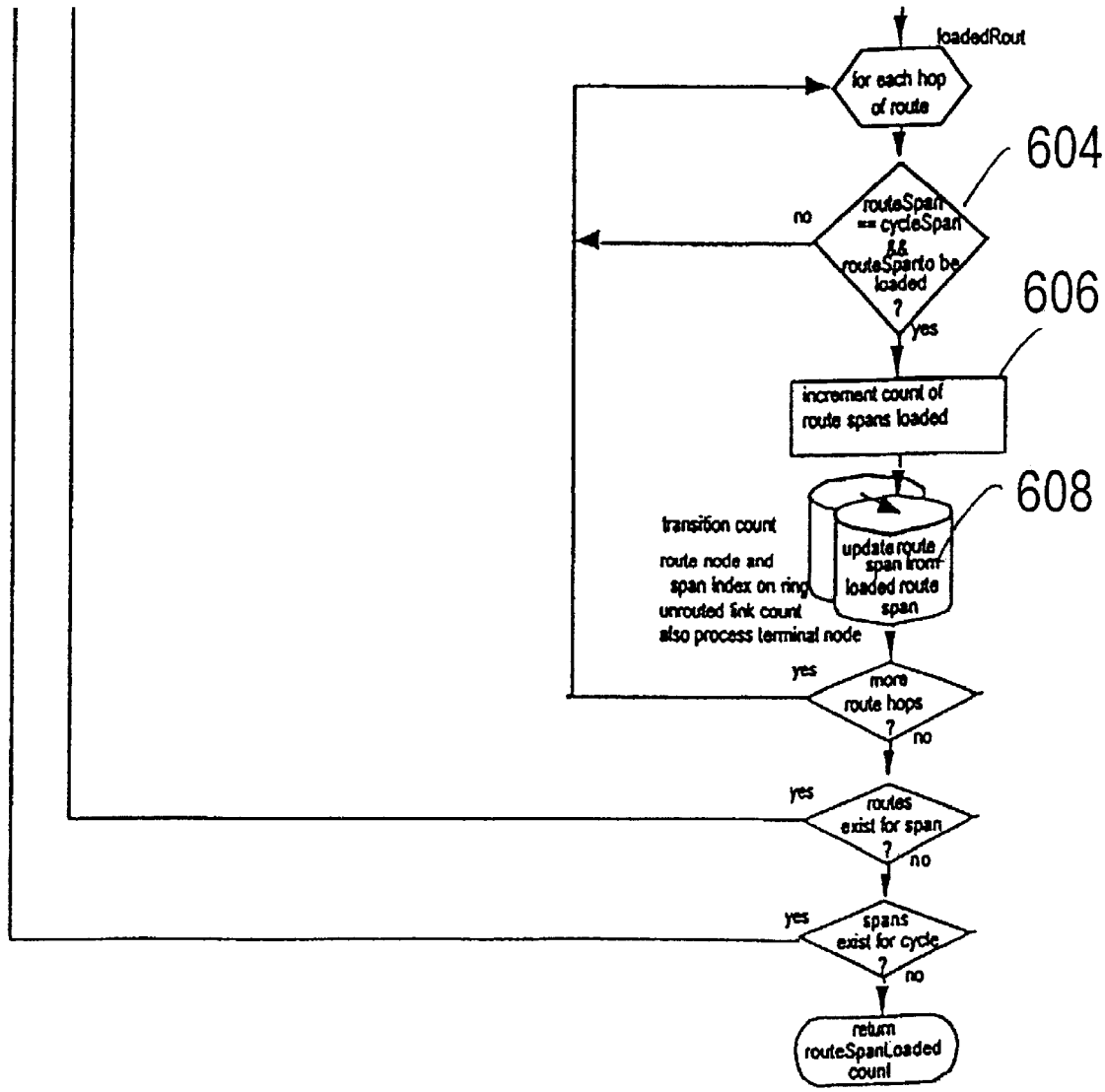

FIG. 27A provides a detailed view of the chooseRings block in RingBuilder™;

FIG. 27B provides a detailed view of the chooseRings block in RingBuilder™;

FIG. 27C provides a detailed view of the chooseRings block in RingBuilder™;

FIG. 28 shows RingBuilder™'s module cycleSpanConstraintTest;

FIG. 29 shows RingBuilder™'s getRoutes function;

FIG. 30 shows RingBuilder™'s RouteSort function;

FIG. 31 shows RingBuilder™'s routeCompare function;

FIG. 32 shows RingBuilder™'s RouteCompareComplex routine;

FIG. 33A shows RingBuilder™'s process flow for the BLSR balance type cycle loader;

FIG. 33B shows RingBuilder™'s process flow for the BLSR balance type cycle loader;

FIG. 33C shows RingBuilder™'s process flow for the BLSR balance type cycle loader;

FIG. 34A shows RingBuilder™'s process flow for the UPSR cycle loader;

FIG. 34B shows RingBuilder™'s process flow for the UPSR cycle loader;

FIG. 34C shows RingBuilder™'s process flow for the UPSR cycle loader;

FIG. 34D shows RingBuilder™'s process flow for the UPSR cycle loader;

FIG. 35A shows RingBuilder™'s process flow for the BLSR capture cycle loader;

FIG. 35B shows RingBuilder™'s process flow for the BLSR capture cycle loader;

FIG. 35C shows RingBuilder™'s process flow for the BLSR capture cycle loader;

FIG. 35D shows RingBuilder™'s process flow for the BLSR capture cycle loader;

FIG. 36 shows the structure of RingBuilder™'s FindRouteNodeIndexOnCycle function;

FIG. 37A shows the structure of RingBuilder™s ForwardSpanNodeCheck function;

FIG. 37B shows the structure of RingBuilder™'s ForwardSpanNodeCheck function;

FIG. 38A illustrates RingBuilder™'s ReverseSpanNodeCheck function;

FIG. 38B illustrates RingBuilder™'s ReverseSpanNodeCheck function;

FIG. 38C illustrates RingBuilder™'s ReverseSpanNodeCheck function;

FIG. 39A illustrates RingBuilder™'s TerminalNodeCheck function;

FIG. 39B illustrates RingBuilder™'s TerminalNodeCheck function;

FIG. 40A illustrates RingBuilder™'s balance-capture eta calculator;

FIG. 40B illustrates RingBuilder™'s balance-capture eta calculator;

FIG. 41A illustrates RingBuilder™'s specific progress ETA calculator;

FIG. 41B illustrates RingBuilder™'s specific progress ETA calculator;

FIG. 42A illustrates RingBuilder™'s BLSR Loaded Cycle routine;

FIG. 42B illustrates RingBuilder™'s BLSR Loaded Cycle routine;

FIG. 43 illustrates RingBuilder™'s Update UPSR Loaded Cycle;

FIG. 44A shows RingBuilder™'s Route Loader routine;

FIG. 44B shows RingBuilder™'s Route Loader routine;

FIG. 44C shows RingBuilder™'s Route Loader routine;

FIG. 44D shows RingBuilder™'s Route Loader routine;

FIG. 45A shows RingBuilder™'s Commit Ring routine;

FIG. 45B shows RingBuilder™'s Commit Ring routine;

FIG. 45C shows RingBuilder™'s Commit Ring routine;

FIG. 45D shows RingBuilder™'s Commit Ring routine;

FIG. 46 shows characteristics of the investigated networks;

FIG. 47 shows a summary of SCIP results following MAPR;

FIG. 48 shows RingBuilder™'s route data structures

FIG. 49 shows RingBuilder™'s basic cycle structure;

FIG. 50 shows RingBuilder™'s loadedRoute structure; and

FIG. 51 shows RingBuilder™'s loadedcycle structure.

DETAILED DESCRIPTION OF THE PREFERRED EMBODIMENT

In this patent document, "comprising" means "including". In addition, a reference to an element by the indefinite article "a" does not exclude the possibility that more than one of the element is present. A nodal switching device is a device that forms a node in a network and that is capable of creating connections between spans meeting at the node. A nodal switching device, depending on the network, may be an ADM, digital cross-connect switch, router or other device used to connect and disconnect spans.

1. The Ringbuilder™ Design Method

A method for the optimization of ring placement is provided that uses a technique referred to as direct cost optimization via specific progress. Once a near optimal ring network design has been generated by the method of the invention, the ring network is physically implemented in the network. This may involve reconfiguring existing ADMs, DCSs, and other nodal switching devices, or removing or adding new nodal switching devices, spans or other physical devices in the network topology. The ring network implemented (formed) in the network, is the virtual network that has been produced by the method of the invention, and thus the method of the invention will form a novel telecommunications network that has a near optimal configuration.

Direct cost optimization via specific progress directly evaluates the cost of implementation relative to the amount of progress towards the goal of a complete design. Specific progress is a measure of the amount of progress towards design completion the ring system under evaluation contributes relative to the cost of implementing that system. Progress in this context is a measurement of the amount of demand carried, based on the premise that the larger the amount of demand carried, the less that remains, and hence the fewer number of systems left to place. This is based on the fairly strong practical consideration that if fewer systems are required to form a complete network design, then the network design will be more efficient and lower in cost, as each individual system in that design will be more highly utilized. Progress is measured in terms of the sum of the routed band-width-distance product of each of the demands carried by the system. The bandwidth-distance product is a measure of the transport system resource utilization of the demand as it is carried from source to destination. The cost of implementing the system is the cost of the individual components required to construct the system. These components include the fibre in the spans, as well as the terminal equipment present in the nodes of the network. The terminal equipment includes common equipment such as power supplies and equipment bays, as well as provisionable equipment like add/drop port cards and opto-electronic modules. Specific-cost is a technology-independent way to compare ring system. It has the advantage over balance vs. capture optimization in that rings of different technology types can be compared. Specific progress is summarized in FIG. 2.

Figure 2:
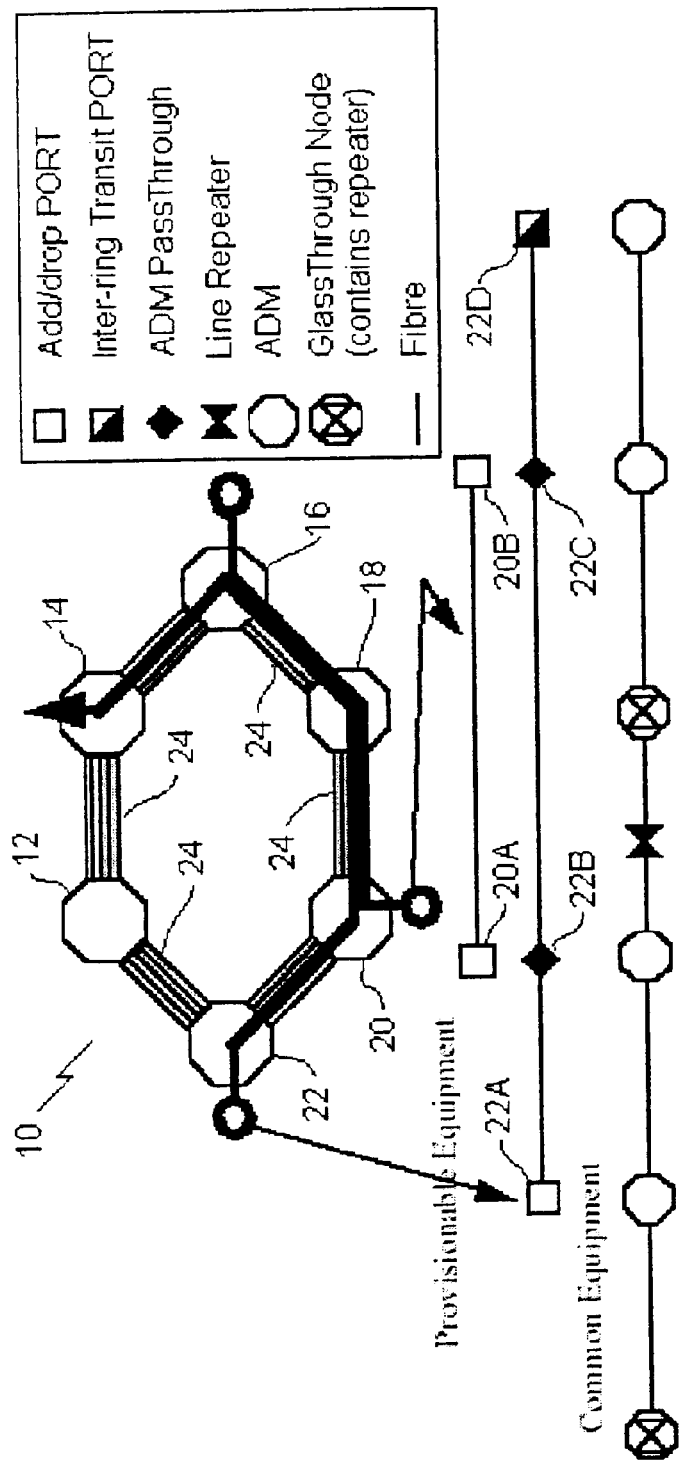
FIG. 2 is a combination schematic/flow chart of specific progress.

In FIG. 2, a ring 10 is shown formed of a glassthrough node 12, including repeater, a node 14 with an add-drop multiplexer (ADM), an ADM node 16, a glassthrough node 18, an ADM node 20 and an ADM node 22. As illustrated in the diagram, node 20 has a pair of connected add/drop ports 20A, 20B, as provisionable equipment, node 22 has a first add/drop port 22A, a pair of ADM passthroughs 22B, 22C and an inter-ring transit port 22D. The equipment illustrated here in ring 10 is all known in the art and need not be described in greater detail. Spans 24 interconnect each node in the ring 10.

In specific progress, the following metric (specific progress equation) is implemented to assess candidate rings:

$$\eta_{SP} = \frac{\sum DemandRouteBandwidth \times DistanceCarried}{\sum ADM\ cost + \sum Glassthroughcost + \sum Linerepeatercost + \sum Portcost + \sum Fibercost}$$

The numerator is a measure of the total transport utility U of the ring under evaluation. The denominator is a measure of the ring construction cost C. Some of the cost factors may be left out, at a loss of accuracy. The total transport utility may consist only of the number of demands served, but preferably is multiplied by distance carried. The demand route bandwidth is the total demand bandwidth that has to be carried from source node to destination node. The ΣADM-cost is the sum of all ADM costs in the cycle under evaluation. The Σglassthrough cost is the cost of all glassthrough nodes in the cycle under evaluation. A glass through node is an inactive node that does not have regeneration equipment. This is contrasted to a pass through node, which is inactive but that contains regeneration equipment. The ΣLinerepeater cost is the sum of the costs of all line repeaters in the cycle under evaluation. The ΣPortcost is the sum of all port costs in the cycle under evaluation. The ΣFibercost is the sum of all fiber in spans in the cycle under evaluation. Specific progress is thus calculated as the ratio of U/C for the ring under evaluation.

Figure 3A:
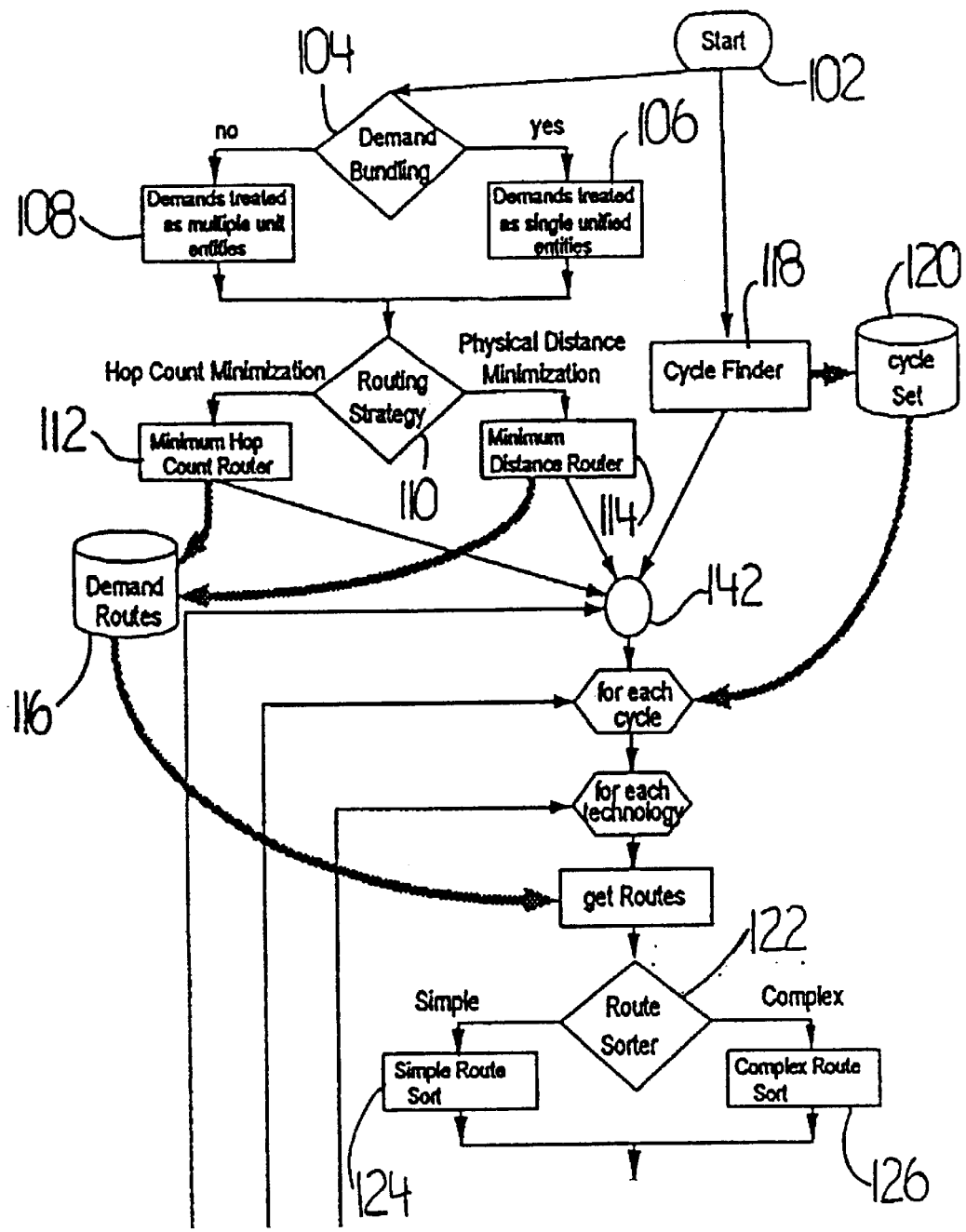
FIG. 3A is a combination schematic/flow chart of specific progress direct cost optimization greedy iterative framework.
Figure 3B:
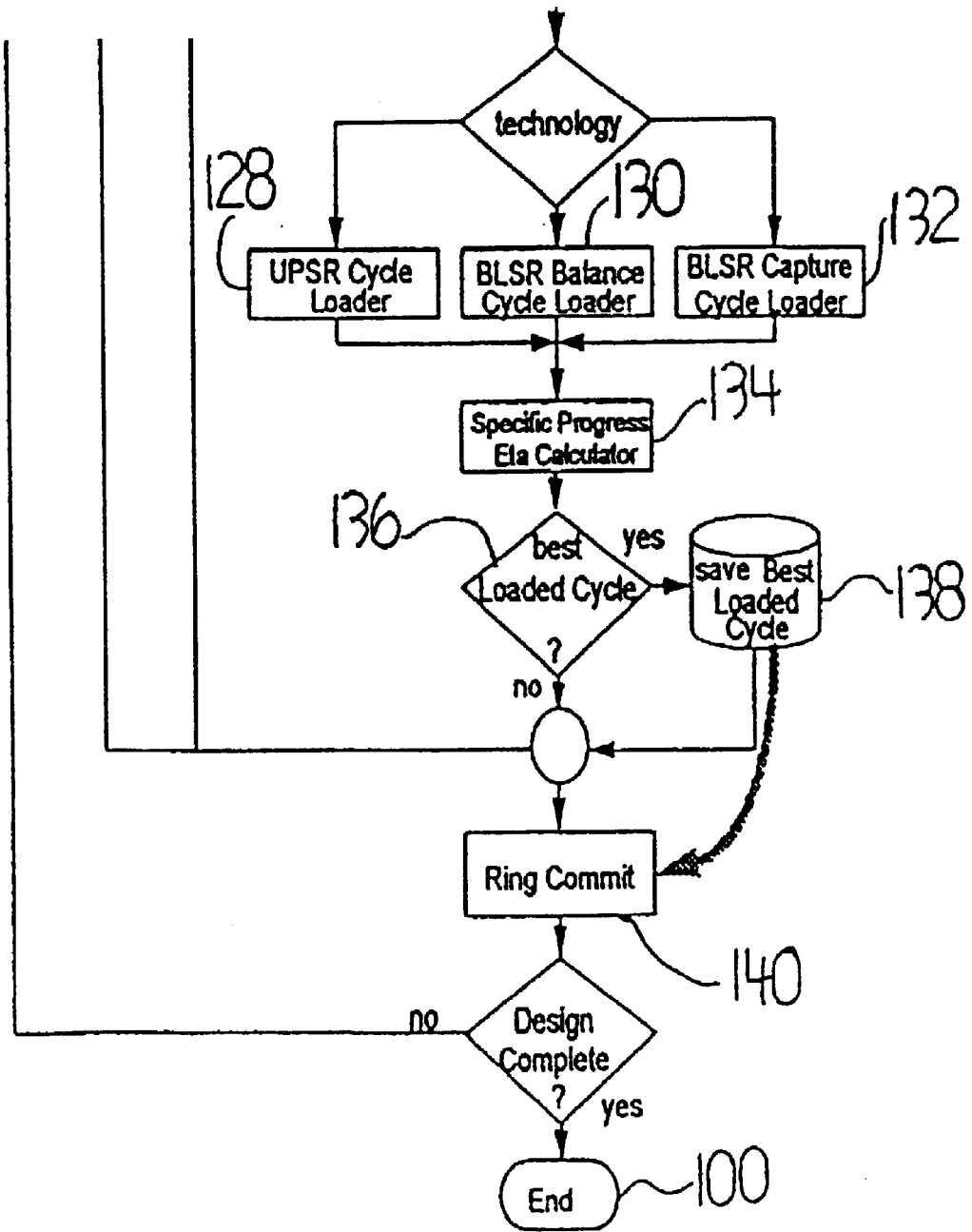
FIG. 3B is a combination schematic/flow chart of specific progress direct cost optimization greedy iterative framework.

FIGS. 3A and 3B show an implementation of method steps according to an embodiment of the invention. These method steps may be implemented in workstations and/or PCs, while the final implementation is carried out by forming rings in the network according to the optimized rings generated by following the method steps. Upon completion of the method steps (end 100), a set of virtual rings have been completed which are stored as a file containing a sequence of nodes. A detailed description of the data structure organization and module implementation is contained in the appendix.

Upon starting up (start 102), the method first decides 104 whether demands are to be bundled as single unified entries 106 or multiple unit entries 108. If demands are bundled, then the demands in a bundle cannot be routed over separate cycles. Next, the method determines 110 the routing strategy, whether routes are to be selected according to hop count minimization 112 or physical distance minimization 114. Whichever method is chosen, the next step 116 is to assign the demand to the network and establish the demand routes. Shortest physical path routing 114 is used when the span costs dominate node costs. Shortest logical path routing (hop count minimization) 112 is used when node costs dominate span costs, as in a metropolitan network. The method also locates 118 all possible cycles in the network and generates a set 120 of candidate cycles, which is stored as a map of possible cycles in the network. The method then enters a reiterated series of steps in which cycle evaluation is carried out for each cycle of the set 120, for each of several technologies under consideration and for the demand routes 116.

In the reiterated steps, routes are sorted at step 122. Two route sorting options are available for the design synthesis, simple 124 and complex 126. The simple route sorting strategy orders routes by decreasing progress. The complex route sorting strategy first sorts routes by decreasing ratio of links on the cycle relative to the total number of unrouted links for the route. In case of any ties, the tied routes are sorted by decreasing progress. In case of a tie in progress, the tied routes are sorted by decreasing unrouted hop count on the cycle under consideration.

More specifically, a simple demand route sorting method orders, by decreasing cycle involvement, the demand routes that have at least one demand route segment in common with the cycle being loaded. Cycle involvement is defined as the bandwidth distance product of the not-yet-loaded demand route segments which intersect with the cycle's trajectory. The main premise of this rule is the hypothesis that the longer a large demand route is carried on a cycle, the better suited the demand route is for inclusion in the ring candidate formed from the cycle being loaded. The more of the 'well-suited' demand routes a ring candidate can carry, the better utilized and hence more efficient the resulting ring candidate will be. This rule was developed as a simplification of the complex demand route sorting strategy presented next.

A complex demand route sorting procedure was developed in RingBuilder™ Version 1 in order to exploit the notions of cycle involvement, containment, and length of travel. The demand routes are first sorted in order of decreasing containment. Containment is defined as the ratio of the bandwidth-distance product of the not-yet-routed demand route segments which intersect with the cycle being considered to the total bandwidth-distance product of all of the not-yet-routed demand route segments. The demand routes that have the same containment figure of merit are sorted on the basis of decreasing cycle involvement. Those that have the same containment and the same cycle involvement are sorted on the basis of decreasing length measured in hops of travel around the cycle. This complex procedure was the initial procedure developed for the RingBuilder Version 1 framework. It was formulated to prevent the depletion of ring candidate span capacity by a series of shore low bandwidth demands that would prevent the use of other spans of the ring and result in an inefficient ring candidate.

The complex route sorting technique proves to be a superior procedure, but is much more computationally involved. Because this route sorting is implemented for every cycle for each iteration, it can increase the real-time computational requirements.

Once route sorting is completed, the cycles are loaded using one of three possible cycle loaders (depending on the technology chosen for the design). It is not possible to directly compare the balance and capture figures of merit from loaded cycles that have been constructed using different equipment technologies. Balance vs. capture optimization is therefore an inherently single technology optimization framework. The three available loaders are UPSR (unidirectional path switched ring) 128, BLSR Balance 130, and BLSR Capture 132. Each of these loaders is fully configurable for all line rates, 2 or 4 optical fibres, and various cost parameters (common equipment cost, provisionable line card equipment, and fibre cost). Since regenerator costing is not currently implemented, regenerators have to be considered manually via a post processing step. Each loader 128, 130 and 132 provides the data necessary to computer the ring construction cost for a ring.

The UPSR loader 128 takes demand segments and assigns time slots for each demand all the way around the ring. Once a time slot is assigned for a demand, it is not available anywhere else on the ring. This is inefficient relative to BLSR span reuse capability. It is an advantage in situations where broadcasting of the payload data to more than one node is required, such as in some drop and continue node protection scenarios or multimedia distribution.

The BLSR balance loader 130 takes demand segments and assigns them time slots on the spans that need to carry the demand. The balance functionality attempts to load any segment of a demand, even if all segments of a demand coincident with the cycle are unable to be loaded. This loader maximizes the utilization of the transport capacity at the expense of potential excess inter-ring transiting as capacity-blocked spans are bypassed by transporting the demand on subsequent ring system choices.

In contrast, the BLSR capture ring loader 132 only accepts a demand for loading onto a system if all unrouted links of that demand that are common to the system can be loaded by the system. Otherwise, the demand is rejected and left for another subsequent system to load. The BLSR capture ring loader minimizes the amount of inter-ring transiting by enforcing this all-or-nothing policy. It does so at the expense of potential overall system fill since demand segments that could feasibly be loaded may be rejected if they are related to other segments that have been rejected due to system or network capacity constraints.

Once the demand has been allocated to the cycle under evaluation, specific progress is calculated at 134 using the equation for specific progress.

In each iteration, each cycle candidate from cycle set 120 is compared with previously evaluated cycles at 136, and a best set of candidate rings is selected based on a ring selection procedure. The best ring could be selected, as indicated at 138, and nominated to be a ring in the system. Alternatively, a best set of rings may be randomly selected as discussed below. The ring commit process 140 captures the loaded cycle, now called a ring. It records the path, ADM placement, provisionable element counts, fibre utilization, and a detailed description of each of the demand routes fully or partially loaded onto that system. The ring commit process 140 also removes the carried demand segments from further consideration by the design system. If no more uncarried demand is left in the system, or if any further demand cannot be carried by rings in the network, the design process terminates. If any further demand exists, then the cycle repeats from 142.

Figure 4:
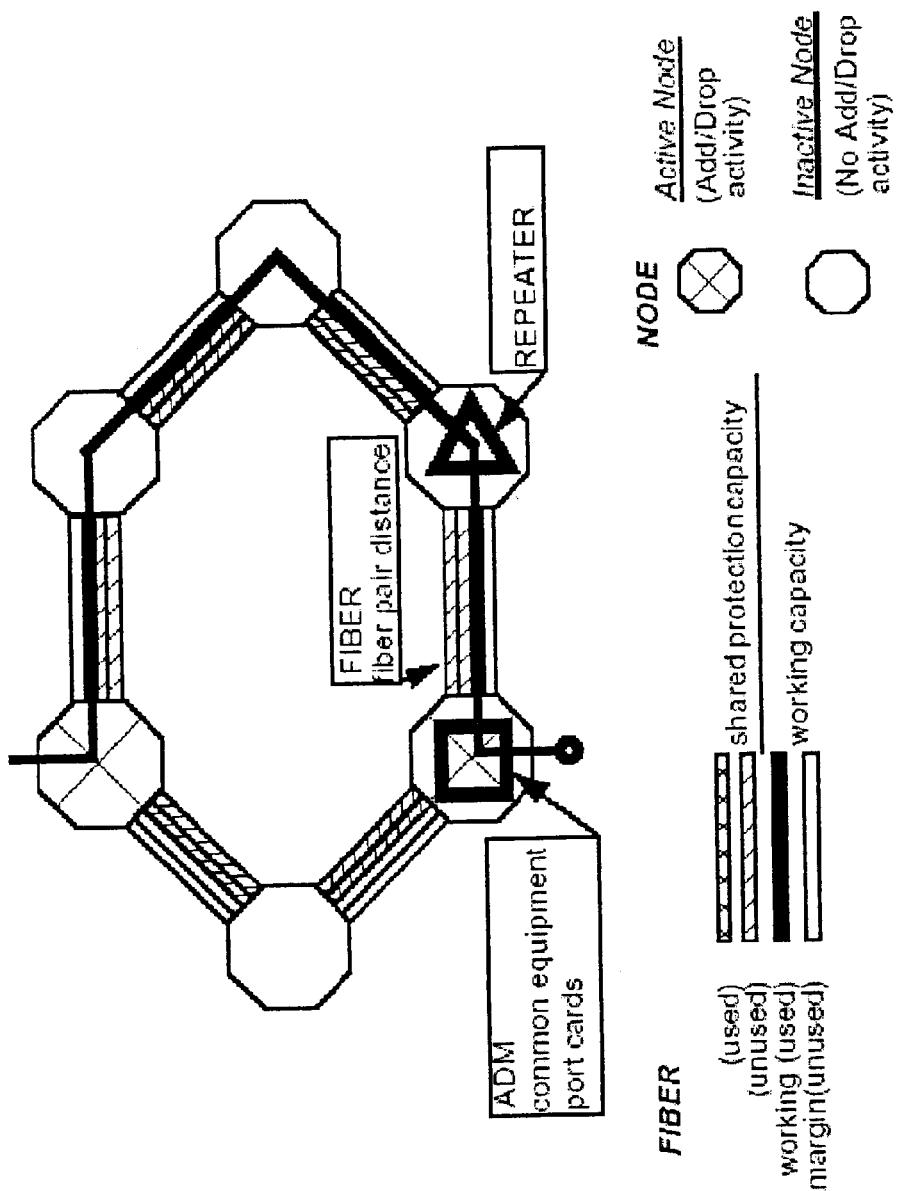
FIG. 4 is a combination schematic/flow chart of ring cost components.

A specific example is shown in FIGS. 4–11. In FIG. 4, nodes 40 and 44 are equipped with ADMs, and have add-drop activity. Nodes 41, 42, 43 and 45 are inactive, but pass through the demands, with node 43 including a repeater 43A. The spans 46–49 each have unused shared protection capacity (hatching), and used (solid) and unused (blank) working capacity. FIG. 4 shows the physical features that are to be used in assessing ring construction cost.

Figure 5:
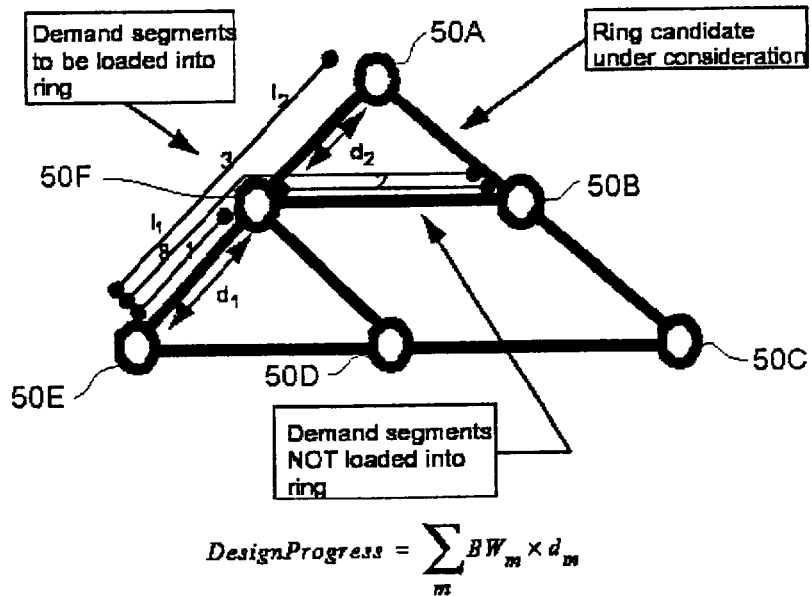
FIG. 5 is a combination schematic/flow chart of ring progress.

Measurement of design progress for a ring carrying demand segments is shown in FIG. 5. The demand segments to be loaded into the ring are 3 between nodes 50A and 50F, 8 between nodes 50E and 50B and 1 between nodes 50E and 50F. The design progress is calculated as the total transport utility. The ring under consideration is formed of the sequence of nodes 50A-50B-50C-50D-50E-50F. The demand segment 2 between nodes 50B and 5OF is not loaded into the ring. The sum of the demand×distance carried for all demands is the total transport utility.

Figure 6:
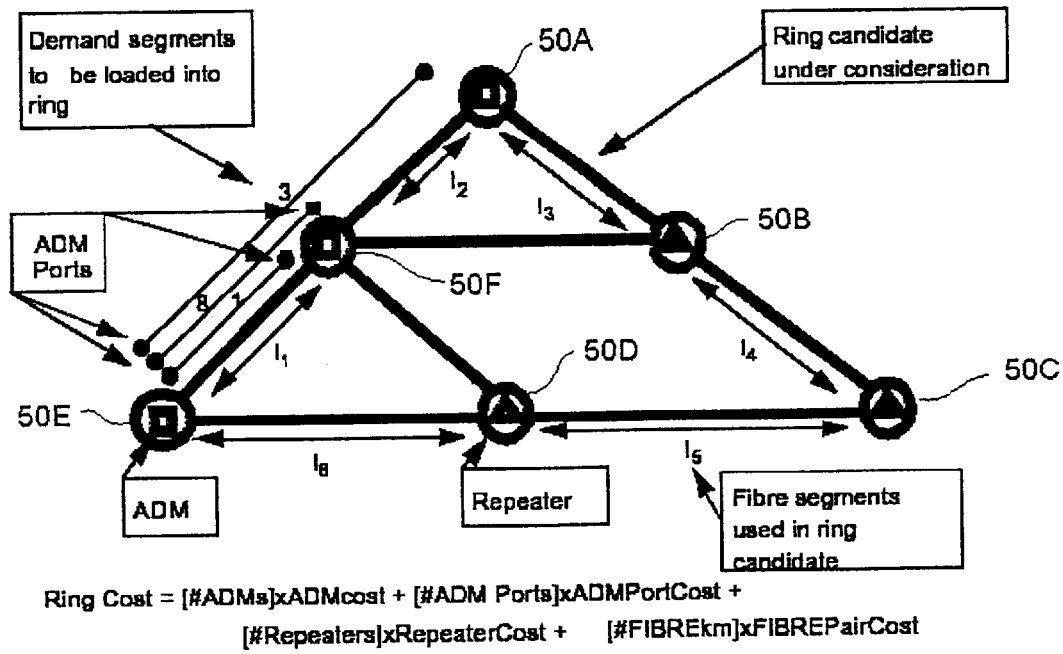
FIG. 6 is a combination schematic/flow chart of ring costing.

FIG. 6 shows ring costing. Fiber segments $1_1$–$1_6$ lie in the ring. Nodes 50A, 50E and 5OF have ADM ports. Nodes 50B, 50C and 50D have repeaters. The ring cost is calculated as the denominator in the specific progress equation. An example of cost assignment is: ADM 0.05 for OC-12, 0.1 for OC-48, ADM port card 0.0025 for OC-12, 0.005 for OC-48, repeater 0.025 for OC-12, 0.05 for OC-48, fiber 0.004 for OC-12, 0.004 for OC-48, DCS 1.0, DCS port card 0.02.

Figure 7:
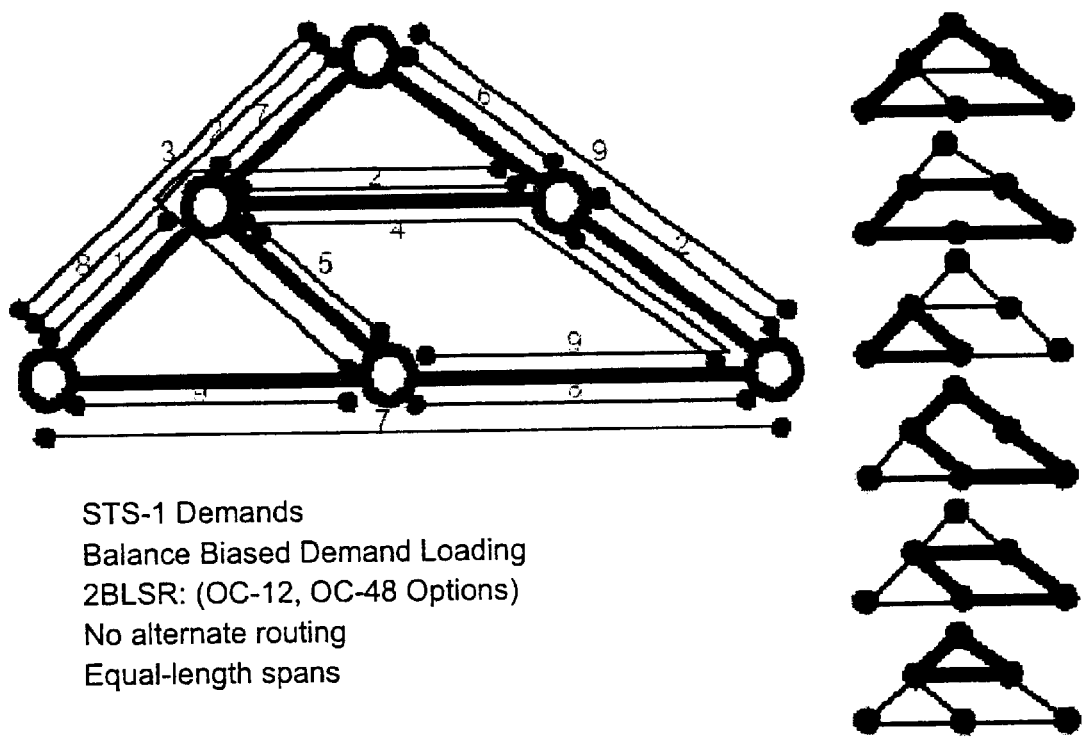
FIG. 7 is a flow chart of design example: Routed Demands and Cycle Set.
Figure 8:
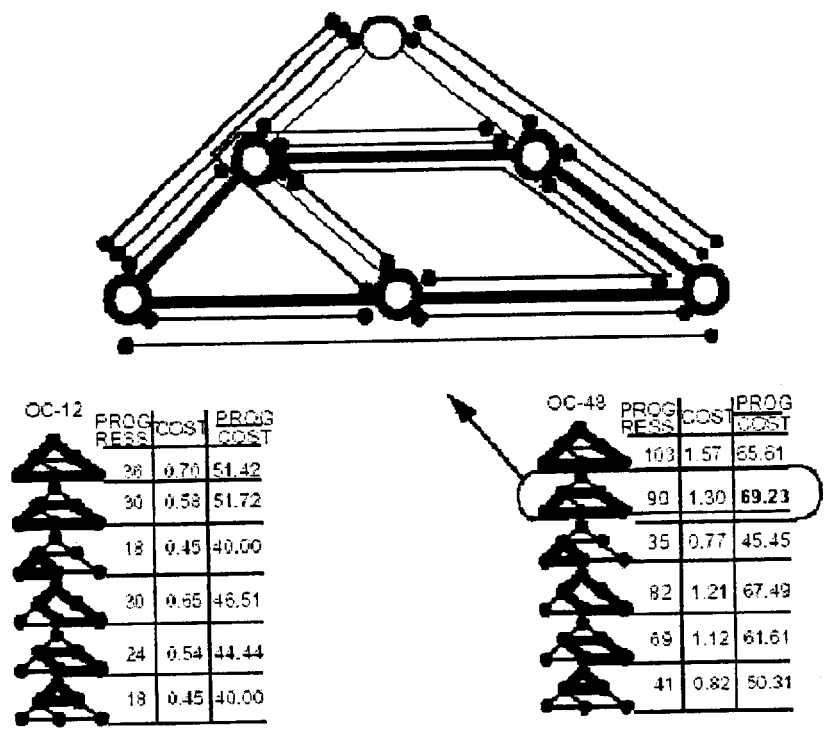
FIG. 8 is a combination flow chart/table of design example, Iteration 1.

FIG. 7 shows routed demands, the network and cycle set for the network illustrated. The demands are STS-1 demands. The loading is balance biased in accordance with RingBuilder Version 1. OC-12 and OC-48 are considered as options. No alternative routing is considered. The spans have equal length. FIG. 8 shows the transport utility U (progress), cost C and ratio U/C for each cycle under consideration for both OC-12 and OC-48. The best ratio is highlighted.

Figure 9:
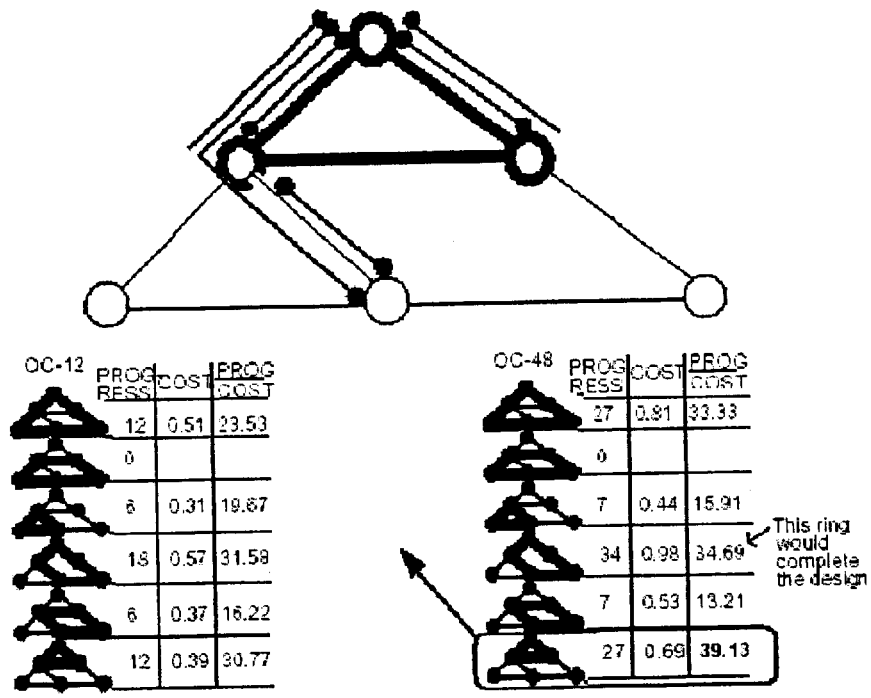
FIG. 9 is a combination flow chart/table of design example, Iteration 2.
Figure 10:
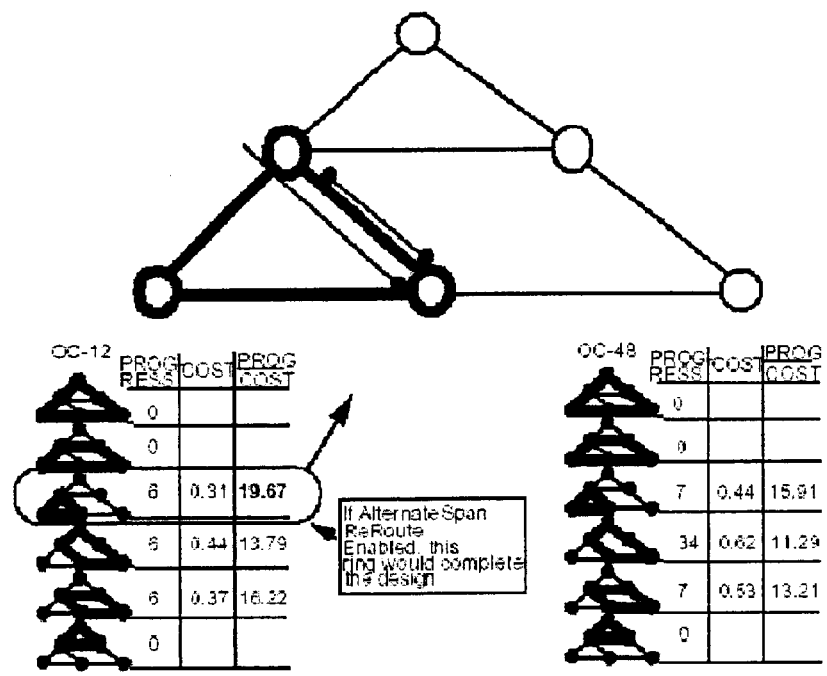
FIG. 10 is a combination flow chart/table of design example, Iteration 3.
Figure 11:
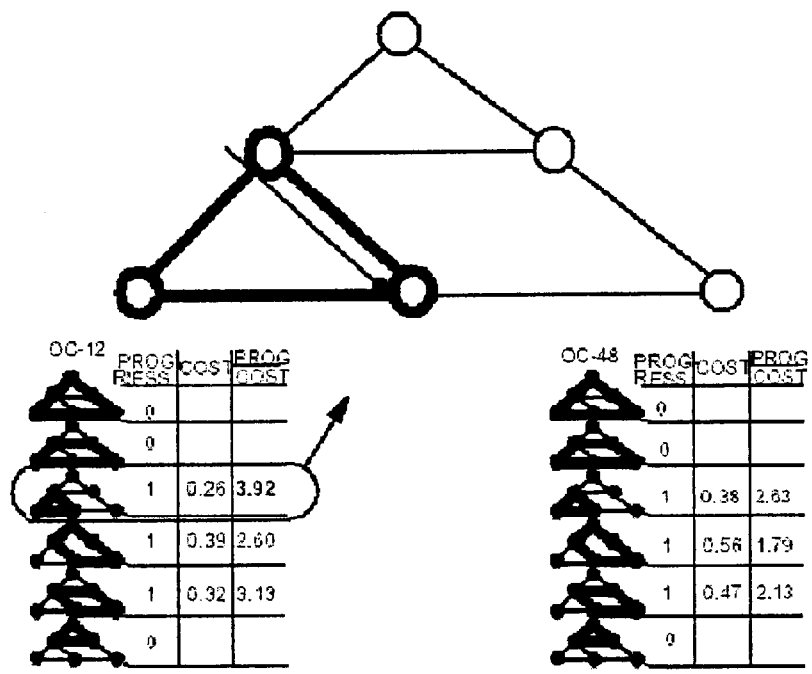
FIG. 11 is a combination flow chart/table of design example, Iteration 4.

After setting all demands in the best cycle to zero, the process is applied again, resulting in the ratios U/C shown in FIG. 9, with the best cycle highlighted. Third and fourth iterations are shown in FIGS. 10 and 11 respectively.

The process provides a multiple-technology and direct cost optimization which allows the evaluation of multiple simultaneous technology choices in the cycle loading process. The major benefit of this technique is that it provides an automated, integrated method for the efficient design of a ring-based network, using real-world constraints including system capacities and actual system component costs. The framework so far described is still a greedy one and thus produces near-optimal rather than optimal designs. Because the actual costs of the components involved are considered in the evaluation process, the best possible system choice is made from the perspective of cost per unit progress towards the final design.

As compared with the RingBuilder Version 1 framework, the method outlined in FIGS. 3A and 3B provides multiple parallel cycle loaders and the substitution of specific progress for the balance vs. capture calculation. Another inner loop is added to the iterative framework so that each cycle is evaluated after it is loaded by each technology option. Any number of several technology options may be considered.

The method of FIGS. 3A and 3B keeps the basic iterative framework of greedy selection of a best ring from inspection of the cycle set at each iteration. For Version 2 a ring "candidate" is a structured specification consisting of:
 a ring technology type (e.g., BLSR, UPSR),
 a ring module capacity (e.g., OC-12, OC-48),
 technology constraints including: ADM add/drop capacity and ring ADM count limit,
 demand loading constraints including: capture- or balance-biased demand loading and intra-ring demand rerouting the cycle on which the ring lies, the populated terminal sites and numbers of add-drop interface cards populated at such terminals, and the demand segments which are served by the ring. This also determines which sites have active add-drop terminals and which are just glass-throughs. For the active nodes, this also determines which add-drop interfaces are populated.

The candidate that results in the best ratio of total transport utility to ring construction cost is chosen at each iteration. Transport utility is the contribution the candidate makes to the progress of unserved demands as they flow over their previously assigned routes across the network. The concept is one of asking what type, location and loading of ring will give the best 'bang for the buck' at each step in synthesizing the entire design. The 'bucks' are calculated as the cost of constructing the candidate. The 'bang' is the amount of useful transport provided. The transport utility may be assessed in two slightly different ways: one will reflect the product of the number of demands and the fraction of total route length that each is moved towards its destination. This is most useful for long haul networks. The other measure of utility is simply the number of demands served or completed, without regard to distance. This is most useful for metropolitan networks.

In the former approach a candidate is given credit based on the bandwidth-distance product for the demands carried. This approach attempts to 'mate' demands to a candidate that are best served by that candidate in getting from source to destination. Larger and longer demands are favoured because serving them results in the most progress towards design completion. In the latter approach, a candidate is given credit for serving the largest cross-section of demand bandwidth possible, without regard to length of travel on the ring. In both cases, the progress calculated is normalized by the cost to implement the candidate, thereby arriving at the specific progress figure of merit.

Capture and balance are still addressed by these methods, although indirectly. The cost of building the candidate reflects capture efficiency because demands that are not fully captured incur costs for add-drop interfaces to carry demands that transit multiple rings. Balance is reflected in specific progress through the cost of building the candidate, regardless of how many demands are on the candidate's spans. Specific progress is low if the balance is poor because an unevenly loaded ring utilizes its capacity poorly. Finally, but less obviously, specific progress also reflects the efficiencies of candidates that become "express-like" by choosing groups of demands which share the same destinations, thus minimizing the number of terminals.

Selecting candidates based on their specific progress makes it much simpler to find minimum cost designs. This single change completely eliminates the alpha sweep, directly accommodates design with multiple ring types and sizes and is directly responsive to cost factors in ring choices.

2. Variations and Alternative Design Strategies Using Ring Builder Design Method Anti-greediness Methods The drawback to using a greedy method is that a locally good choice may affect subsequent choices in an undesired way. As so far described, the method of FIGS. 3A and 3B encompasses no methods to escape this drawback. For a given network topology, routed demands and set of equipment costs, the sequence of choices leading to a complete design is completely determined and completely repeatable. Hence the final design is the result of locally optimal choices made for individual rings in succession. Moreover, there is no estimate as to how far from the true optimum the final design might be. It is acceptable that for a problem as theoretically difficult as ring network design we must use approximate rather than exact approaches, but it remains highly desirable to explore the design space in the vicinity of good designs. It is also desirable to explore different regions in the design space. In RingBuilder Version 1, for example, exploration of the design space was carried out with the published method of multiple metric functions and with the specific tactic of second choice first—picking the second-best ring at the first iteration.

For the method outlined in FIGS. 3A and 3B, the following methods are proposed to counteract the greediness of the basic synthesis principle of RingBuilder.

Dithered Selection

Dithered selection uses a probability distribution for a discrete random variable to guide the choices of candidates for the best set of candidates at step 136. For instance, one such probability distribution might be: $(x, P(x))=(1, 0.25)$, $(2, 0.5), (3, 0.15) (4, 0.1), (>5,0)$. In each iteration, a number drawn from this distribution gives the ranking of the candidate to be chosen for addition to the design. For example, if $x=3$ is drawn, then the third-best candidate is to be chosen in this iteration. In the basic Ringbuilder framework it is always the top ranked candidate that is chosen. But with dithered selection using the $P(x)$ example above, the top ranked candidate would be chosen only 25% of the time, the second best would be selected 50% of the time and so on. This way a reasonably small number of RingBuilder runs, say 20 to 50, could provide a set of different 'good' designs from which to choose. The final choice might simply be based on cost or some other desirable property might be used. For example, designs using the minimum number of ring systems may be easiest to manage. Designs with the least sensitivity to forecast error might be more robust in the long run, etc.

If the candidate chosen on the first iteration is pictured as the first point on a trajectory leading to a completed network design, then the breadth of the design space sampled by performing multiple runs can be controlled by the number of categories in $P(x)$. Moreover, all of the complete designs that result are relatively good designs and of potential interest to the user. Dithered selection is therefore attractive as a way of being able to say "I know there may be over 10^20 possible designs, but can you show me just 20 good ones?"

Another advantage of this approach is that when all the best designs found have approximately the same total cost, the user can be confident that they are all probably in the neighbourhood of the globally optimal design. If in the sample of 20 to 50 designs the total cost varies greatly with no cluster of designs at some least cost, then this is an indication that the number of categories in $P(x)$ should be increased and more trials performed as a significantly better design may still be found.

FIG. 12 summarizes the way in which dithered selection transforms a greedy synthesis procedure into one that explores the design space more thoroughly. In FIG. 12, for a single run, the design may begin at a local optimum 60 on the design cost surface 62, and remain constrained so that the path 64 follows only a small part of the design space. By comparison, if the design path starts at several, preferably randomly selected, points 66 on the design cost surface 62, many paths 68 result which may effectively explore the design space.

An adaptation of dithered selection is to use all possible combinations of ranking choices, at least at the early levels of the synthesis, and then complete the design either with no dithering or with random dithering. For instance, for the best breadth of initial starting points and best breadth of the early branching of trajectories in FIG. 12, one could consider, say, the top 5 candidates in each iteration for the first 3 iterations. Then the initial sequences of candidate ranking choices would be given by all vectors such as (111) (211) . . . (211)(221) . . . (311)(321) etc. there being 5^3=125 such selection sequences to exhaustively structure the first three ring choices. The vector (325) for instance would mean select the third ranked choice in the first iteration, pick the second best in the second iteration and the fifth best in the third iteration. In this example, after the third iteration one would either stop dithering, or use random dithering for subsequent choices. As an aside, this example also illustrates the astronomical complexity of an exhaustive search when there may be 20 to 150 rings in the completed design and several hundred thousand cycles to act as templates for ring candidates.

Cycle-masking Techniques

Compared to dithered selection, cycle-masking is a more indirect way of forcing RingBuilder2 to explore the design space more broadly. Cycle masking has, however, the added advantage that it can force the method to now and then pick a ring that may be far down the ordinary ranking list but which is in fact a highly effective choice. This is because such a choice may result in span elimination—that is, deliberately not using a span.

The method of FIGS. 3A and 3B may inspect the entire cycle set of the network in each iteration, leading to a 'best ring' choice for that iteration. The principle of cycle-masking is to hide or mask out a subset of cycles from the cycle list for each iteration. A number of variations are possible: For instance to see whether eliminating span x will yield an improved design, all cycles containing span would be masked out. If there are demands on the masked out span they would be rerouted before the run, or they might be rerouted onto reserve design capacity at the end of the run. If the design with span x eliminated is lower in cost then an effective span elimination has been discovered. If the designs where a given span is eliminated are all lower in cost than other designs, then the next step could be a study using dithered selection on a topology which has the given span eliminated.

A small set of good designs spread over the breadth of the design space can be obtained by starting each run with a different span masked out. Alternatively, one or more spans may be named randomly or in permutation order to be masked out at each iteration. This does not force outright span elimination, but will alter the rankings of candidates in a manner similar to dithered selection. But while dithered selection is a random effect, the choice to temporarily prohibit the use of a particular span can be made using knowledge about that span's effect on the design at that point. In the end it is of course just another method of exploring a region in the design space slightly away from the main sequence of synthesis to increase the chances of discovering very good, but previously unobserved designs.

Progressive Expansion of the Cycle Set

To avoid selecting small but individually very efficient ring choices that may have a significant effect on the later progress of the design, the cycles may be sorted before being considered as candidates Thus, the cycles may be sorted by decreasing length, and then to allow the process only considers the top part of the list at the first iteration, a bit more of the list at the second iteration, and so on.

There are many possible variations on this principle, such as doing a trial run to discover approximately how many rings will be in the resultant design, and then unveiling the list of cycles in equal portions over that many iterations. Alternately a fixed strategy could be adopted (or input by the user) saying for instance that complete use of the cycle set should not occur until after X rings have been placed, where X might be 5 or 10. If X=10, then in the first iteration RingBuilder2 sees only the first 10% of the cycles and picks the 'best' relatively large ring. By the 9th iteration it is considering 90% of the cycle set and at the 10th and subsequent iterations it is considering all cycles in each iteration.

This principle can also be used to test designs where small cycles are never seen by the process. This is identical to simply masking out all cycles below some threshold. A side benefit of limiting the number of cycles that are in scope for the early iterations of the method is faster execution for these early iterations. This is particularly beneficial because in the early iterations the number of unserved demands is greatest.

Partial design checkpointing, demand packing and combined horizontal and vertical design explorations As discussed so far, each operation of the method results in a complete network design. Experience suggests however that the total cost of a network design is dominated by a small number of rings that serves a critical core mass of the traffic. For example, the inventors have observed cases where 15 large, very well loaded rings served 30% of the entire demand matrix while a total of 141 rings was needed to complete the design. Often the demand matrices have large variance. In such cases, the cost of the network will be dominated by the rings which carry the few largest demands. If a relatively poor configuration is chosen to handle the large demands, then the total design cost may be poor regardless of the efficiency with which the rest of the demands are served.

On the other hand, the inventors have also seen cases in which a very good configuration of key rings has been discovered to serve a significant fraction of the traffic. In these cases, it is possible for specific progress to subsequently degrade quickly as RingBuilder2 attempts to complete the design. Large designs e.g. of 140 to 150 rings may clearly show the forced poor trajectory in the final stages of the design. Discovery of an exceptionally efficient configuration to handle, say, 80% of the demands could remain unseen if the cost to cover the remaining demand is very high. In other words some designs that look like poor choices might contain excellent partial designs. In practice, it could be valuable to know about such excellent partial designs and consider alternatives other than rings for handling the remaining demands.

Partial Design Checkpointing

A user may enter a fractional design coverage target of, say, 30% and generate several 30% designs over a specified amount of time. For designs to be comparable at this stage, it is important to stop each design as close as possible to the exact target specified so that the total of demand-kms or logical hop demand segments served are as nearly equal as possible across designs. The stopping points of all partial designs could not be exactly the same in coverage, so partial designs would be stopped as soon as a ring is placed which brings the total coverage above the partial design threshold. A range of good partial designs would be obtained as for complete design sets, using the dithered selection and/or cycle masking strategies.

Figure 13:
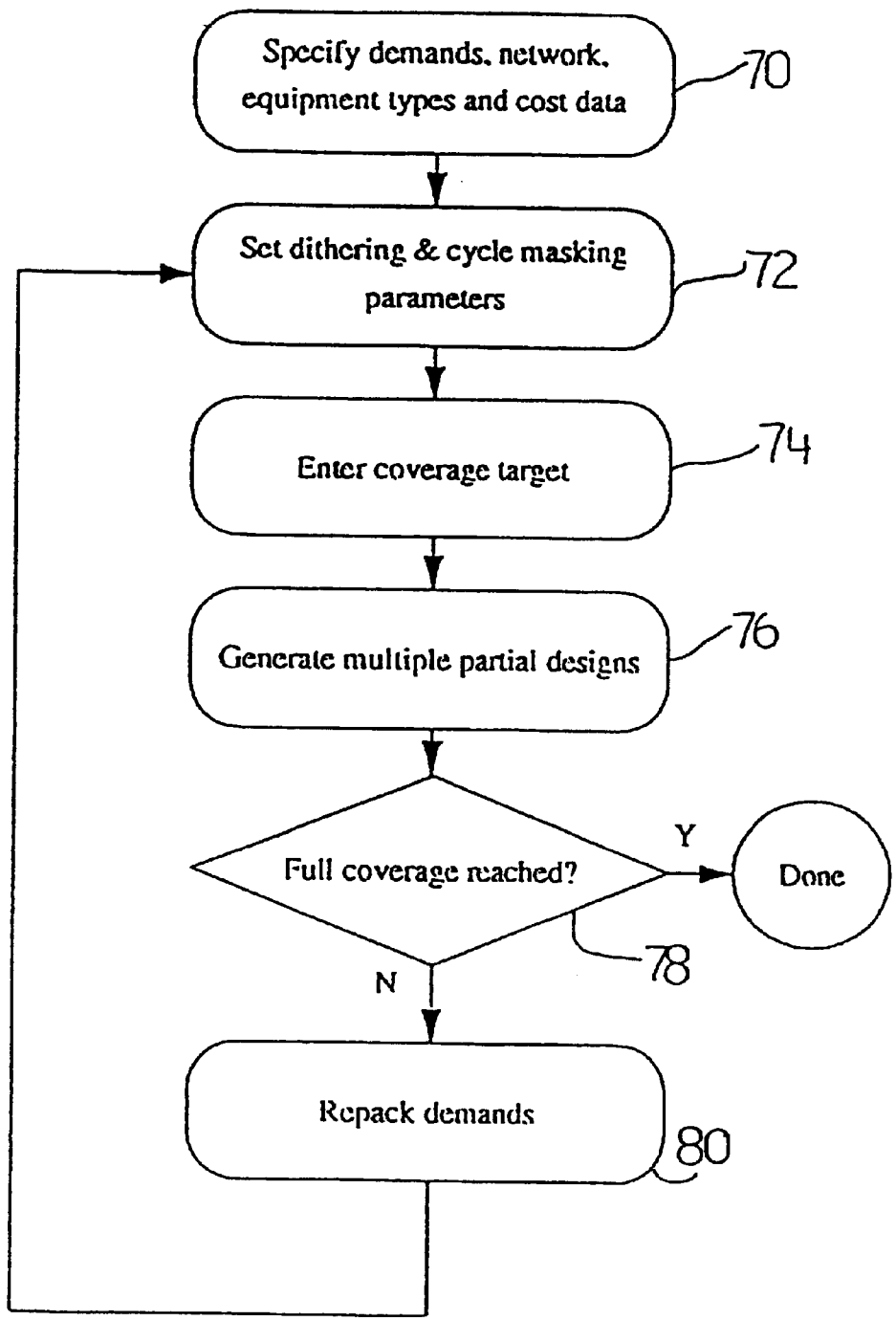
FIG. 13 is a flow chart showing design method incorporating partial checkpointing.

This method is illustrated in FIG. 13. A user may approach a new network design problem by entering the demand file, network file, and equipment type and cost data files at step 70, then select a sequence dithering and cycle masking strategy at 72 and ask for 100 designs that achieve 30% distance-weighted (or logical segment) demand coverage at step 74. Multiple partial designs are then generated using the method of FIGS. 3A and 3B at step 76. If a significant number of these partial designs cluster at about the same cost, that is an indication that the design is not highly sensitive. In any case, the n-best (lowest cost) partial designs can be kept at this stage. The value of n might be only 5 or so, but more generally an expert system or fuzzy logic controller may automate the whole high level strategy being outlined here, so as to expend a given budget of design time on a program-determined strategy for horizontal partial design generation and several vertical design explorations.

The n best partial-coverage designs may be used as starting points for a second stage of partial design. Each second stage design begins with the process of packing unserved demands by rerouting them in the unused capacity of the first stage partial design. Then design synthesis is restarted to bring the demand coverage level up to the next checkpoint. Again, by applying dithered selection and/or cycle masking as before a set of, say, 100 second-stage checkpoint designs can be obtained. Again, the n-best of these are kept and used as the starting point for further similar design steps. The result is a third set of 100 designs based on the n-best survivors from the second stage checkpoint, from which the single best or a group of near-lowest cost designs may be chosen. The spread or clustering of the total design cost in this last population gives some side information about the probable goodness of the current best design. The overall framework is one of checkpointed populations of partial coverage designs, the best of which lead to a broadened search for designs reaching the next checkpoint and so on. Once full coverage is reached the process may terminate, as at step 78.

Between synthesis steps, demands may be repacked at step 80. This is a technique of revisiting the routing of the demands covered in the last rings or left uncovered in the partial designs to see how many demands can be rerouted to exploit existing unused capacity in the already placed rings. In general, this can be done for any design with some very poor final rings: the poor rings are removed, and the demand segments they carried are repacked onto the previously placed rings.

Starting from the checkpointed and repacked partial designs, the synthesis process should have a greater chance of discovering better ongoing synthesis sequences.

Automated checkpointing may be implemented by inspecting the successive values of specific progress in operation of the method. These values can be diagnostic of a transition from cost-effective ongoing synthesis to the onset of poor rings that may be forced on the design to satisfy the objective of 100% demand coverage. For example, if, in arbitrary units, a 15 ring network design was evolved through candidate ring selection with specific progress values of {0.99, 0.98, 0.97, 0.96, 0.95 . . . 0.90, 0.88, 0.87, 0.55, 0.40, 0.23} then we would have a strong indication that this is a pretty good design for the first 12 rings up to the candidate with specific progress of 0.87. The specific progress for the last 3 rings probably reflects difficult circumstances near the end of the design. For example, it might be that the remaining unserved demand segments just didn't fit together well and very low fill rings had to be commissioned to cover these demands. These last rings may have a significant negative impact on total network cost.

In general therefore it is advisable to monitor specific progress to detect any sudden decrease in the value of U/C. The partial design up to the decrease may be very good in itself and worth using as a starting point for an expanded family of designs after demand packing. In practice when a few demands remain uncovered by a design sequence that exhibits sudden specific progress drop off at the end, it may be possible to complete the design by packing demand into the residual capacity of the preceding rings. In practice, a small residual of uncovered demands may be considered for protection by other techniques. This does not rule out continuing the application of the method to obtain a design that is efficient right up to the last required ring. Indeed inspection of the terminal conditions of an inefficient completion ring sequence may suggest a span elimination to be entered as a cycle masking strategy in the next Ring-Builder2 run.

Aggregating Routing

Span elimination is a technique that human planners exploit effectively in some designs where the global benefit of not using a span can be seen in the larger scale. In an automated system and in large designs, it is very difficult to detect such opportunities. The method of FIGS. 3A and 3B without cycle masking cannot eliminate any span over which a demand has been routed. The routing step that precedes the method of FIGS. 3A and 3B usually relies on shortest path routes. If this results in at least one demand unit on each span, and these routes are not moved by repacking, the method can never produce a design with span eliminations because it must place rings to cover all demands.

Span elimination can be cost-effective when a small demand segment uses a longer route than its shortest path, but in doing so joins up with and fits into an already efficient or well-justified ring. Therefore, it may be better for some demands to go out of their way to simultaneously increase the fill of other rings and to eliminate the need for additional ring(s) to cover the demand. In its full complexity, the issue is very difficult to formalize. Rerouting to effect a beneficial diversion of a given demand depends on the other rings already assumed to be present, but the choice of those rings themselves depends on the initial routings used, etc. in a circular chain of influence.

Figure 14:
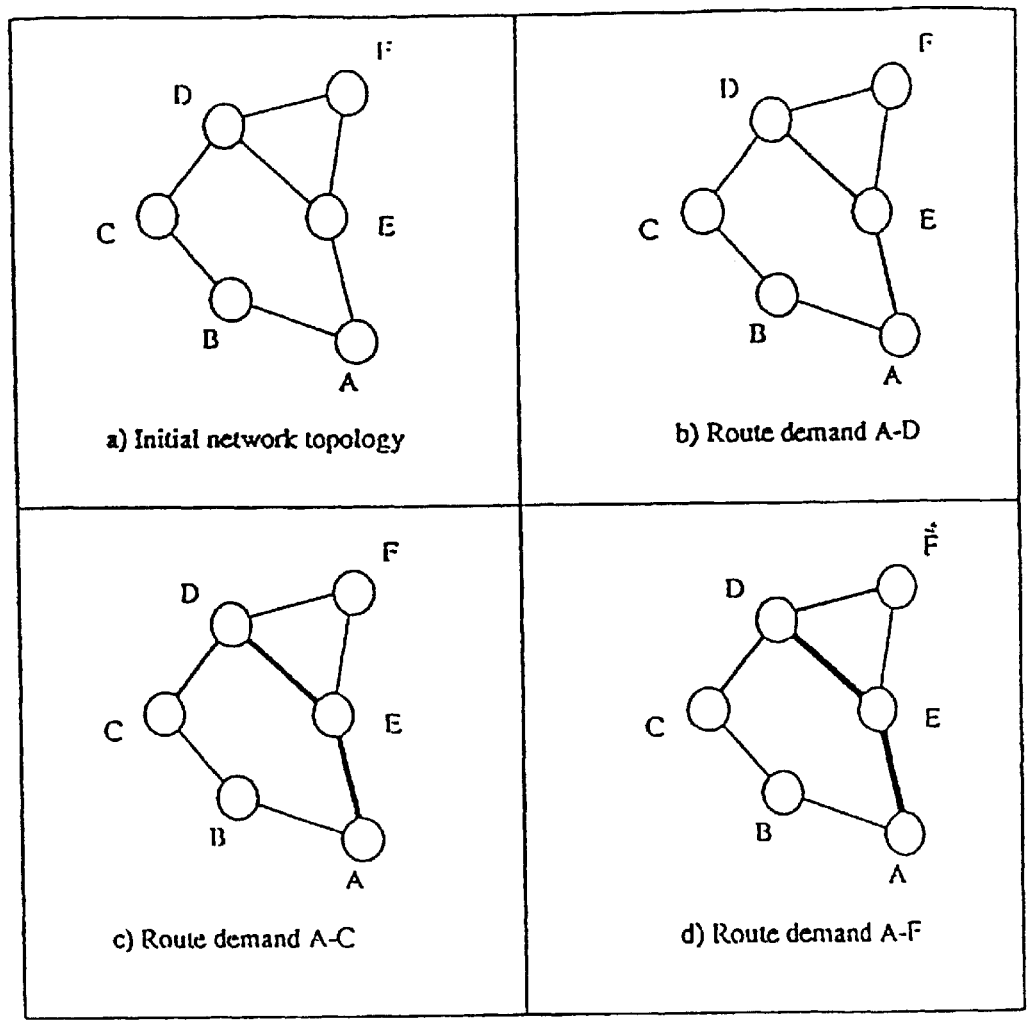
FIG. 14 is a flow chart showing an example of aggregating routing.

One method to explore and capture these beneficial routing effects is through aggregating routing as illustrated in FIG. 14. Aggregating routing tries to shape the collective routing of demands over the network in advance of ring placement so that not all spans are used. The principle is that the routing cost of a span is inversely proportional to the number of demands already crossing the span. This discounting effect may also be modularized so that the apparent reduction in cost for routing over a span returns to its undiscounted value whenever W mod M=0 where W is the number of demand units on the span and M is the module size being targeted. (W mod M=0 whenever W/M is a whole number).

The result depends in detail on the order in which demands are chosen for routing, A unique optimal solution to the aggregating routing problem may be possible using methods such as linear/integer programming if the objective function is either to solve for the routing plan that uses the minimum number of spans and/or minimizes the total number of spans with small remainders above a modular quantity, for instance min(sigma (ceil(W/M)*M−W)).

The effect of aggregating routing is to prepare the network for possibly more efficient ring designs by tending to pile demands together into multiples of a basic modularity clump so as to nicely fit later ring candidates. With suitable aggregation pressure, one or more spans may be left without any demands. Once this happens, RingBuilder2 will be able to reach full design coverage without being compelled to use all spans. By forcing some demands to follow slightly longer routes we may use fewer ring systems, at higher fill levels.

Not all eliminations are necessarily helpful: aggregation pressure can be too extreme. For instance in a long haul network, the extra distance related costs of deviating from the shortest path may outweigh the savings of a design using a few less ring systems. And in a metropolitan design, where routing distances may be unimportant economically, excessive aggregation pressure may pile so much demand onto one or a few spans that it forces the use of more rings than otherwise necessary even though many spans have been eliminated.

An example of aggregating routing is shown in FIG. 14. In FIG. 14, route demands are aggregated on span A–E, by routing the A–D demand, A–C demand and A–F demand all through the span A–E. The first demand to be routed sees the normal shortest path routing problem, and follows its shortest route (A–D). The next demand to be routed sees a shortest path routing problem as well but now any spans traversed by the first demand look artificially shorter. A number of functional forms can control the progressive discounting of spans as they attract or aggregate more demand. A parameter built into such a function can control the rate at which the discounting occurs, effectively controlling the 'aggregation pressure'. The effect is dependent on the order in which demands are routed but as more demands are routed, subsequent demands are more and more attracted to spans already carrying demand. If the aggregation pressure accounts for modularity, the tendency will be for demands to flow over fewer spans than with shortest path routing. Span quantities will also tend to approximate multiples of the basic design modularity; for instance if OC-12, 24, 48, and OC-96 ring technologies were available for a design, aggregating routing with M=6 would be appropriate (a 2-fiber BLSR 12 has 6 units of working capacity in each direction out of an ADM).

Aggregating routing can be used to set up a number of runs of operation of the invention where various span eliminations are tested. There are prospects of using fewer systems even if span eliminations are not used because the span quantities tend to be biased to fit into a lesser number of well-filled systems. However, the aggregating router can also be used in a form of systematic study to discover a near best span topology for a ring network as well. Implicit in this is information about which new spans to build and which old spans to eliminate as a network evolves.

The procedure is to begin with an artificially well-connected topology, such as a full mesh. Less generally, however, a telco might have a short list of potential new spans that could practically be built given right of way issues, etc. From this base network, a family of progressively sparser networks can be generated by routing the demands over the base network and increasing the aggregation pressure. If a RingBuilder2 design study is done for each of these routed topologies as the starting point, the minimum cost design implicitly recommends span eliminations and additions.

Bundled Demand Processing

In RingBuilder Version 1, each routed demand was assumed to have unity bandwidth. Thus, if a demand between 2 points was n units of demand in size, RingBuilder processed it as n separate demands. In the method described here, this artificial treatment is eliminated and an n unit demand is processed as a single entity. This has the advantage of greatly increasing the speed of execution during the cycle loading stage. Further, it makes network implementation far easier for the end-user, because all bandwidth of any demand is guaranteed to be transported on the same set of rings.

1:1 System Substitution Post Processing

The completed ring design is analyzed for deployed ADM ring systems that can be replaced cost-effectively by linear systems with diversely routed protection channels. A processor implementing the method looks for all ring systems that have only 2 active ADM sites where traffic is entering or leaving the ring. The processor then attempts to combine the systems which have common active ADM node locations into 1:1 systems, choosing the most effective fibre interconnect topology between the 2 active nodes. One or more ADM-based rings may be combined into a single 1:1 system depending on the 1:1 system bandwidths available.

Ring Loading Procedures

The method uses efficient ring-loading procedures to load the cycle candidates with payload demands in synthesizing ring systems. The user can specify either balance-biased ring loading or capture-biased ring loading on a per-technology basis. Balance-biased ring loading will maximize the specific progress of rings for long-haul networks, while capture-biased ring loading will maximize the specific progress of rings for metropolitan network designs. Each of these ring loading procedures may use 1 of 2 possible demand route sorting procedures. Optionally, intra-ring demand segment alternate routing can be used in conjunction with either of the 2 ring loading procedures in order to improve design optimality.

Balance-biased Ring Loading

Figure 15:
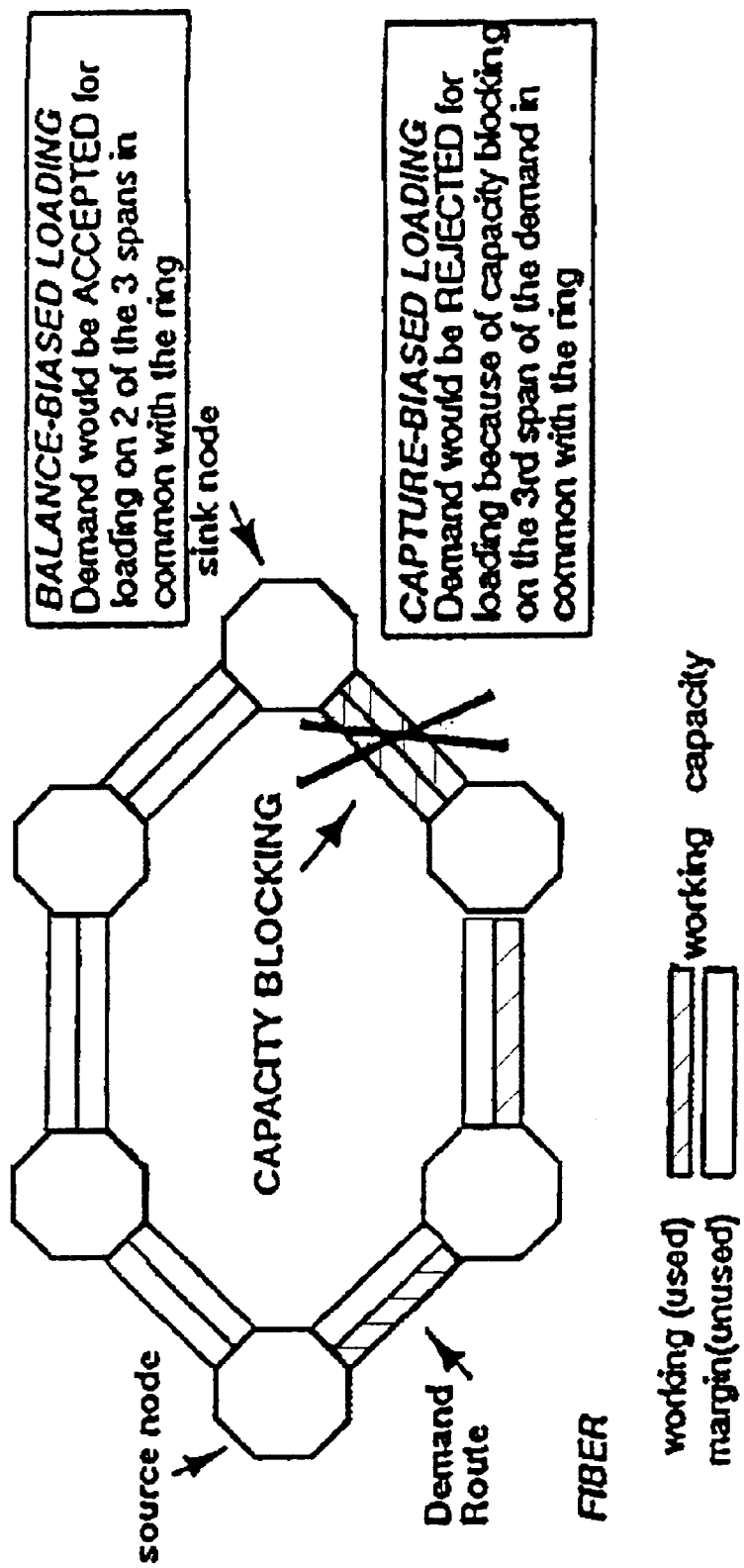
FIG. 15 is a flow chart showing balance vs. capture biased ring loading.

The balance-biased ring loading procedure attempts to load any possible demand segments that coincide with the spans of the ring being examined. This assures maximum ring fill, which in turn ensures that the ring balance is maximized. In order to do this, all demands that have segments in common with the spans of the current ring are collected. Then they are sorted with one of the 2 available sorting procedures. The demand routes are then loaded in this order. After attempting to load all of the demands, the ring is evaluated for specific progress. Balance-biased ring loading is shown in FIG. 15.

Capture-biased Ring Loading

The capture-biased ring loading procedure is similar to the balance-biased one, except that instead of attempting to load any possible demand route segments, it insists that a demand be loaded all along its intersection with the current ring. This incurs minimum excess ring-to-ring transitions, which maximizes the ring capture. Capture-biased ring loading is shown in FIG. 4.

Demand Route Sorting Procedures

Before being loaded, the demands are sorted. RingBuilder Version 2 has two demand sorting procedures available. The first ranks the demands in order of decreasing potential loaded bandwidth-distance product with respect to the ring being loaded. This approach attempts to preferentially load those demands that will contribute most to the design specific progress. The second procedure sorts the demands into 2 categories: those fully contained and those not fully contained by the ring. The filly contained demands are then sorted by decreasing length of involvement in the ring. Those not fully contained are sorted by decreasing ratio of contained hops to total remaining route hops. This approach attempts to maximize the fill of the ring candidate in order to maximize specific progress.

Intra-ring Demand Segment Alternate Routing

The method of FIGS. 3A and 3B optionally allows limited demand rerouting within individual ring systems in order to augment the system utilization. When enabled, the alternate router attempts to find feasible alternate routes for demand segments that were slated for loading in the ring, but were not able to be routed. During the ring loading phase, all demand segments that cannot be loaded are collected. Once all of the demand segments have been processed, the alternate router will attempt to find feasible alternate routes for the 'failed' demand segments. The alternate router will attempt to find a continuous on-ring alternate route all the way from first point of contact to last point of contact. In order for a 'failed' demand to be processed by the alternate router, its native routing must either be contiguously on the ring from first point of contact (source) to last point of contact (sink), or its segments between the source and the sink that are not on the ring must not be already routed in other systems. Any alternate route found must not violate any system technology constraints such as system capacity, ADM count, or ADM port count. Any route that can be added to the loaded ring in this manner will raise the overall utilization of the system, thus potentially raising the specific progress figure of merit for that ring.

Span elimination strategies will now be discussed in more detail. The work on span elimination always involves two main parts: Span Elimination (SE) and Ring Coverage Design (RCD). SE techniques are the actors but we can only view their performance through a repeatable RCD process. Moreover before SE it is essential to identify and exclude from consideration certain spans that cannot be eliminated, either because the graph would become one-connected or un-coverable if there is a limit of number of ring nodes.

Figure 1:
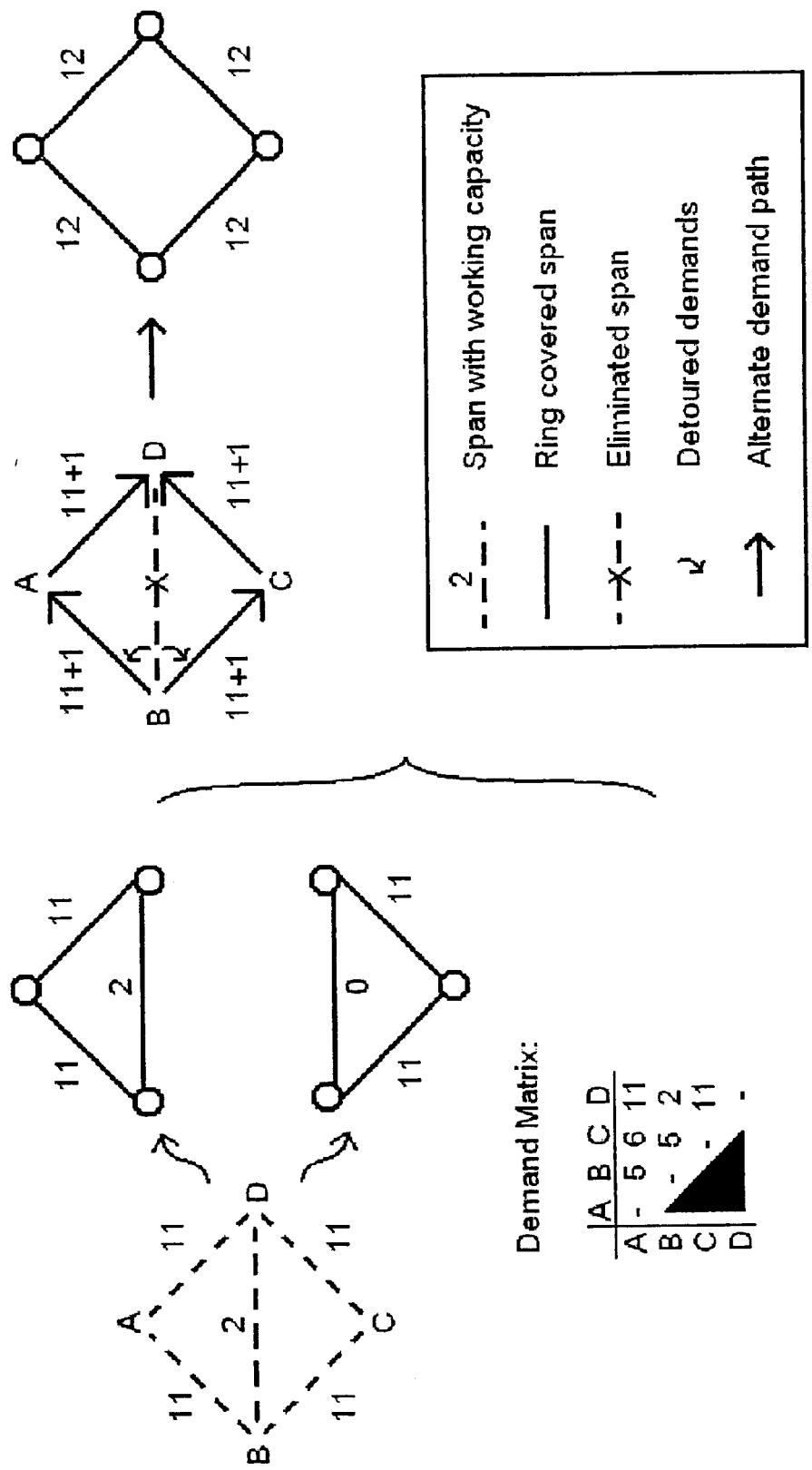
FIG. 1 is a combination flowchart graph illustration of the span elimination concept for use in an embodiment of the invention.

More formally, we begin by finding a minimum bi-connected sub-graph (NOG) of the initial fiber graph. An MBG is a graph having minimum edge weight within which each pair of vertices a and b has at least two vertex-disjoint paths between them. This sub-graph consists of essential spans for bi-connectivity, a necessary condition for a ring cover to exist. Essential spans are excluded from consideration for span elimination. In addition to the essential spans derived from MBG considerations, other spans may be added to the essential spans set if their removal would prohibit one or more other spans from being covered, given a design maximum cycle size (number of hops in a ring). For instance in FIG. 1, if the maximum cycle size was three, span B-D would be essential because the minimum cycle size to cover the resulting sub-graph in FIG. 1(b) is four. The remaining non-essential spans are input to the SE process. We now describe the two SE processes.

Modular Aggregating Pre-Routing (MAPR)

Generally, a shortest-path routing method does not result in an evenly distributed load on spans of the network, leading to inefficient usage of the span capacity in subsequently placed rings. Moreover the quantities of demand that accumulate on spans under shortest path routing have no particular regard or relationship to the capacity modularity of the rings that may be later used in coverage design. The idea behind MAPR is to route demands in a manner that tends to aggregate flows on spans, leaving totals that are well-suited for later modular ring coverage design. The idea is that once a span has some demand on it, to make it look more attractive (cheaper) to subsequent least cost routing determinations, but to cancel the extra attractiveness as soon as a module multiple arises. This creates opportunities for span elimination candidates to arise naturally when all of the demand is drawn away by aggregation pressure onto routes over other well-used spans. A non-essential span having zero working capacity on it after MAPR is considered eliminated. Unlike the IRE method which follows, one run of MAPR results in a full set of simultaneous span eliminations. A more detailed description of the MAPR process is as follows:

First, a minimum bi-connected sub-graph is found. Second, using the maximum cycle size employed in the ring-coverage design process (typically the SONET limit of 16 active nodes) the additional spans essential for hop-limited cycle coverage are also found. The remaining set of span elimination candidates is thus identified. The elements of the demand matrix are next sorted in descending order of size. The pseudo-cost (to be described) is then calculated and assigned for every span in the network. A single unit of demand is then routed at each iteration over the currently apparent "least-cost" path from source to destination. If there are equal least-cost paths, the unit of demand is routed over an arbitrary choice amongst them. Each time a demand is routed, some of the span working quantities change. The pseudo-cost of such spans is recalculated and another unit-demand iteration follows. The aggregation or attracting and clumping together of demands results from the capacity-dependant span pseudo-cost model.

MAPR Pseudo-Cost Functions

The pseudo-cost assigned to each span is determined by its geographical distance and its current capacity requirement (number of demands so far accumulated on it). Two pseudo-cost functions have been developed to implement this technique; namely rise (Eq.(1)) and impulse (Eq.(2)), which are defined as follows:

$C_i$—Pseudo-cost span i.
$d_i$—Geographical distance of span i.
$w_i$—Accumulated demands crossing span i.
M—Span modularity constant The rise pseudo-cost makes a span to have its maximum routing cost just when it reaches a capacity accumulation that is a multiple of the modularity constant. For example, the family of commercially available SONET rings is characterized by M=12, in other words SONET rings have capacities of OC-12, 24, 48, 96 etc. Thus, the spans cost is at the highest when it has accumulated enough capacity that it might be perfectly accommodated in a ring subsequently chosen in the coverage design process. In contrast, as soon as the span has one more demand unit crossing it than one of the module sizes, its cost is set at its lowest value. The logic is that in this state an extra coverage module is implied anyway, so, make this span attractive (low routing cost) in the next iteration. At $w_i$ values between these extremes, the pseudo-cost rises linearly with $w_i$ steadily reducing the aggregation pressure onto this span as it rises towards a next full-module total. Under impulse pseudo-cost, the span has a minimum constant routing cost as long as it has any slack at all vis-a-vis the next modular value. Then, like rise, it has its maximum value at exact 'full module' values of $w_i$.

Iterated Routing and Elimination (IRE)

IRE is an iterative strategy, as the name suggest, with a series of single SE and RCD process calls to search for a set of span eliminations that permits (ideally) the lowest cost coverage design. Following identification of the essential spans as above, IRE begins. IRE needs to be described at two logical levels: one is a low-level iteration at which a single non-essential span is eliminated, the demand matrix is routed in a shortest-path (or MAPR-like) way on the remaining graph, a ring coverage design is obtained, and the resulting design cost is saved. Above this, a breadth-first search is in effect to develop a sequence of accumulating eliminations from the set of non-essential spans.

Every non-essential span is first removed individually, re-routing performed, and a coverage design cost obtained. When this is done for all non-essential spans, the single elimination that corresponded to the least cost coverage design is kept. Then, all remaining non-essential spans are removed individually, (in the presence of the prior elimination), demands re-routed, and a coverage cost obtained. The elimination corresponding to lowest cost in that round is also permanently adopted. And so on. The result is a breadth-first search in the combinatorial space of all possible span elimination sequences. All leaf nodes in this tree are minimal bi-connected subgraphs where no further elimination can occur.

Four test networks and demand matrices have so far been used to test the strategies presented for span elimination. The characteristics of each network are detailed in FIG. 46.

A. Modular Aggregating Pre-Routing (MAPR)

Each of these networks was examined using a variety of module sizes. The ring coverage designs for all the resulting sub-graphs were generated with two different coverage-based ring design tools, namely RingBuilder (v.1) and Span Coverage Integer Program (SCIP).

RingBuilder uses a greedy method, which selects from modular ring candidate system for the network design to achieve a near-optimal placement of ring systems on the network. RingBuilder includes detailed models for network equipment such as fibers, Digital Cross-Connects (DCS), Add-Drop Multiplexers (ADM) and the glass-throughs and repeaters in its costing and optimization strategy.

SCIP is a pure (ideal) capacitated span coverage integer program. SCIP finds the strictly min-cost single-modularity ring set required to cover all the non-zero span working capacities in a network with rings. For SCIP, cost is linearly proportional to the number of hops in the ring. The IP formulation for SCIP is provided in G. D. Morley and W. D. Grover, "Current Issues in Design of Optimized Ring-Based Optical Networks," *Canadian Conf. of Elec. & Comp. Eng.*, May 1999. ollis and C. Xia, "Techniques for Finding Ring Covers in Survivable Networks". SCIP involves certain idealizations such as that every node has an ADM and demands may transit between rings at any location. SCIP is, however, quite useful here as a precisely defined, repeatable, reference model for the RCD phase, through which the effectiveness of span elimination strategies can be interpreted. RingBuilder is considerably less compact for precise specification but is also used, so as to obtain a second prediction of the effectiveness of the span elimination methods, and to see how well RingBuilder and SCIP costs are statistically correlated over a large number of trial runs. (Although in absolute dollars RingBuilder results are always lower than SCIP because of its more accurate problem modeling, we are interested in the usage of SCIP as a quick surrogate for RingBuilder in relative cost comparison contexts.)

FIG. 47 shows the results obtained from SCIP following rise and impulse pseudo-cost rules in MAPR. The #Elim (no. of span eliminations) column represents the number of spans that were removed from the corresponding network by the SE process. For each combination of network and module size, we obtained the min-cost design (SCIP) for the rise and impulse routing pseudo-costs. In FIG. 47 we show only the best result found, in terms of total span modules required in the coverage designs in the Rel. Cost column. The two numbers are first the min-cost result for the strategy with SE and the corresponding cost measure for the purely shortest-path routed network with no eliminations, followed by SCIP. The note (1) indicates the result came from using rise and (2) indicates the result came from using impulse.

Interestingly, the correlation coefficient between SCIP and Ring3uilder results was 0.934. This value suggests that the SCIP results can be well applied as a surrogate for the full-blown RingBuilder designs in purely relative or comparative design studies, while for absolute cost minimization of a real design to be deployed, RingBuilder should be used. Therefore, for the purpose of these studies, comparing SE strategies using SCIP results are a good and practical surrogate for fill-blown RingBuilder runs.

Results confirm the following view of the effects involved in span elimination: as the number of eliminations increase the detouring of demands over longer alternate paths causes the total routing distance consumed to increase the average working capacity on each span, relative to shortest-path routing. When the module size is small, the increase in span loads is more likely to exceed any surplus or slack capacity in the span, resulting in more rings being placed. However, when the module size is large, it is more likely that the slack is large enough to accommodate the increase, resulting in fewer rings placed.

Figure 16:
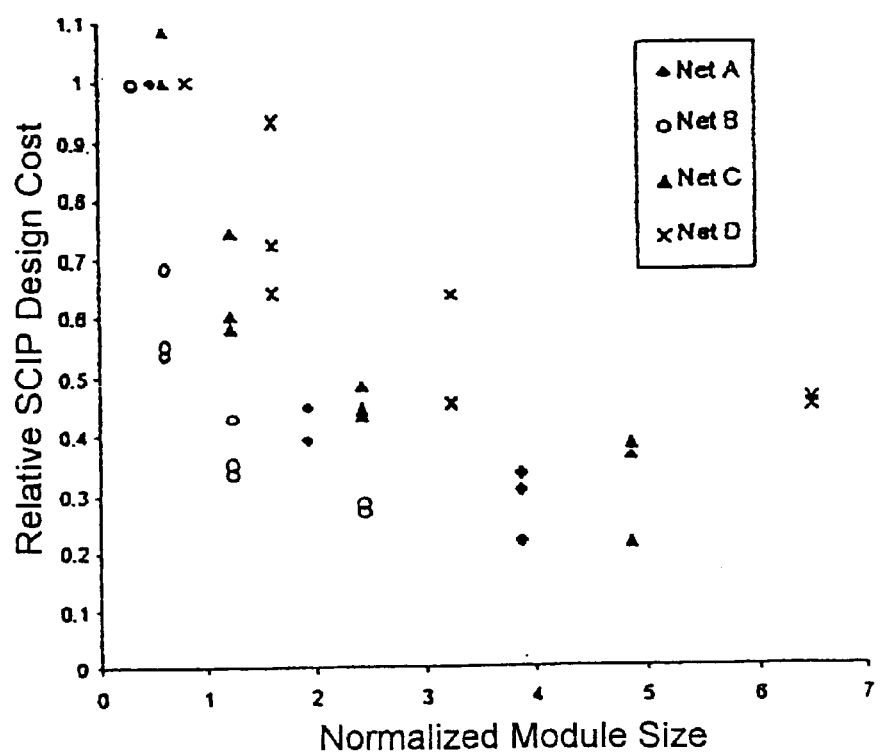
FIG. 16 is a graph showing effect of module size on design cost with span eliminations by MAPR(Nets A–D, pooled data)

Overall, the best results were found when moderately large span module size were used. FIG. 16 shows the relationship between SCIP design cost and module size. The x-axis (Normalized Module Size) is the module size normalized to the average load on spans obtained from shortest-path routing. The y-axis (Relative SCIP Design Cost) is the SCIP design cost normalized by the SCIP results for shortest-path routing with the smallest module size. Here, we see that using larger module sizes generally lead to more-cost effective network designs. With increasing module size, span elimination has even more significant effects on the global cost reductions.

Iterated Routing and Elimination (IRE)

Results for IRE were also obtained for using both ring coverage design methods. Due to space limitations, however, we will emphasize results for the SCIP method for Net B and Net D only, as representative sample results, in FIG. 17.

The module sizes for Net B and Net D were 192 and 48 respectively. The corresponding optimum MAPR results were also included in FIG. 17 for comparison purposes. Each of the results for Net B and Net D corresponds to a specific combination of span eliminations that were found during the IRE span elimination process. Overall IRE gave good design solutions that resulted in significant cost savings.

Figure 17:
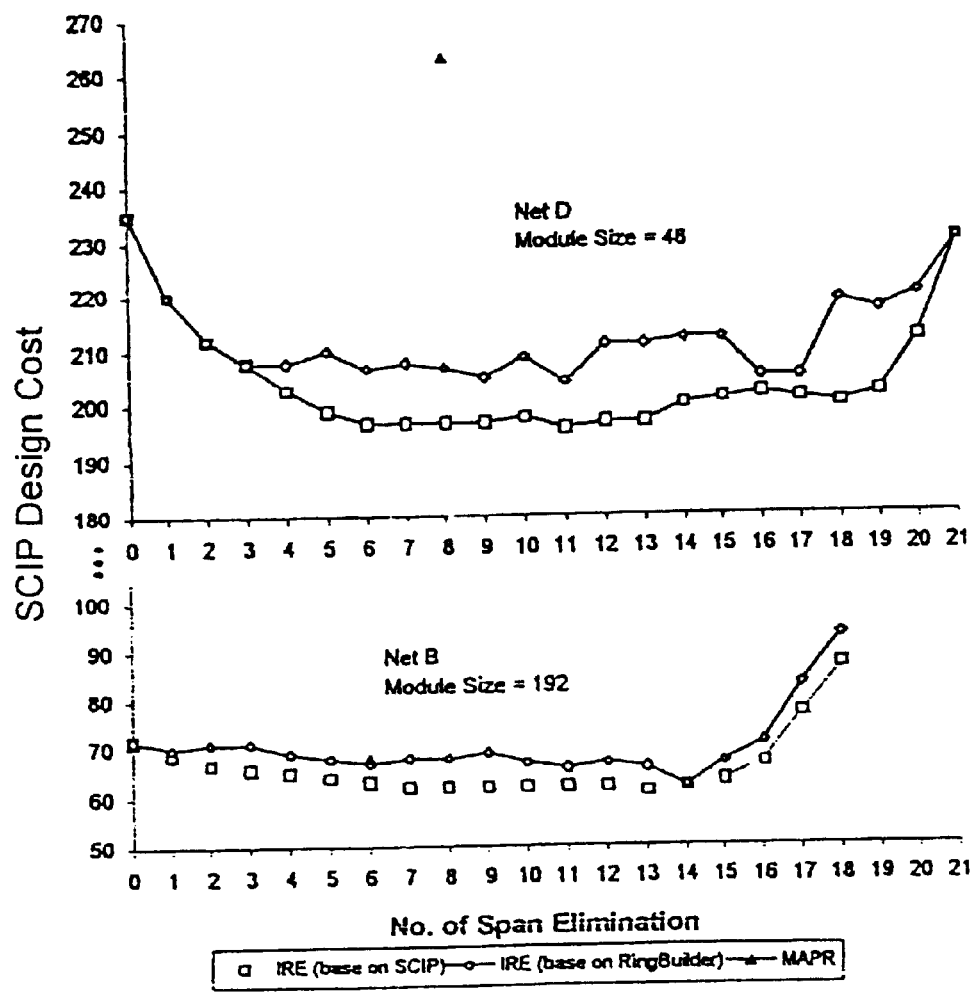
FIG. 17 is a graph showing SCIP results for Net B and Net D using IRE.

In FIG. 17, we observe that a true optimum exists as the number of eliminations increase. In other words it is possible to do too many span eliminations. The first falling section of the curves is when too many rings are emerging in the design. These are lightly loaded rings forced upon the design to cover relatively lightly loaded span. In this region we can save costs by eliminating spans and detouring the affected demands, sending them over longer alternate paths via other rings. Thus cost decreases as more spans are eliminated. A minimum value is reached when the rings and spans achieved the best possible utilization. As yet when more spans are removed, demands are diverted over longer and longer paths, which eventually drives up the capacity requirements until ring capacity is exceeded and additional rings are triggered.

Figure 18:
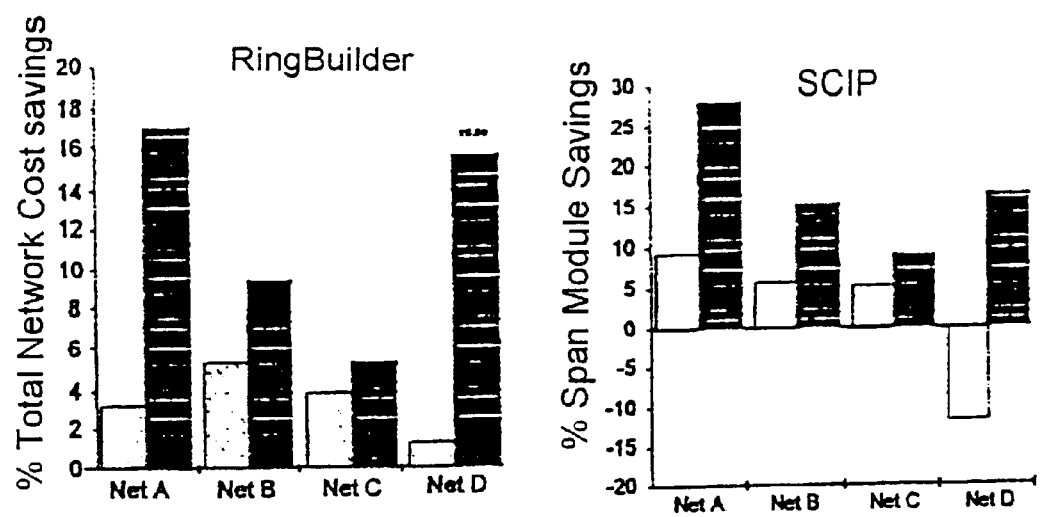
FIG. 18 is a graph showing percentage total network cost savings and span module savings for MAPR(rise) and IRE relative to corresponding shortest path results.

FIG. 18 gives the percentage decrease (increase) in the total design cost for the IRE and MAPR algorithms relative to the cost obtained with shortest-path routing. The total network cost savings reported by IRE range from 5% to 17% as compared to 1% to 5% reported by MAPR. And the span module savings reported is 9% to 28% for IRE and −12% to 9% for MAPR. These results show that the IRE algorithm consistently outperformed the MAPR algorithm. The cost increase of 12% by MAPR (rise) for Net D was a case in point where too many eliminations occurred requiring significantly more or larger (longer) rings to cover the remaining sub-graph within which demands were severely detoured. Here we observe that there are instances where MAPR may not be the suitable approach to use.

IRE generally always out-performed MAPR in this study. IRE is, however, also considerably longer-running than MAPR, so there is a trade-off between them in terms of solution quality and run-time. The fill run-time for IRE is high due to its built in breadth-first search, each iteration of which employs a coverage design. In large networks and/or with a high average nodal degree there may be a large pool of non-essential spans, causing a geometric rise in IRE run-times. In such situation, using the IRE approach may not be suitable or a trade-off in solution quality has to be made. For this reason, in our investigations on Net B, we limited the cycle size to 7 (from a usual of 16), to reduce the number of ring candidates involved in each coverage design iteration. For fast approximate indications of which spans to eliminate, however, MAPR may be sufficient because it forms a view of which spans to eliminate based on near-modular aggregation of routing choices, without solving the coverage problem in the process.

Numerical results using several network models show that both MAPR and IRE can give significant reductions in total design costs obtained from coverage-based ring design tools, relative to designs obtained with the same tools with no span eliminations. MAPR is a simple adaptation of $O(n^2)$ shortest path routing techniques, with capacity-sensitive pseudo-costs in a strategy that is aiming to aggregate demands to be well suited for subsequent modular design, and to cause elimination of spans due to aggregation pressure in the routing. MAPR shows total reductions in network cost (with RingBuilder) and span module counts (with SCIP) ranging from 1% to 5% and −12% to 90%, respectively.

The total reduction in network cost and span module reported for IRE range from 5% to 17% and 9% to 28%, consistently outperforming MAPR. However, the complexity and the computing cost for IRE is high compared to MAPR. In general, results show that IRE offers vital topology optimization, significant cost reduction and an effective pre-processing tool to enhance the results emerge from a coverage-based design tool.

The results from SCIP also showed a close correlation with these results, implying that SCIP could be a useful surrogate for the proposed designs in comparative studies related to topology design or evolution for ring-based networks.

A candidate ring may be any one of a number of transport systems: a 1:1 DP, UPSR, or BLSR, at any one of several OC-n modularities, lying on a specific cycle, with specific demand segments mapped into it, and with the corresponding active and glass-through sites, all costed in detail for line distance costs, regenerators, terminals, add-drop interfaces etc. The merit of such fully detailed structures is their absolute construction cost relative to the total transport demand served, i.e., "specific (transport design) progress".

Due to the immense complexity of a complete optimal network design, the proposed method is necessarily sub-optimal, yet provides a beneficial approach to ring design. To improve the choice of rings, it is proposed to use an IP (integer program) formulation written not for the full blown design problem, but for the secondary problem of making a collectively good choice of transport systems to place from a library of candidates that is generated by the method of FIGS. 3A and 3B and selected for consideration based on reasonably high figures of specific progress. Attractive properties of the following method appear to be that a more globally optimum collective choice of rings is made, but also this choice will inherently consider span elimination issues, with no explicit efforts to explore the sub-topology issue.

Phase 1: Build a "vocabulary" of system candidates

1. Start with the full graph of network fiber spans.
2. Route all demands over shortest paths
3. Apply one iteration only of the method of FIGS. 3A and 3B , and also RingBuilderVersion1.
4. Keep the top-ranked P system candidates. (P (or ~O(S*P)) will be a working number of system candidates that is carried through to the IP below.)
5. Remove one span (which may be the most lightly loaded) from the graph above.
6. Repeat steps 2 through 4. Either (a) add the P best candidates found to the working set above (leading to the O(S*P) sized working set), or, just retain the P best candidates now seen over all prior iterations (i.e., continually merge, sort and select the top P as the working set of system candidates.) candidates).
7. Steps 2–6 complete when the graph is reduced to a bi-connected minimal subgraph.

At this stage a set of P "good candidates" has been developed. They are mutually inconsistent in many ways in that they may individually assume adoption of the same demand segments independently.

Amongst this set, as generated by the systematic graph reduction process above, are, however, a wide variety of demand routing and ring system possibilities that embody no constraint of covering all the spans of the network, i.e., there are many 'span eliminators' amongst this working set. Many other procedures could be used to populate this working system set, including individually good rings favoured by human planners, varieties of RingBuilder runs, even rings developed by manual planning systems such as SONET Planner.

Another advantage is that this working is easily filtered/ modified in detail at this stage for specific constraints such as number of active nodes, regenerator spacings, etc.

Phase 2: Process the Candidate Set for demand coverage.

In this step, each candidate is examined to define a vector of indicator variables that will be used in the IP. In practice these may be generated at the same time as the system candidates are generated above. Two indicator variables are proposed:

$\delta_r^k(i,j)=1$ if the kth demand bundle routed between o-d pair (i,j) is served (in whole or in part) by the $r^{th}$ ring system candidate. r=I . . . P $\alpha_r^k(i,j)=1$ if the kth demand bundle routed between o-d pair (i,j) is captured by the $r^{th}$ ring system candidate.

Phase 3: Integer Program to Select a Set of Systems.

With the P system candidates, and the indicator variables above, an IP is written that basically just asks for "min cost subject to all demands being served". With $\delta_r^k(i,j)$ currently defined above, the resultant may not be a strictly complete design, since some demand segments may be left unserved. It is however be a highly effective "foundation component", from which a second iteration, or with a revised system of indicators, a complete design may be obtained.

The simplest formulation would be:
min cost design foundation:
minimize:

$$\sum_{r=1}^{P} C_r \cdot \gamma_r$$

subject to:

$$\sum_{r=1}^{P} \delta_r^k(i, j) = 1 \text{ for every } (i, j), k$$

where:

Cr is the fully constructed cost of system candidate r if included in the design, with its specific demands, glass-throughs, routing etc.

$\gamma_r=1$ if the $r^{th}$ system candidate is chosen for the design.

The result of this is a set of systems, collectively chosen for min cost, which at least serves or "handles" each demand bundle that is defined in the input data. This is not in general, therefore, a complete design because although each demand is 'handled' once, it may have segments that are left uncovered. However, we have seen that in good designs in general, a large fraction or majority of demands are served within a single ring, and few traverse more than two rings. This tendency is especially true in a metro design context. With this one IP run and incomplete, but very attractive founding component of a complete design is obtained. The system variables may then be redefined for the uncovered residual demand segments only, and the IP repeated. If this were to work as anticipated, then one might arrive at complete designs in only 2 or 3 IP runs. Experience suggests, however, that when only small fractions of the total demand remain uncovered, a heuristic approach to completing the design might be more effective. Also, after the first IP run above, a practical step would be to inspect each uncovered residual demand segment for opportunities to re-route it in a way that 'packs' it into one of the now-placed systems.

Note that a special case, in which one run of the above IP would produce a complete design, is when the systems list is constrained only to include systems that were evaluated only with demands that they fully capture. Then the design would be an optimal selection of full capture rings. This is worth noting for the important special case of metro network ring planning. Notably, it would also represent a new class of network; single ring demand capture networks. For instance, with a ring net-work plan where all demand was known to be contained in one ring, DCS would not be required between rings. The ability to send demands to nodes on a disjoint ring is still needed, but this would be represented in such networks as a pair of apparent demands between each of the true O-D nodes and a prescribed limited number of hub nodes, where rings can be interconnected.

Another approach that might increase the extent of the "foundation design component" in terms of covering the demands would be to give a 'credit' for outright capture of demands, with a multi-criterion objective function such as: minimize:

$$\sum_{r=1}^{P} C_r \cdot \gamma_r - f_{cap} \cdot \sum_{r=1}^{P} \sum_{\forall (i,j),k} \alpha_r^k(i, j)$$

subject to:

$$\sum_{r=1}^{P} \delta_r^k(i, j) = 1$$

for every (i,j),k where $f_{cap}$ is an arbitrary credit factor for system choices that happen to be biased towards full capture.

In the multi criterion objective function approach; if $f_{cap}$ is zero, we get a min cost 'foundation design' that at least 'handles' every demand bundle once. If $f_{cap}$ is very dominant, we get a fall capture ring-set, to the extent that the candidate set supports it.

This section describes algorithms comprising the Ring-builder™ Version 2 software. RingBuilder is implemented as a collection of modules implemented in a hierarchical framework. The data relationships created and manipulated as well as the modules that do the processing are described.

Figure 19:
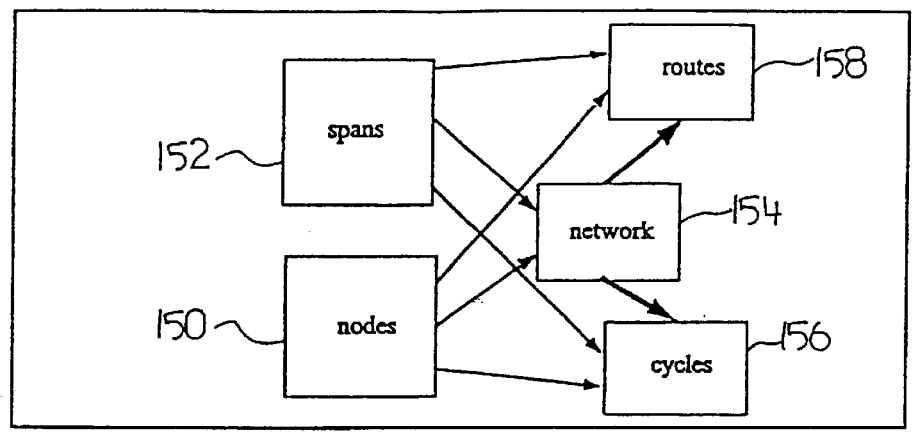
FIG. 19 shows the relationship between the node and span 'atomic' entities and the network, cycles, and routes.

In generating a design, RingBuilder™ operates on a network, deploying rings to transport a set of demands presented to it. The network that RingBuilder™ operates on is described in terms of the spans and nodes that comprise it. The payload routes that RingBuilder™ processes and the cycles that RingBuilder™ uses to form a network design to accommodate that payload are also described in terms of these atomic entities. FIG. 19 shows the relationship between the node 150 and span 152 'atomic' entities and the network 154 cycles, 156 and routes. 158 The routes 158 traverse physical paths along existing network nodes 150 and spans. 152 They are loaded onto cycles 156 which are formed out of non-looping collections of adjacent node-span combinations existing in the network. RingBuilder™ processes the cycles 156 and routes 158 in terms of their node/span descriptions.

In performing the ring network synthesis, RingBuilder™ operates with 4 basic entities: cycles 156 loaded cycles, routes 158 and loaded routes. Each of these constructs is related to the network 154 and the demands in terms of the spans 152 and nodes comprising them.

The route 158 structure is a persistent entity which describes the path of the routed demand through the network and the rings that form the physical medium for transport of the demand from source to destination. The route 158 is described as a collection of nodes 150 and spans 152 describing the trajectory through the network that a point-to-point demand follows from source to destination. The logical (hop count) and physical distance of the route 158 is stored as is the bandwidth. Per-span vectors exist to record which rings the spans 152 are loaded onto, and where on those rings the route spans 152 are loaded. Per-node vectors exist for recording where route nodes 150 exist within the ring, and which of these nodes 150 are ring-to-ring transition points. The route 158 structure also contains a transition count for the route 158 and a count of unrouted links. Because the route 158 is persistent, it exists for the entire time Ring-Builder™ is running. The route data structure is shown in FIG. 48.

A cycle 156 is a closed, non-looping path through the network. It is described by ordered lists of the nodes 150 and spans 152 comprising it. In addition to this, the cycle entity contains information about the logical length of the cycle 156. Each cycle 156 is a member of a vector of linked lists of cycles. The vector is ordered by cycle 156 length in hops, so each member of the linked list associated with a vector has the same hop count. The cycles 156 are stored in a format that allows the cycles 156 to be uniquely identified. They are stored with the lowest numbered span first, followed by the lowest numbered adjacent span. FIG. 49 shows the basic cycle structure.

The route structure is a non-persistent entity that is created for every route 158 being considered for inclusion in a cycle 156. The loadedRoute structure points to the corresponding persistent route, 158 containing information that will be used by RingBuilder™ to update that route 158 should the cycle 156 being loaded be chosen to be a ring in the design. This structure contains the route number, a count of the potential number of hops this route 158 may be carried for in the cycle 156 under consideration, the potential total demand bandwidth distance product of this route in the context of the cycle 156 under consideration (both factors used in the determination of the desirability of the route in loading the cycle), the incremental ring transitions, add-drops, and links on count as a result of loading this route, a flag indicating the route status (whether it is valid to load, loaded, alternate routed, or not loaded), and a flag indicating that an alternate route exists for this cycle 156. If the cycle 156 is not chosen as a ring, the loaded routes are all discarded with the cycle. The loadedRoute structure is shown in FIG. 50.

The loadedCycle is a non-persistent entity that is created every time a cycle 156 is to be loaded and evaluated. It points to the cycle 156 in the persistent cycle data structure. The loadedcycle contains cycle-related statistics and span- and node-related statistics. The cycle related statistics include transition count, balance transition count, add/drop count, links on count, and ADM count. The span-related statistics include: remaining bandwidth, links on count, and route count. The node-related statistics include add/drop count, transition count, and balance transition count. Also in the loaded cycle structure is a vector of linked lists. Each of these linked lists contains the list of demands that have been loaded onto each span 152 of the cycle. FIG. 51 shows the loadedcycle structure.

Figure 20:
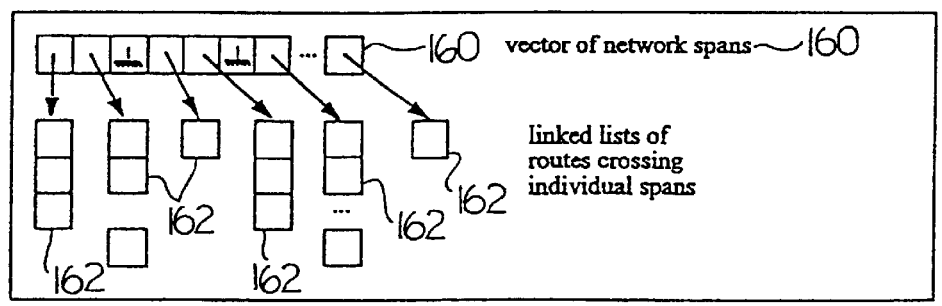
FIG. 20 shows the span2Route data structure which is used within RingBuilder™.

FIG. 20 shows the span2Route data structure which is used within RingBuilder™. This persistent data structure relates the list of network spans 160 to the linked lists for the individual route segments that cross each individual span in the network 162. This data structure eliminates the need to look through each individual route 158 when trying to load the individual spans of the cycle 156 under consideration.

Figure 21:
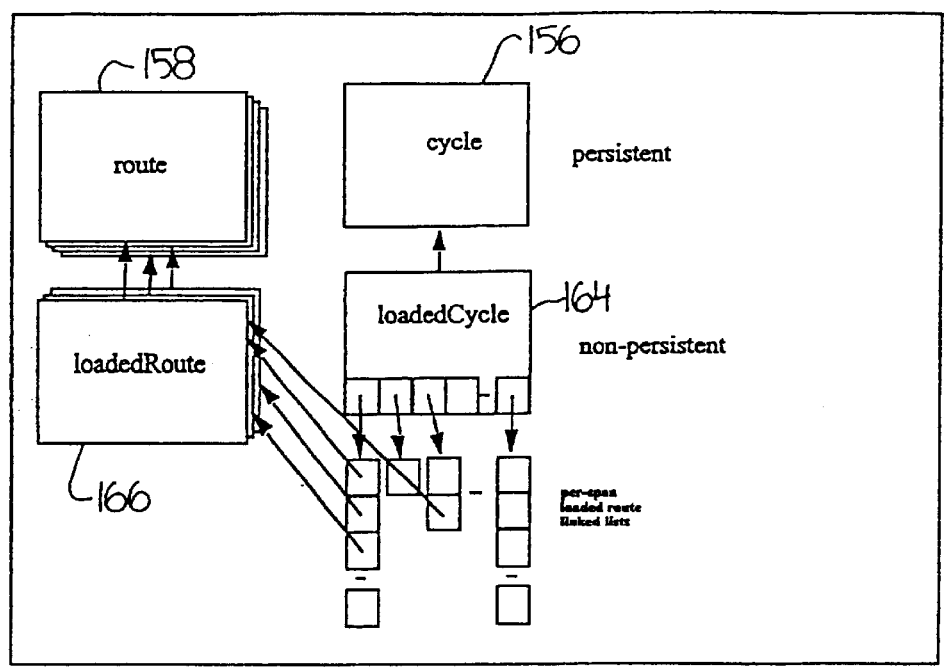
FIG. 21 shows the relationships between the 4 main data entities that RingBuilder™ uses.

FIG. 21 shows the relationships between the 4 main data entities that. RingBuilder™ operates on. In the context of a network, RingBuilder™ loads segments of routed demands (routes) 158 onto each cycle 156, forming a loaded cycles 164 for each cycle 156. The loading heuristic attempts to pick the best possible set of demand segments in order to make the loaded cycle 164 as appealing as possible to the cycle evaluator. The cycle evaluator chooses the best loaded cycle, and that cycle becomes a ring in the network design.

The cycle data structure and the route data structure are persistent; they remain in existence throughout the entire design. Every time a new ring is chosen in the design, the route data structure is updated to reflect the fact that some route segments that have been loaded and thus do not have to be considered again for loading onto subsequent rings.

Figure 22:
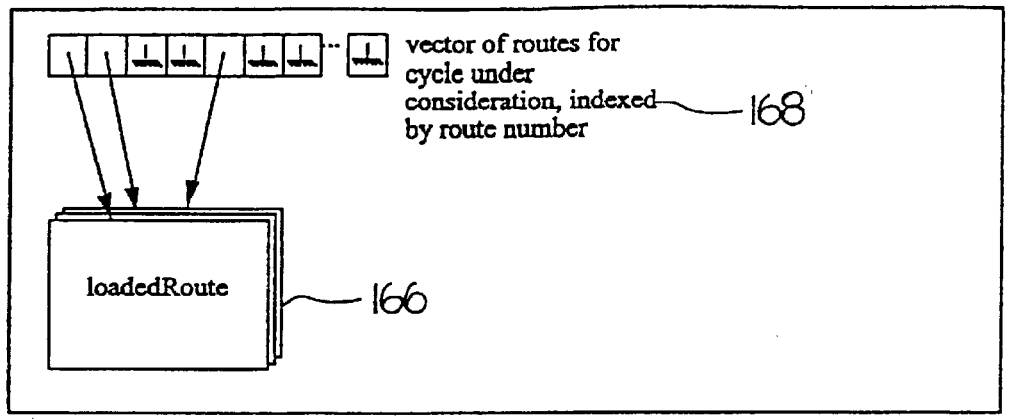
FIG. 22 shows the Loaded Route Vector used by RingBuilder™.

FIG. 22 shows the loaded route data structure 166 that is created when a loaded cycle data structure is built for evaluating a cycle. The loaded cycle has a vector of routes which are candidates to be loaded onto the cycle 168. The vector 168 has an element for every route of every demand. The element number is initially equal to the route number. Those routes that do not have any spans 152 in common with the cycle under consideration have their respective elements loaded with NULL. Those routes that can potentially be loaded onto the cycle have their respective elements loaded with a pointer to a 'loaded route' in the loaded route data structure 166.

Figure 23:
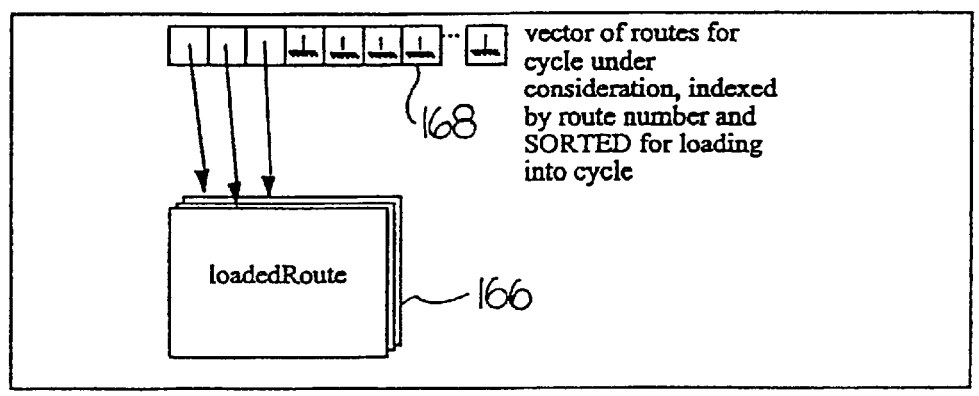
FIG. 23 shows the RingBuilder™ vector of routes after the sorting process.

This vector of routes 168 is then processed, with the routes 158 being sorted to improve the potential fill of the cycle 156. After sorting, the vector 158 element numbers are no longer correlated with the route number, as the vector elements are now ordered with loaded route pointers in order of decreasing route desirability. All of the NULL pointers are placed at the end of the vector. The vector of routes 168 after the sorting process is shown in FIG. 23.

The basic criteria for sorting is length of route travel along the cycle 156 under consideration. In the case of non-unity sized demand routes, the ordering becomes decreasing demand bandwidth product travel along the cycle 156 under consideration.

For each cycle being loaded, a non-persistent loaded cycle data structure is created; this data structure only exists until the candidate loaded cycle is loaded and evaluated. If the loaded cycle is the best loaded cycle evaluated, it is nominated to be the 'best loaded cycle'; otherwise it is discarded. If the loaded cycle is better than an existing best loaded cycle, the current best loaded cycle is discarded and the new loaded cycle replaces it as the 'best loaded cycle'. The 'best loaded cycle' that remains after all of the cycles have been evaluated is the one that becomes a ring in the design.

The loaded cycle data structure contains a per-span vector of linked lists. Each element of each linked list contains a pointer which points to a loaded route non-persistent data structure. Each of the loaded route data structures points to its persistent route data structure counterpart. If a loaded cycle becomes the 'best loaded cycle', the accompanying loaded route data structures associated with that cycle are copied, effectively becoming the 'best loaded routes'. If a loaded cycle is discarded, so are the 'best loaded routes' associated with that loaded cycle.

Figure 24:
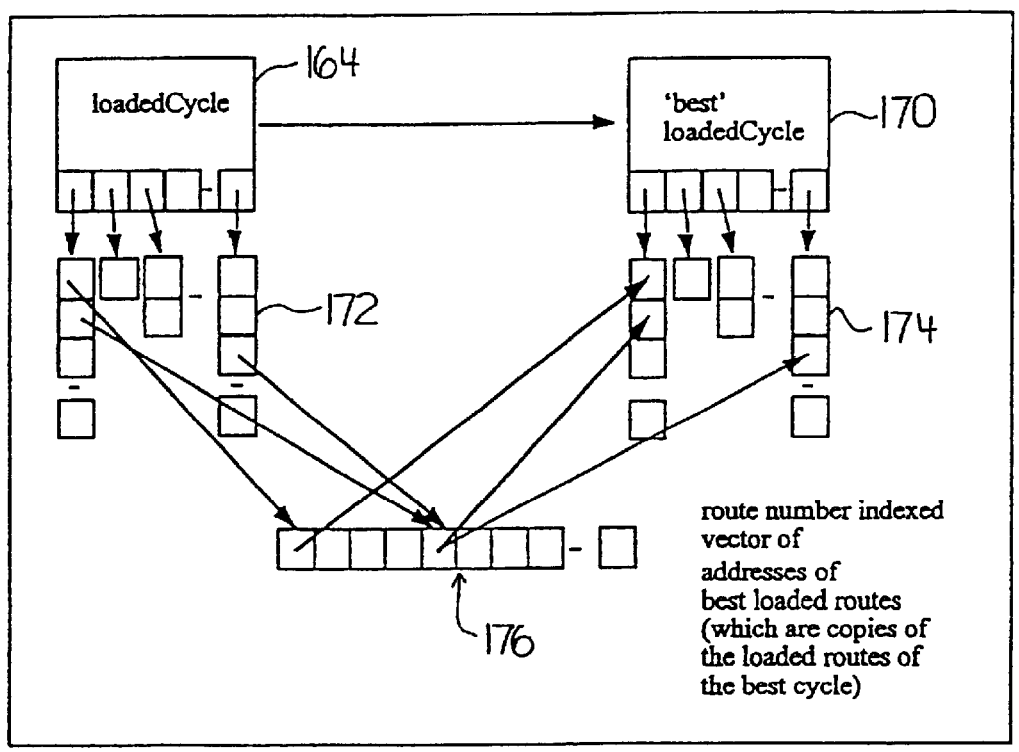
FIG. 24 shows the relationship between the loaded cycle structure and the 'best' loaded cycle structure in RingBuilder™.

FIG. 24 shows the relationship between the loaded cycle structure 164 and the 'best' loaded cycle structure. 170 When it is determined that the current loaded cycle is to be nominated to be the best loaded cycle, the existing best loaded cycle (if it exists) is discarded and the loaded cycle structure 164 is copied. In addition, each of the loaded route structure elements of the loaded cycle 172 is also replicated. Then the span-based vector of linked lists 174 for the best loaded cycle are recreated, using the copies of the loaded route structure elements. To facilitate this, a route number indexed vector 176 translation table is used to load the address of the copy of the loaded route structure into the vector of linked lists for the 'best' loaded cycle 174. The best loaded cycle vector cannot have linked list elements pointing to the original loaded route elements because of the requirement to optionally do intra-ring alternate routing of the demand segments that were unable to be loaded onto the ring. With this optional alternate routing, provision had to be made for storing a 'best loaded cycle' before alternate routing fill augmentation so that the augmented loaded cycle could be evaluated independently of the non-augmented cycle.

Figure 25:
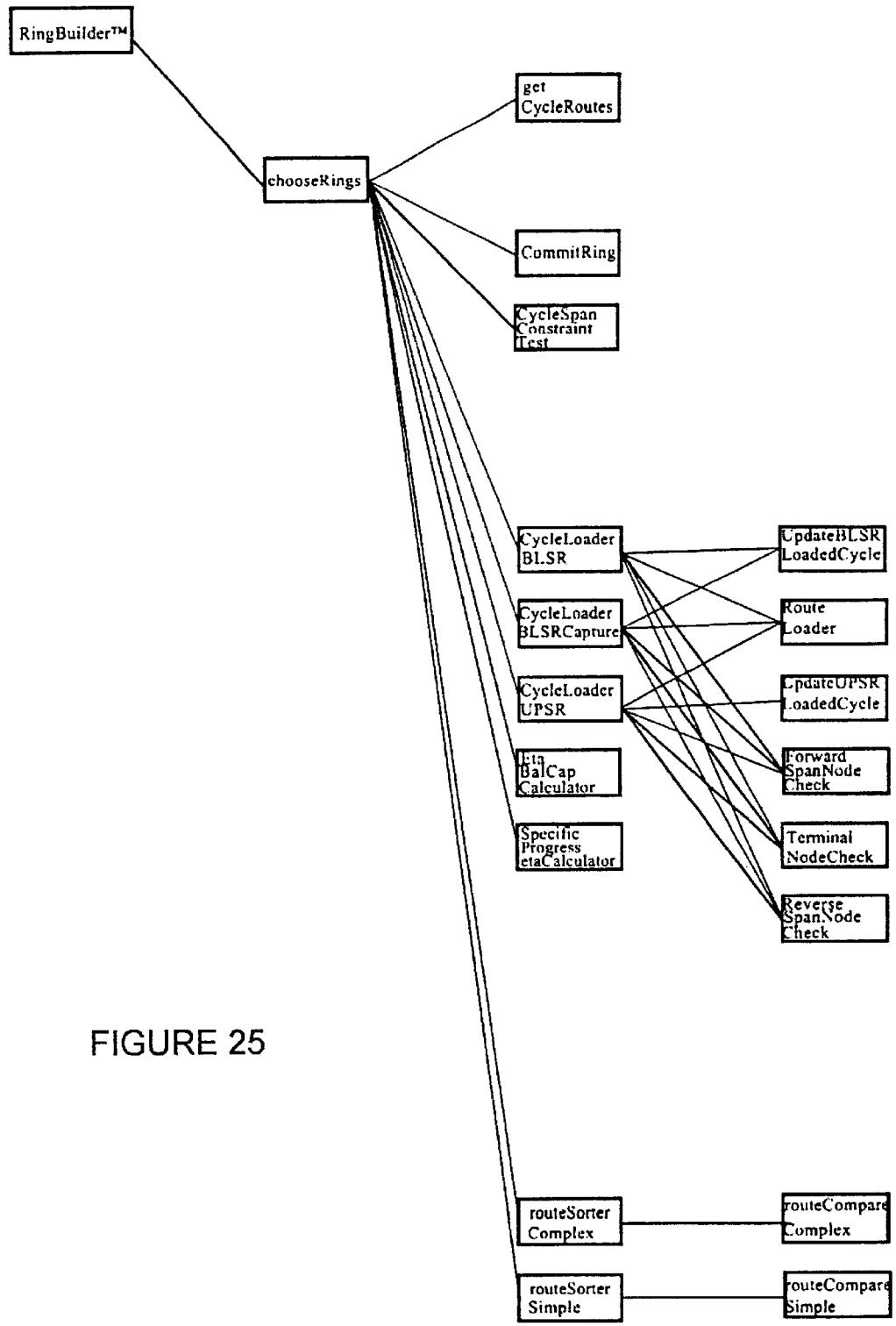
FIG. 25 shows the set of main processing blocks in RingBuilder™.

RingBuilder™ is structured hierarchically with a top level routine which handles most of the initial activity calling the main iterate block which in turn calls selected processing blocks." The set of main processing blocks is shown in "Key Ring-Builder™ Modules", FIG. 25. Each of these main RingBuilder™ elements is described below.

Figure 26:
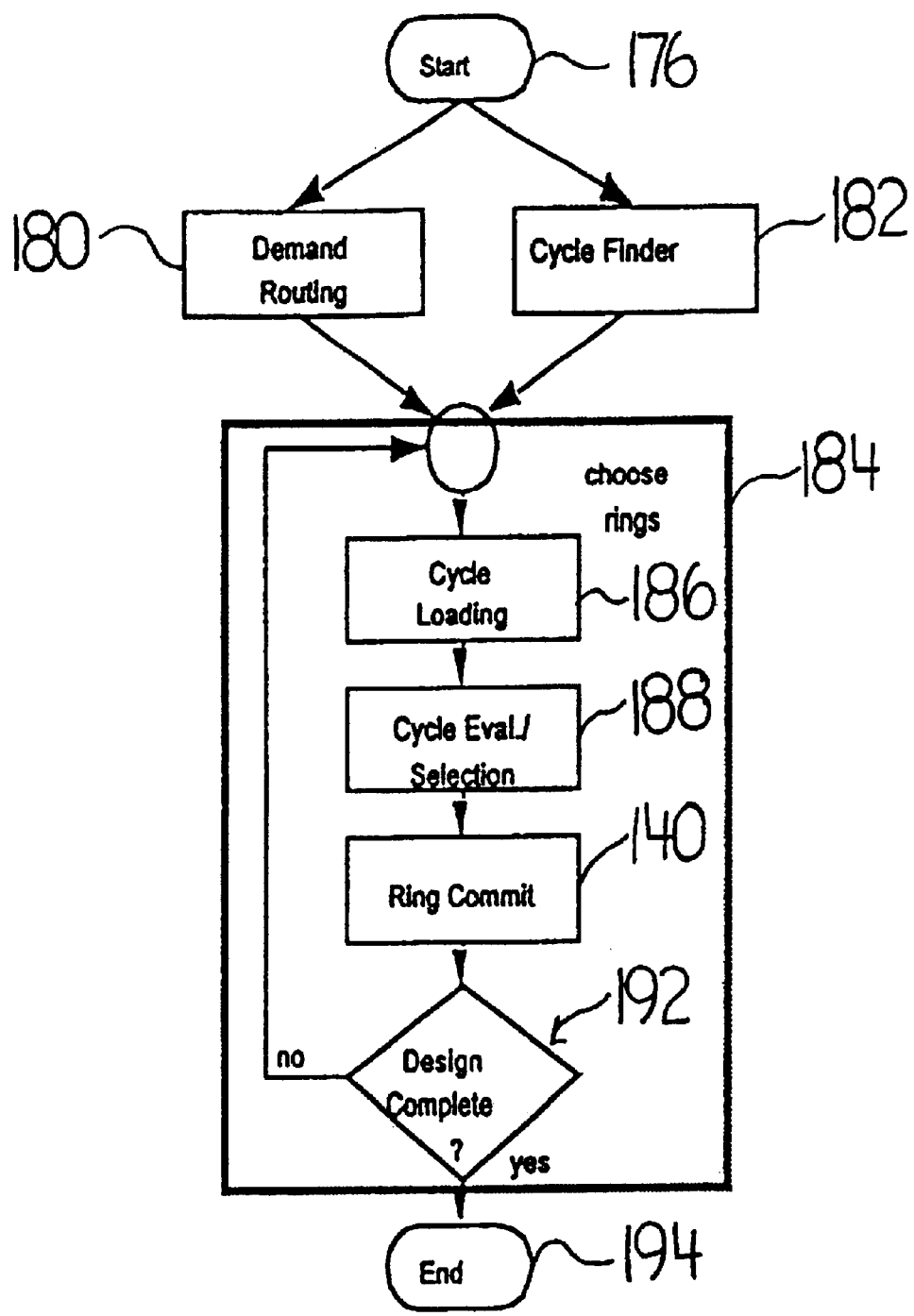
FIG. 26 shows the basic structure of RingBuilder™.

FIG. 26 shows the basic structure of RingBuilder™. The whole process starts 178 with demand routing 180 and cycle finder 182. These two processes are independent of one another. Both make use of the network file information, in Standard Network Interface Format (SNIF). As implemented, the demand routing process is physically done before the RingBuilder™ main is called. The cycle finder 182 is called by RingBuilder™. Once the demand routes are generated and cycles are found for the network, the rings are chosen 184 for the network. The ring selection process is an iterative one in which all cycles are loaded 186 with demand route segments, the loaded cycles are evaluated 188 and the best cycle is chosen 140 to be a ring in the design. The process iterates, with the cycles being loaded 186 with the remaining demand segments and evaluation/selection 188 occurring and rings being committed 140 until the design is complete 192,194.

FIGS. 27A, 27B and 27C provide a detailed view of the chooseRings block 196.

This function contains RingBuilder™'s main iterative loop. Program control remains within chooseRings 196 until the design is complete at 198. Each cycle is evaluated in the context of each ring technology being considered. The cycle span constraint test 200 will return a value to the cycle/technology suitability test 202, which will eliminate potential the cycle that cannot be loaded by the technology without further evaluation. For each technology, a set of routes that can potentially be loaded is found 204 and then sorted by the method specified by the route sorting strategy 122, simple 124 or complex 126 route sorting. Simple route sorting 124 sorts in order of decreasing involvement with the cycle under consideration. Then the routes are loaded with one of the available loading functions (either UPSR 128, BLSR balance 130, or BLSR capture 132), as mandated by the technology chosen.

The UPSR loader 128 is used when a unidirectional path switched ring technology choice must be evaluated. The BLSR balance loader 130 is used when a bi-directional line switched ring technology is to be evaluated. The balance loader attempts to maximize the fill of the ring by loading any segment of any demand that can be loaded onto the ring, without regard to the amount of required transitioning onto or off the ring. This loader is especially useful in long-haul networks, where the transport costs are large relative to the inter-ring interface costs. The BLSR capture loader 132 is called when a BLSR technology is to be loaded while minimizing the amount of transitioning on and off the ring under consideration. This loader is of use when inter-ring transition costs are relatively large compared to the bandwidth transport cost. This can be the case in metropolitan networks.

Once the ring is loaded, it is evaluated via the eta calculator function. The optimization strategy 206 determines the figure of merit, eta, which can be a measure of balance/capture 208, specific progress 134, or a combination of these. If the cycle is determined to be the best cycle at 136, it is stored 138, with the previous best cycle being discarded. If the cycle is not the best cycle, it is discarded 136, unless alternate routing is enabled. Based on the technology chosen, if alternate routing (fill enhancement) is enabled 210, the loaded cycle(whether or not it is already chosen to be the current 'best cycle'), is again considered, with routes that could not be loaded onto the cycle re-evaluated. This re-evaluation process begins with determination of an alternate path 212 within the ring for the failed route. Once all of the 'failed' routes have been considered in this manner, all alternate demand routes are then presented for loading onto the cycle 214. This results in an 'augmented loaded cycle' which again is evaluated according to the optimizing strategy 206 which chooses a figure of merit calculation such as balance/capture 208 or specific progress 134. If the alternate loaded cycle is the best cycle 136, it is stored as the best cycle 138, otherwise it is discarded.

Once all of the cycles have been evaluated, the best cycle found is committed as a ring in the design in the Commit Ring module 140. Commit Ring updates the persistent route data structure and also the span2Route data structure.

ChooseRings terminates once all of the demands have been completely routed, or no further progress towards routing all of the demand links can be achieved. The design will be incomplete if demand segments exist that cannot be covered by cycles, such as when demands emanate from nodes that are only singly connected to the rest of the network.

The CycleSpanConstraintTest module 200 verifies that the fibre available on any span being considered has not been exhausted. CycleSpanConstraintTest is shown in FIG. 28. By examining each span of the cycle under consideration 214, CycleSpanConstraintTest is able to determine 216 whether a particular system technology would exhaust the fibre capacity before the cycle is loaded. CycleSpanConstraintTest starts by initializes a fail test value, failSpanConstraint, to false 218 and changes this value to true 220 if the fibre would be exhausted. The value is returned to chooseRings at when CycleSpanConstraintTest finishes.

The getRoutes function 204 illustrated in FIG. 29 creates a list of routes for the cycle being loaded. It does this first by obtaining the list of spans 232 comprising the cycle, and then for each cycle span, obtaining from the route list the set of routes crossing the span 224. If the route has not already been seen, a new cycle route list entry is made 226, otherwise the existing entry's potential hop count and potential bandwidth distance travel product is updated at 228. The getRoutes function terminates once all routes crossing all of the spans of the cycle have been considered. The cycle route list has the routes stored in order of route number, as shown in FIG. 22.

The RouteSort function 230, shown in FIG. 30, takes the route list 232 generated by getroutes 204 and, using a quicksort 234, reorders the list of routes in order to maximize the overall fill of the cycle being loaded. The routeCompare function compares routes and promotes those that have a higher involvement with the cycle as measured by potential bandwidth-distance product. The quick sort routine could be replaced by other techniques in future versions of RingBuilder™

The route list is updated 236 and returned to chooseRings in preparation for the actual cycle loading.

Other heuristic sorting processes can be used; one heuristic that has been implemented in previous versions of this software is a multiple stage sort routine that actually traverses each route through the cycle under consideration, measuring involvement in terms of hopcount distance of the route with the cycle, and sorts them by this involvement metric.

FIG. 31 shows the routeCompare function 238 called by the quick sort routine 234. The routeCompare function promotes the route with the higher bandwidth-distance product a 240. If the two routes have the same bandwidth-distance product, the relative order of the routes is maintained 240. If one of the routes is NULL because it has no involvement with the cycle, it is demoted 242,244 relative to a route with some involvement with the cycle.

The complex route sort module has the same structure as that shown in FIG. 30, but qsort calls the RouteCompareComplex 246 routine instead of RouteCompare. RouteCompareComplex 246 is a hierarchical sorting routine, as shown in FIG. 32. The RouteCompareComplex routine first sorts the list of routes to remove the null route members 248. Then it sorts on the basis of potentially fully routed routes 250, promoting those routes that can be fully routed over those that cannot 252. Then it sorts on the basis of ratio of potential routed hop count to unrouted links 254. In case of a tie in that ratio, routes are promoted on the basis of potential working bandwidth-distance product 256. In case of a tie in that case, the routes are sorted based on potential hop count of travel 258 on the cycle.

FIGS. 33A, 33B and 33C show the process flow for the BLSR balance type cycle loader. This loader attempts to maximally fill the cycles being loaded by loading any part of any demand that can be accommodated. This function checks every route which has potential involvement with the cycle. The route is examined span by span, and a route span loaded vector is created which records which spans of the route are to be loaded by the route loader function. The spans and associated nodes 266 are examined by the Forward Span/Node Check function 270. If a span is failed by the Forward Span/Node checker 270, the span is marked as not to be loaded 278 in the routeSpanLoaded vector, and the contiguous segment reverse span/node check and route vector update function is called 280. This function traverses backwards along the last contiguously loaded segment of the route trajectory, assessing the impact of the inability to load the current span. This function updates the route span loaded vector as it proceeds backwards, changing span status from to be loaded to not to be loaded as required. After the contiguous segment reverse span/node check is complete, the loader goes on to the next span.

If the span passes the Forward Span/Node test, and if the span being examined is the last span of the route, the Terminal Node Check function is called 274 This function examines the terminal node to see if the required add/drop activity can occur here. If the Terminal Node Check fails, the span is marked as not to be loaded 278 and the loader goes onto the next span. If the Terminal Node Check passes, this span is marked as to be loaded 276. If this is not the last span of the route, the cycle loader continues on to the next span.

Once all of the spans have been examined for a route, the Route Loader function 282 is invoked. The Route Loader 282 takes the information contained in the routeSpanLoaded vector and processes the route accordingly, updating the 'loaded' spans of the route in the loaded route data structure.

Then the 'Update BLSR Loaded Cycle' function is called 284. This routine updates the loaded cycle data structure with the new information about the segments of the current route that are being loaded.

The BLSR Cycle loader then continues, starting this whole process once more with the next route. The BLSR Cycle Loader continues until all routes have been processed, returning control once more to the chooseRings routine.

FIGS. 34A, 34B, 34C and 34D show the process flow for the UPSR cycle loader 128. This loader loads the cycle topology as a Unidirectional Path Switched Ring, and thus sufficient bandwidth must be available around the circumference of the ring in order for a demand segment to be loaded, independent of length of travel of the route on the ring. As with the BLSR loaders, this function checks every route which has potential involvement with the cycle. Each route is examined span by span, and a route span loaded vector is created which records which spans of the route are to be loaded by the Route Loader function. Route spans that have already been loaded or that are not on the cycle are checked by the Reverse Span/Node Check routine, which traverses backwards along the last contiguously loaded segment of the route trajectory, assessing the impact of not loading the current span.

The spans which are on the cycle and are not already loaded 288 are examined one at a time in tandem with each span's associated node 266 by the Forward Span/Node Check function 270. If a span is failed by the Forward Span/Node checker 270, the route is marked as not to be loaded, and the entire route is discarded, with the loader going on to examine the next route. If the span passes the Forward Span/Node test 270, and if the span being examined is the last span of the route 289, the Terminal Node Check function 274 is called. This function examines the terminal node to see if the required add/drop activity can occur here. If the Terminal Node Check 274 fails, the route is discarded and the loader goes on to the next route. If the Terminal Node Check 274 passes, or if this is not the last span of the route, the routeSpanLoaded vector is updated to mark this span as to be loaded 276.

The route hop is checked by the Reverse Span/Node Check 280. Once all hops have been checked 290 and route hop(s) identified for loading, 292, the Route Loader function 282 is invoked. The Route Loader 282 takes the information contained in the routeSpanLoaded vector and processes the route accordingly, updating the 'loaded' spans of the route in the loaded route data structure.

Then the 'Update UPSR Loaded Cycle' function 278 is called. This routine updates the loaded cycle data structure with the new information about the segments of the current route that are being loaded.

The UPSR Cycle loader continues, starting this whole process once more with the next route. The UPSR Cycle Loader executes until all routes have been processed, returning control once more to the chooseRings routine.

FIGS. 35A, 35B, 35C, and 35D show the process flow for the BLSR capture cycle 132 loader. This loader attempts to fill the cycles by loading only the routes for which all unrouted spans in common with the cycle under consideration can be loaded in that cycle. If only a subset of the unrouted spans in common with the cycle can be loaded on that cycle, the route is discarded. This function checks every route which has potential involvement with the cycle. The route is examined span by span, and a route span loaded vector is created which records which spans of the route are to be loaded by the route loader function. Route spans that have already been loaded or that are not on the cycle 298 are checked by the Reverse Span/Node Check routine 280, which traverses backwards along the last contiguously loaded segment of the route trajectory, assessing the impact of not loading the current span.

The spans and their associated nodes 266 are checked by the Forward Span/Node Check function 270. If a span is failed by the Forward Span/Node checker 270, the span is marked as not to be loaded 300 in the routeSpanLoaded vector, and the entire route is discarded, with the loader going on to examine the next route. If the span passes the Forward Span/Node test 270, and if the span being examined is the last span of the route, the Terminal Node Check function 274 is called. This function examines the terminal node to see if the required add/drop activity can occur here. If the Terminal Node Check 274 fails, the route is discarded and the loader goes on to the next route. If the Terminal Node Check passes, or if this is not the last span of the route 302, the routeSpanLoaded vector is updated to mark this span as to be loaded 276.

Once all of the spans have been examined for a route and the route has not been failed, the Route Loader 282 function is invoked. The Route Loader takes the information contained in the routeSpanLoaded vector and processes the route accordingly, updating the 'loaded' spans of the route in the loaded route data structure.

Then the 'Update BLSR Loaded Cycle' function 284 is called. This routine actually updates the loaded cycle data structure with the new information about the segments of the current route that are being loaded.

The BLSR Capture Cycle loader then continues, starting this whole process once more with the next route. The BLSR Capture Cycle Loader executes until all routes have been processed, returning control once more to the chooseRings routine 196.

FIG. 36 shows the structure of the FindRouteNodeIndex-OnCycle function 266. This is not listed as one of the modules in FIG. 25, but because it performs a function used by the modules, it is described here. This function determines where in the cycle the route node under consideration exists. This reference location is called an index and it allows RingBuilder™ to locate the route node within the cycle under consideration. The cycles are stored based on a span indexing format; each one of the spans of the cycle has a node associated with it at that index number. Because a span is in contact with two nodes at the endpoints of the span, it is possible for the route span to be stored with a different node at the same index number relative to what is stored for the same span on the cycle. This routine removes this ambiguity returning the cycle index where information about the route is stored in the cycle.

This function determines the node associated with the last span index on the cycle 320, the node associated with the current span index on the cycle 322, and the node on the next span index on the cycle. If the current span of the cycle is the last span, the next span is set to be that at the first span index 324, otherwise it remains as that at the next span index 326. Then the current route node is compared with the current span node 328 and next span node 330. If there is a match, the index from the matching cycle node is returned at 332, 334 or 338. If there is no match with either node, an error message is printed and NIL is returned from the function 336.

FIGS. 37A and 37B shows the structure of the ForwardSpanNodeCheck function. This function examines the current route node/span pair in the context of the cycle under consideration. The span is examined to determine whether or not it has sufficient bandwidth carrying capacity to transport the demand. The node is examined to determine if it can transport or add/drop the bandwidth required. If both the span and node have sufficient capacity, ForwardSpanNodeCheck passes the route span segment, otherwise it fails it. First the route span is checked to see that it is actually on the cycle 340. If it is on the cycle, the route node on the span is determined 342 and the route span is checked for whether it is the first hop on the route 344. Then index on the cycle for the route node is determined 348. Then the cycle span is checked to see if it has sufficient remaining bandwidth carrying capacity to transport the demand segment 350. If it does then if it is determined that the route must transition on/or off the cycle and no ADM is currently in place but no ADM can be added because the active node limit for the cycle has been reached 352 the route segment is failed 354. If the cycle node passes this test, then the node is tested to see whether an ADM is present and the demand must transit on/off this ring but cannot support this demand because the active port count limit of the ADM would be exceeded 356. If it fails this test, the route segment is failed. If it passes, and it is not the first span of the route 358, the node is checked to see if transit activity is allowed. If it is the first span of the route, the node is checked to see if it is a valid add/drop point 360. If it is valid, the route span passes 362, otherwise, it is failed 354.

FIGS. 38A, 38B, and 38C illustrate the ReverseSpanNodeCheck function 280. This function is invoked after ForwardSpan/Node check has failed a route segment. Reverse Span/NodeCheck determines the impact of the inability to route a downstream demand segment on an loaded upstream span/node being examined. This examination process is for the contiguously routed demand segment upstream of the failed span. For instance, if a span cannot carry a demand segment, the node connecting that span with a previous span that is carrying the demand must be capable of dropping the bandwidth so that it could transit to another system for transport to its destination.

The function is called when a route segment designated to be loaded cannot be loaded 320. First, the route span immediately prior to the current one is examined 370. If that route span is not on the cycle, the function exits 372 as no further route status changes are required. If the route span is on the cycle, the route node connecting the failed span and the span immediately prior to it 373 is checked. This node must be capable of dropping the required bandwidth to allow the remainder of the route to be carried on a different system. If transitions are not allowed 376, or if an ADM is not present and cannot be added 378, or if the ADM active port count would be exceeded 380, the previous route span is not allowed to be loaded, and its status is reset to being not loaded 382. Otherwise, the span remains loaded, and the function terminates 372.

If the status of the previous span is changed from loaded to not loaded 382, the function then goes back one more span 384. If the span is not loaded 389, then the function is exited 372.

If that span is currently marked as loaded 389, the whole process begins again 340 with the examination of the common node between the failed span and this previous loaded span. This backward traversal of the demand continues until the end of the continuously loaded demand segment is reached either at the beginning of the demand, or at the node where the demand transits onto the cycle.

The TerminalNodeCheck function 274 is shown in FIGS. 39A and 39B. This routine checks the last node of the route, verifying whether the route can be added or dropped at this node. The routine first sets failRouteSpan to false 392 and gets the system type 394. The terminating route node index is set to one greater than the routeHopNumber 396, and the terminating route node 398 and its index on the cycle 400 are is thereby identified. The routine than checks for a negative value, indicating an invalid node index 402. If add/drops are allowed at the node 404, an ADM can be added if required 406. If an ADM ready exists, the routine checks whether the add/drop port count is being exceeded on an existing ADM here 408. If add/drop cannot be accomplished by any of these methods, failRouteSpan is set to true 410. The routine returns the failRouteSpan value 412.

This routine calculates the balance, capture and balance-capture figures of merit for the loaded cycle presented to it. The balance-capture eta calculator is shown in FIGS. 40A and 40B.

First the variables, protection bandwidth-distance product, margin and working bandwidth-distance product used in the calculation are all initialized to 420.

Then, for each span the balance components are calculated incrementally.

Span length 422 is multiplied by the system bandwidth 424, and this product added to the protection bandwidth-distance product for the cycle 426. Bandwidth for the routes in the span 428 and the margin bandwidth 430 are multiplied by the span distance, and the respective products added to the cycle margin-distance product 432 and the cycle working-distance product 434.

After the balance components have been calculated for the spans, balance transitions 436 and the links on the cycle 438 are obtained. Balance is calculated using the protection, margin and working bandwidth distance products 440. Capture is calculated from the number of routes with fully contained cycle and the number of routes with only segments in the cycle 442. Balance—capture eta is calculated using a weighted sum of balance and capture 444.

The specific progress eta calculator 134 calculates the merit of the cycle being evaluated based on the specific progress of that cycle. This eta calculation technique is used for the direct cost optimization ring selection technique. The framework is outlined in FIGS. 41A and 41B.

First the system cycle hop count 448 and system fibre count 450 are obtained. The variables working (bandwidth)-distance product and cycle circumference are initialized 452. For each cycle span, the span length 454 and the bandwidth 446 for routes carried on the cycle are obtained. The span length is then added to the cycle circumference 458. The product of span length and the bandwidth for routes carried on the cycle is then added to the working(bandwidth)-distance product 460.

The costs for constructing the span are then calculated. These costs include for ADMs common costs 462, add/drop port costs 464, and transit port costs 466, which together comprise the ADM cost 468. Fibre costs 470 depend upon the length of spans, or cycle circumference 458, the amount of fibres in the spans. Total system cost 472 is ADM costs plus fibre costs. Specific progress 474 is working (bandwidth)-distance product divided by total system cost.

This routine updates the loaded cycle structure with the route that is slated to be loaded onto the cycle under consideration. The routine is documented in FIGS. 42A and 42B.

For each route to be loaded on the cycle, the routine first gets the route bandwidth 476. Each route hop is checked whether it is to be loaded 478. If the route hop is to be loaded, the remaining bandwidth for the cycle span carrying the hop is reduced by the route bandwidth 480 and a new routeCell element is created 490. If the route is the first route for the cycle span, a new routeCell is linked to the loaded cycle 492. Otherwise a new Cell is linked to the last cell 494.

After the route hops have all been checked, the route count for the cycle span is incremented 496.

This routine updates the loaded cycle structure with the route that is slated to be loaded onto the cycle under consideration. The routine is documented in FIG. 43. It is structurally similar to the Update BLSR Loaded Cycle routine in section 3.3.16, with the exception that the update reference frame is the loaded cycle span rather than the route hop. This is due to the fact that any route loaded onto a UPSR ring is allocated bandwidth all around the ring.

The routine first obtains the cycle span count 500 and the route bandwidth 476. For each span in the cycle it then decrements he remaining cycle span bandwidth 480, and a new routeCell linked list element is created 490. If the route is the first route for the cycle span, a new routeCell is linked to the loaded cycle 492. Otherwise a new Cell is linked to the last cell 494. The route count for the cycle span in then incremented 496.

The Route Loader routine 282 calculates and updates the loaded cycle statistics for the route being loaded onto the loaded cycle. The routed link count, the ADM count, and the transition and balance transition count are all updated by travelling along the trajectory of the route and processing its interaction with the loaded cycle. Route Loader is diagrammed in FIGS. 44A, 44B, 44C and 44D. The routine first gets the route bandwidth 476. Then the route is processed hop by hop. If the hop is the first on the route, previousRouteSpanOnCycle is set to false 504. Then the routine gets the loaded status for the hop 506.

If the route hop is to be loaded, the linksOn counts for the loadedRoute 508 and loadedCycle 510 are incremented. If an ADM is required to add the route onto the cycle 512, it is added, and cycle ADM count is incremented 514. If this is the first route hop, the cycle add/drop counts are also updated 516. If it is not the first route hop and the previous route span was not on the cycle 518, the cycle and route transition counts are updated 520, 522. Further, if the previous route hop was not loaded onto another ring system 524, balance transition counts are also updated 526.

If this route hop is also the last hop of the route 528, the terminal node add drops are updated 530 and minimal ADM is added if required 532 previousRouteSpanonCycle is set to true 534 and the next hop processed.

If the route hop is not to be loaded, and if the previous route hop was not on the cycle 536, prevoiusRouteSpanonCycle it set to false 538 and the next hop processed. If the previous route hop was on the cycle 540, the routine finds the route node index on the cycle 542. If no ADM is present, one is added 544 and the loaded cycle 546 and loaded route 548 transitions counts are incremented. If the current route hop is not loaded on a ring system 550, the balance transition counts are incremented 552.

Once all route hops have been processed, the route loader terminates, returning control to the calling routine 554.

The Commit Ring module 140 is called once chooseRings has evaluated all of the loaded cycles. Commit Ring processes the best loaded cycle, committing it to be a ring in the design. It updates the persistent span2Route and the route data structures. Commit Ring is shown in FIGS. 45A, 45B, 45C and 45D.

Commit Ring first gets the system fibre count 560. It then processes the cycle span by span.

For each span Commit Ring first updates the remaining fibre count at the span 562. Then it loads the routes onto the span.

For each route to be loaded, Commit Ring first gets the route number 564.

Then it sets the predecessor Route Element equal to the span2route value 566, sets currentRouteElement equal to predecessorRouteElement 568 and sets firstelement to true 570.

Commit ring then updates the successor RouteElement using the current Route Element and nextRoute 572 and gets current linked list element number 574.

If the span2Route route number equals the loaded cycle route number 576, the route is identified for deleting from span2route 578.

In deleting the route linked list element, first Commit Ring determines whether it is the first element 580, and if so, if it is also the last span2Route linked list element 582. If the route element is both, Commit ring sets the span2Routevector element to null 584. If the route element is not the last span2Route linked list element.582, then the span2Route successor element the linked to nextRoute replaces the predecessor element linked to nextRoute 586 and there is a free successor element 588. If the route linked list element is not the first element 580, then the current element the linked to nextRoute replaces the predecessor element linked to nextRoute 590 and there is a free current element 592. Commit Ring then sets currentRouterElement to null 594 and firstElement is then set to false 598.

The route transition count is then updated 600 and each hop of the route is evaluated for loading onto the span 604. If the hop is to be loaded, the route spans loaded count is incremented 606 and the route span information is updated 608. The next route for the span is then processed 610.

If a route is not identified for deleting from span2route, Commit ring goes to the next route in the list by first setting the currentRoute Element to the predecessor Route Element 612 and the firstelement to false 598. Predecessor element linked to nextRoute 590 and there is a free current element 592. Commit Ring then sets currentRouterElement to null 594 and firstElement is then set to false 598.

The route transition count is then updated 600 and each hop of the route is evaluated for loading onto the span 604. If the hop is to be loaded, the route spans loaded count is incremented 606 and the route span information is updated 608. The next route for the span is then processed 610.

If a route is not identified for deleting from span2route, Commit ring goes to he next route in the list by first setting the currentroute Element to the predecessor Route Element 612 and the firstelement to false 598.

Balance and Capture have been referred to above and are here described in more detail. They are alternate ring evaluation criteria, and are used also in Ringbuilder v 1. Maximizing ring balance is preferred when span costs are the main concern, such as in long distance networks. Balance is calculated as follows:

$$\text{Balance} = \frac{\text{Total Demand Carried on Ring Segements}}{\text{Total Ring Demand Carrying Capacity}}$$

Where total ring demand capacity includes both used and unused capacity.

Capture is a measure of how much a ring carries entire demands. Capture is the preferred optimization characteristic when seeking to minimizing costs of switching demands on and off rings, such as in urban networks. It is calculated as follows for each route with segments on the ring:

$$\text{Capture} = \frac{\sum \text{Route Capture Value}}{2 \times \text{\#Routes on Ring}}$$

where Route Capture Value equals 0 if route has neither source or destination node on ring, is 1 if route has of source or destination nodes on ring, and is 2 if route has both source and destination nodes on ring. A balance-capture value is then calculated as follows: Balance-Capture=k×balance+(1−k)×capture, Where 0<k <1, k is a weighting factor and depends upon the relative importance of balance and Capture.

Immaterial modifications may be made to the invention described here without departing from the essence of the invention.

What is claimed is:

1. A method of constructing a telecommunications network, in which the network is formed of plural nodes connected by plural spans, each node having a nodal switching device for making connections between adjacent spans meeting at the node, the method comprising the steps of:
   a) selecting a set of candidate rings, each candidate ring being formed of nodes connected by spans, the candidate rings each being capable of serving a number of demands and having a ring construction cost C;
   b) assessing the total transport utility U of each candidate ring, wherein the total transport utility is a measure of at least the number of demands served by the respective candidate ring;
   c) assessing the construction cost of each candidate ring;
   d) calculating a ratio formed of U/C for each candidate ring;
   e) choosing, from the set of candidate rings, a best set of candidate rings, wherein candidate rings in the best set of candidate rings have a higher ratio of U/C than candidate rings not in the best set; the best set of candidate rings being capable of covering the network; and
   f) forming rings in the network that are selected from the best set of candidate simple rings.

2. The method of claim 1 in which the total transport utility of a candidate ring is a product of the number of demands served and the fraction of total route length each demand is moved by a span in the candidate ring towards the destination of the demand.

3. The method of claim 1 in which rings initially formed in the network are selected from the best set of candidate rings based on a probability distribution.

4. The method of claim 1 in which the set of candidate rings excludes at least one ring that is capable of being formed in the network.

5. The method of claim 4 in which the set of candidate rings excludes all rings capable of being formed in the network that include a specific span.

6. The method of claim 5 in which the specific span is selected randomly.

7. The method of claim 1 in which the set of candidate rings is selected by selecting rings having greater length than other possible rings in the network.

8. The method of claim 1 in which the steps a–e of claim 1 are carried out repetitively as a series of iterations, on each iteration a ring is identified as being suitable to be formed in the network, and in subsequent iterations the demands served by the rings already identified as being suitable for forming in the network are set to zero.

9. The method of claim 8 in which the total transport utility of a candidate ring is a product of the number of demands served and the fraction of total route length each demand is moved by a span in the candidate ring towards the destination of the demand.

10. The method of claim 8 in which rings initially formed in the network are selected from the best set of candidate rings based on a probability distribution.

11. The method of claim 8 in which the set of candidate rings excludes at least one ring that is capable of being formed in the network.

12. The method of claim 11 in which the set of candidate rings excludes all rings capable of being formed in the network that include a specific span.

13. The method of claim 12 in which the specific span is selected randomly.

14. The method of claim 12 in which the number of rings excluded is reduced from one iteration to another.

15. The method of claim 8 in which the set of candidate rings is selected by selecting rings having greater length than other possible rings in the network.

16. The method of claim 1 in which the steps of claim 1 are carried out repetitively as a series of iterations and the iterations of the steps of claim 1 are carried out by:
stopping each iteration when a predetermined portion of the network has been covered by rings;
repeating the iterations several times until several partial designs have been generated; and continuing the iterations to generate complete coverage of the network only for a selected number of the several partial designs.

17. The method of claim 8 in which the ratio of U/C for each ring formed in the network is monitored.

18. The method of claim 1 in which the steps of claim 1 are carried out repetitively as a series of iterations and iterations of the steps of claim 1 are carried out by:
keeping a set P of top ranked candidate rings for each iteration;
after each iteration, removing a span from consideration for use in rings to be formed in the network; and
stopping the iterations when the rings to be formed in the network form a bi-connected minimal subgraph.

19. The method of claim 12 in which spans to be excluded from consideration for rings are identified by aggregating demands on spans that are essential for forming a bi-directional sub-graph.

20. The method of claim 12 in which spans are selectively removed from consideration for forming rings, a set of possible network coverages are obtained corresponding to each removed span, and rings are formed in the network corresponding to a selected one of the set of possible network coverages.

21. A method of connecting a telecommunications network, in which the network is formed of plural nodes connected by plural spans, each node having a nodal switching device for making connections between adjacent spans meeting at the node, the method comprising the steps of:
a) selecting a set of candidate rings, each candidate ring being formed of nodes connected by spans;
b) assigning an amount of demand to each candidate ring:
c) ordering the candidate rings according to a rule that considers the cost of implementing the candidate rings in the network in relation to the level of demand coverage provided by the candidate rings:
d) selecting a set of best rings from the candidate rings, wherein the best rings are ordered higher than rings not in the best set;
e) setting the demand in the best rings to zero:
f) re-ordering the remaining candidate rings not in the best set according to a rule that considers the cost of implementing the candidate rings in the network in relation to the level of demand coverage provided by the remaining candidate rings; and
g) forming rings in the network that are selected from the best set of candidate rings and rings in the remaining candidate rings that are ordered higher than other rings in the remaining candidate rings.

22. The method of claim 21 in which the set of candidate rings excludes at least one ring that is capable of being formed in the network.

23. The method of claim 22 in which the set of candidate rings excludes all rings capable of being formed in the network that include a specific span.

24. The method of claim 23 in which the specific span is selected randomly.

25. The method of claim 21 in which the set of candidate rings is selected by selecting rings having greater length than other possible rings in the network.

26. The method of claim 21 in which the steps of claim 21 are carried out repetitively as a series of iterations and the iterations of the steps of claim 21 are carried out by:
stopping each iteration when a predetermined portion of the network has been covered by rings;
repeating the iterations several times until several partial designs have been generated; and continuing the iterations to generate complete coverage of the network only for a selected number of the several partial designs.

27. The method of claim 21 in which the steps of claim 21 are carried out repetitively as a series of iterations and iterations of the steps of claim 1 are carried out by:
keeping a set P of top ranked candidate rings for each iteration;
after each iteration, removing a span from consideration for use in rings to be formed in the network; and
stopping the iterations when the rings to be formed in the network form a bi-connected minimal subgraph.

28. The method of claim 22 in which spans to be excluded from consideration for rings are identified by aggregating demands on spans that are essential for forming a bi-directional sub-graph.

29. The method of claim 22 in which spans are selectively removed from consideration for forming rings, a set of possible network coverages are obtained corresponding to each removed span, and rings are formed in the network corresponding to a selected one of the set of possible network coverages.

30. A method for selecting a ring for implementation in a communications network, the communications network comprising plural spans connected by nodes for data transmission, the method comprising the steps of:
a) selecting a set of cycles, a cycle being a set of nodes and their interconnecting spans forming a closed path for travel once over each span and node in the cycle;
b) for each cycle in the set:
i.) identifying the demands with demand route segments in the cycle, a demand being an amount of data required to be transmitted between a source node and a destination node, a demand route being a set of connected spans and nodes over which the demand is transmitted and a demand route segment being any number of spans and nodes in the demand route;
ii.) calculating the cost of carrying the demands on the cycle, and a cost and performance value for the cycle; and
c) selecting one cycle as a ring based on the cost and performance value.

31. The method of claim 30 comprising using all possible cycles for the cycle set.

32. The method of claim 30 in which the sizes of the cycles in the set depend upon the number of rings already implemented in the communications network.

33. The method of claim 30 in which all demands are treated as a set of same size demands, the number of demands in the set depending upon the size of the actual demand.

34. The method of claim 30 further comprising sorting the demands before calculating the cost of carrying the demands on the cycle.

35. The method of claim 30, further comprising calculating the cost of carrying the demands on the cycle for each of more than one ring technologies.

36. The method of claim 35 comprising the following ring technologies used in the cost calculation: unidirectional path switched ring (UPSR), BLSR Balance, and BLSR Capture.

37. The method of claim 30 in which a demand with demand route segments in the cycle is included in the cost evaluation at step c) only if the demand can be carried on all the spans in the cycle that are in the demand route.

38. The method of claim 30 further comprising considering demand routes within other, already designated rings for demands that cannot be carried on all the spans in the cycle that are in the demand route, and the cycle's cost and performance value is evaluated for these alternative demand routes.

39. The method of claim 38 in which a demand will be re-routed onto another ring only if none of that demand is already carried on other rings.

40. The method of claim 30 in which selecting a cycle as a ring is done by a probability selection, the probability of cycle being selected being according to the cycles's cost and performance value.

* * * * *

UNITED STATES PATENT AND TRADEMARK OFFICE
CERTIFICATE OF CORRECTION

PATENT NO. : 6,819,662 B1
DATED : November 16, 2004
INVENTOR(S) : Wayne D. Grover, G. Dave Morley and James B. Slevinsky It is certified that error appears in the above-identified patent and that said Letters Patent is hereby corrected as shown below:

<u>Title page,</u>
Item [56], References Cited, OTHER PUBLICATIONS,
"Broadband Network" reference, "Infrasturcture" should read -- infrastructure --.
"W.D. Grover" reference, "Socienty" should read -- Society --.
*Assistant Examiner*, "Robert M. Wilson" should read -- Robert W. Wilson --.
Item [57], ABSTRACT,
Line 17, "Forming" should read -- Form --.

<u>Column 40,</u>
Line 26, "candidate simple rings" should read -- candidate rings --.
Line 47, "iterations, on" should read -- iterations; on --.

<u>Column 41,</u>
Line 10, "rings;" should read -- rings; and --.
Line 30, "sub-graph." should read -- subgraph --.
Line 33, "coverages are" should read -- coverages is --.
Line 52, "zero:" should read -- zero; --.

<u>Column 42,</u>
Line 10, "rings;" should read -- rings; and --.
Line 17, "iterations of the steps" should read -- the iterations of the steps --.
Line 17, "claim 1" should read -- claim 21 --.
Line 28, "sub-graph" should read -- subgraph --.

<u>Column 43,</u>
Line 1, "30," should read -- 30 --.
Line 6, "Balance, and" should read -- Balance and --.

UNITED STATES PATENT AND TRADEMARK OFFICE
CERTIFICATE OF CORRECTION

PATENT NO. : 6,819,662 B1
DATED : November 16, 2004
INVENTOR(S) : Wayne D. Grover, G. Dave Morley and James B. Slevinsky It is certified that error appears in the above-identified patent and that said Letters Patent is hereby corrected as shown below:

Column 44,
Line 10, "cycles's" should read -- cycle's --.

Signed and Sealed this

Seventh Day of March, 2006

JON W. DUDAS
*Director of the United States Patent and Trademark Office*